US012634833B2

(12) United States Patent
Li et al.

(10) Patent No.: US 12,634,833 B2
(45) Date of Patent: May 19, 2026

(54) METHOD AND DEVICE FOR SIGNAL TRANSMISSION

(71) Applicant: SAMSUNG ELECTRONICS CO., LTD., Suwon-si (KR)

(72) Inventors: Qi Li, Beijing (CN); Di Su, Beijing (CN); Qi Xiong, Beijing (CN); Chen Qian, Beijing (CN); Bin Yu, Beijing (CN); Haijie Qiu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 409 days.

(21) Appl. No.: 18/324,919

(22) Filed: May 26, 2023

(65) Prior Publication Data

US 2023/0388934 A1     Nov. 30, 2023

(30) Foreign Application Priority Data

May 27, 2022    (CN) .......................... 202210600313.5
Apr. 18, 2023    (CN) .......................... 202310421900.2

(51) Int. Cl.
*H04W 52/14*          (2009.01)
*H04W 8/24*           (2009.01)
*H04W 52/36*          (2009.01)

(52) U.S. Cl.
CPC ........... *H04W 52/146* (2013.01); *H04W 8/24* (2013.01); *H04W 52/365* (2013.01)

(58) Field of Classification Search
CPC ............. H04W 52/146; H04W 52/365; H04W 52/367; H04W 8/24
See application file for complete search history.

(56) References Cited

U.S. PATENT DOCUMENTS

| | | | |
|---|---|---|---|
| 2015/0296464 A1* | 10/2015 | Sagae | H04W 52/367 |
| | | | 455/522 |
| 2016/0302205 A1 | 10/2016 | Ji et al. | |
| 2017/0289928 A1 | 10/2017 | Wang | |
| 2020/0037183 A1* | 1/2020 | Ganu | H04W 52/367 |
| 2020/0127777 A1 | 4/2020 | Papasakellariou | |
| 2023/0036057 A1* | 2/2023 | Lei | H04W 8/22 |

OTHER PUBLICATIONS

International Search Report and Written Opinion of the International Searching Authority dated Aug. 31, 2023, in connection with International Application No. PCT/KR2023/007304, 8 pages.
Supplementary European Search Report dated Sep. 2, 2025, in connection with European Patent Application No. 23812208.9, 8 pages.
Nokia et al., "UE RF requirements for the sum method," 3GPP TSG-RAN4 Meeting #101-bis-e, R4-2200455, Electronic Meeting, Jan. 2022, 3 pages.

(Continued)

*Primary Examiner* — John J Lee

(57) ABSTRACT

The disclosure relates to a 5G or 6G communication system for supporting a higher data transmission rate. The present disclosure provides a method performed by a user equipment in a communication system, including: determining a power headroom report (PHR) and/or a transmission signal power based on first information; and transmitting the PHR and/or transmitting a signal with the transmission signal power.

20 Claims, 12 Drawing Sheets

(56)           References Cited

OTHER PUBLICATIONS

3GPP TS 36.331 V17.0.0 (Mar. 2022) Technical Specification; 3rd Generation Partnership Project; Technical Specification Group Radio Access Network; Evolved Universal Terrestrial Radio Access (E-UTRA); Radio Resource Control (RRC); Protocol specification (Release 17), 1119 pages.

3GPP TS 36.101 V17.5.0 (Mar. 2022); Technical Specification; 3rd Generation Partnership Project; Technical Specification Group Radio Access Network; Evolved Universal Terrestrial Radio Access (E-UTRA); User Equipment (UE) radio transmission and reception (Release 17), 2037 pages.

* cited by examiner

METHOD AND DEVICE FOR SIGNAL TRANSMISSION

CROSS-REFERENCE TO RELATED APPLICATION(S)

This application is based on and claims priority under 35 U.S.C. § 119 to Chinese Patent Application Nos. 202210600313.5 and 202310421900.2, filed on May 27, 2022, and Apr. 18, 2023, in the China National Intellectual Property Administration, the disclosure of which is incorporated by reference herein in its entirety.

BACKGROUND

1. Field

The disclosure relates to the technical field of wireless communication, and more specifically, to a method and device for signal transmission in a wireless communication system.

2. Description of Related Art

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

5G mobile communication technologies define broad frequency bands such that high transmission rates and new services are possible, and may be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

According to an embodiment of the present disclosure, a method performed by a user equipment in a communication system is provided, including: determining a power headroom report (PHR) and/or a transmission signal power based on first information; and transmitting the PHR and/or transmitting a signal with the transmission signal power.

In an implementation, the method further includes: receiving first indication information on the first information from a base station: determining the first information based on the first indication information.

In an implementation, wherein the determining of the first information based on the first indication information includes: determining the first information based on the first indication information and second information; wherein the second information includes at least one of: a modulation mode, a carrier waveform, a power class, a transmission bandwidth setting, a resource block (RB) allocation mode, a transmit power control (TPC) command field, and a calculation method of a power control adjustment state.

In an implementation, the method further includes: transmitting capability information to a base station, wherein the capability information includes second indication information on the first information.

In an implementation, wherein the second indication information is reported per at least one of: a user equipment, a frequency band, a frequency band combination, and a bandwidth part.

In an implementation, wherein the transmission signal power includes a configured maximum output power, and the first information includes at least one of:

a maximum output power reduction (MPR) value and/or MPR relax value,
a configured maximum transmission power offset,
a corrected value of a maximum power offset,
a maximum output power limit offset, and
a maximum output power offset.

In an implementation, wherein the first indication information or the second indication information includes at least one of:

information for indicating a maximum output power reduction (MPR) value and/or MPR relax value,
information for indicating a configured maximum transmission power offset, information for indicating a corrected value of a maximum power offset,
information for indicating a maximum output power limit offset,
information for indicating a maximum output power offset.

In an implementation, wherein the transmission signal power includes a transmission power of a physical uplink shared channel; wherein the determining of the power headroom report (PHR) and/or the transmission signal power based on the first information includes: determining a configured maximum output power based on the first information; determining the PHR and/or the transmission power of the physical uplink shared channel based on the configured maximum output power.

In an implementation, wherein the first information includes at least one of:
a transmission power calculation offset;
an expected received power offset;
a transmit power control (TPC) command mapping power value offset;
a power headroom offset.

In an implementation, wherein:
the first indication information or the second indication information includes at least one of:
information for indicating a transmission power calculation offset;
information for indicating an expected received power offset;
information for indicating a TPC command mapping power value offset;
information for indicating a power headroom offset.

In an implementation, the method further includes: determining an EVM requirement based on an EVM requirement offset; wherein the first information is first information satisfying the EVM requirement.

According to an embodiment of the present disclosure, a method performed by a base station in a communication system is provided, including: receiving a PHR and/or a signal from a user equipment, wherein a transmission power of the signal and/or the PHR is determined based on first information.

In an implementation, the method further includes: transmitting first indication information on the first information to the user equipment, wherein the first indication information is used to determine the first information.

In an implementation, wherein the first information is determined based on the first indication information and second information, wherein the second information includes at least one of: a modulation mode, a carrier waveform, a power class, a transmission bandwidth setting, an RB allocation mode, a transmit power control (TPC) command field, and a calculation method of a power control adjustment state.

In an implementation, the method further includes: receiving capability information from the user equipment, wherein the capability information includes second indication information on the first information.

In an implementation, wherein the second indication information is reported per at least one of: a user equipment, a frequency band, a frequency band combination, and a bandwidth part.

In an implementation, wherein the transmission signal power includes a configured maximum output power, and the first information includes at least one of:
a maximum output power reduction (MPR) value and/or MPR relax value,

a configured maximum transmission power offset, a corrected value of a maximum power offset, a maximum output power limit offset, a maximum output power offset.

In an implementation, wherein the first indication information or the second indication information includes at least one of:

information for indicating a maximum output power reduction (MPR) value and/or MPR relax value, information for indicating a configured maximum transmission power offset, information for indicating a corrected value of a maximum power offset, information for indicating a maximum output power limit offset, information for indicating a maximum output power offset.

In an implementation, wherein the transmission signal power includes a transmission power of a physical uplink shared channel; wherein the first information is used to determine a configured maximum output power; the PHR and/or the transmission power of the physical uplink shared channel is determined based on the configured maximum output power.

In an implementation, wherein the first information includes at least one of:

a transmission power calculation offset;

an expected received power offset;

a transmit power control (TPC) command mapping power value offset;

a power headroom offset.

In an implementation, wherein the first indication information or the second indication information includes at least one of:

information for indicating a transmission power calculation offset;

information for indicating an expected received power offset;

information for indicating a TPC command mapping power value offset;

information for indicating a power headroom offset.

In an implementation, wherein the first information is first information satisfying an EVM requirement, wherein the EVM requirement is determined based on an EVM requirement offset.

According to an embodiment of the present disclosure, a user equipment in a communication system is provided, including: a transceiver configured to transmit and/or receive signals; and a controller coupled with the receiver and configured to perform the methods according to the embodiments of the present disclosure.

According to an embodiment of the present disclosure, a base station device in a communication system is provided, including: a transceiver configured to transmit and/or receive signals; and a controller coupled with the transceiver and configured to perform the methods according to the embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION

For a more complete understanding of the present disclosure and its advantages, reference is now made to the following description taken in conjunction with the accompanying drawings, in which like reference numerals represent like parts:

DETAILED DESCRIPTION

Figure 1:
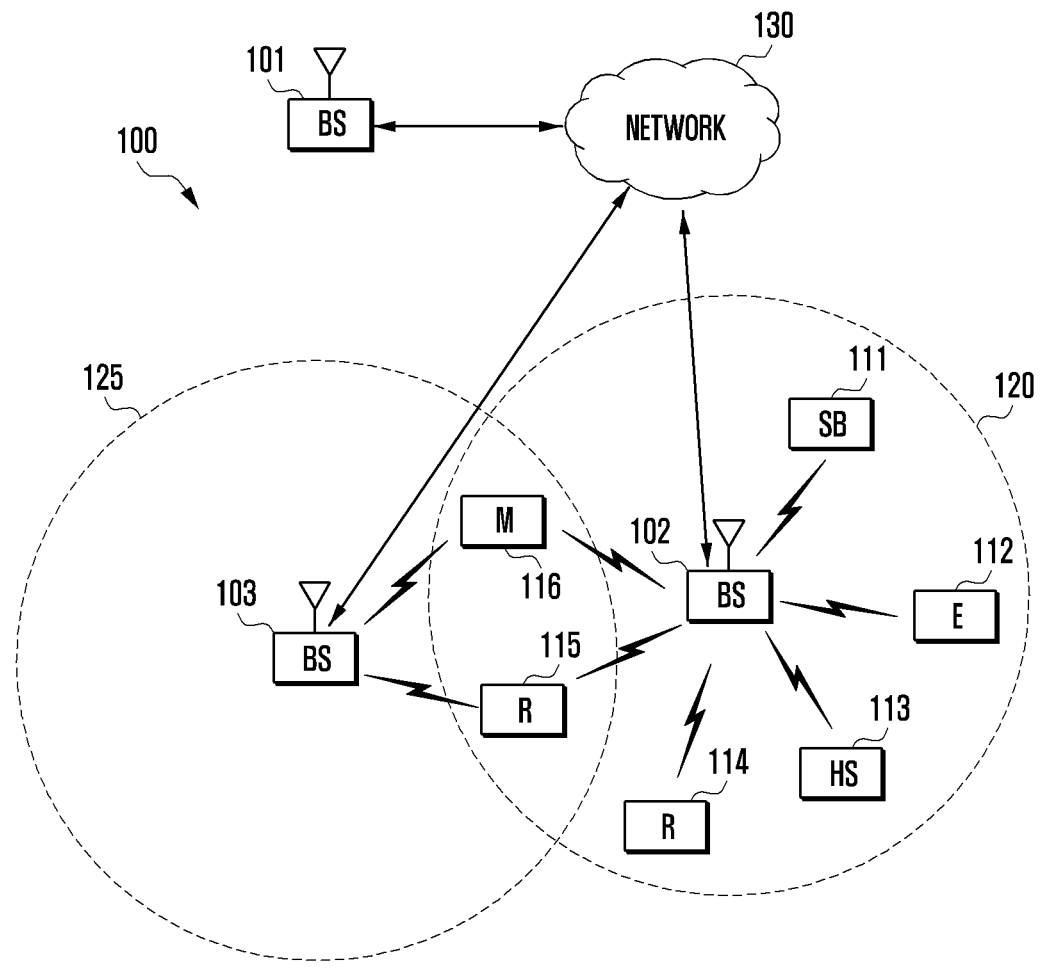
FIG. 1 illustrates a schematic diagram of an overall structure of a wireless network.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

The technical schemes of the embodiments of the present application can be applied to various communication systems, and for example, the communication systems may include global systems for mobile communications (GSM), code division multiple access (CDMA) systems, wideband code division multiple access (WCDMA) systems, general packet radio service (GPRS) systems, long term evolution (LTE) systems, LTE frequency division duplex (FDD) systems, LTE time division duplex (TDD) systems, universal mobile telecommunications system (UMTS), worldwide interoperability for microwave access (WiMAX) communication systems, 5th generation (5G) systems or new radio (NR) systems, etc. In addition, the technical schemes of the embodiments of the present application can be applied to future-oriented communication technologies. In addition, the technical schemes of the embodiments of the present application can be applied to future-oriented communication technologies.

In the communication systems, a power amplifier (PA) is used to increase the transmission power of the signal to resist the pathloss and provide sufficient power headroom for the random fading and interference that may be encountered when transmitting in the wireless medium. However, in actual application, the output power of any PA cannot increase infinitely with the increase of input power. In the linear region of the PA, the ratio of output power to input power of the PA is approximately constant. When the input power of the PA continues to increase, it will enter the saturation region. In this situation, the ratio of output power to input power is no longer constant, that is, the output signal and input signal have a nonlinear relationship. In order to ensure the output quality of the signal, when the PA is used, the power reduction method is often used to make it work in the linear region far from the saturation region. This is actually to improve the linearity of the PA at the expense of direct current power consumption. As one of the largest energy-consuming devices in a wireless communication system, the energy consumption of the PA accounts for 50%-80% of the base stations in a cellular network, so improving the energy efficiency of the PA has vital significance to reduce the energy consumption of the whole network.

In order to improve the energy utilization rate of the PA, the power of the input signal can be made close to the upper limit of the linear region, and there will be nonlinear components in the output signal in addition to linear components proportional to the input signal. In order to solve the problem of nonlinear distortion, we can use advanced receiving algorithm at a receiver for processing, to ensure the receiving performance of the receiver. In this situation, a transmitter can improve the transmission power, and the existing calculation method of the transmission power will no longer be applicable. Aiming at this problem, the disclosure proposes a new transmission power calculation method to support a higher data transmission power, so that the energy efficiency of the PA can be improved.

FIG. 1 illustrates an example wireless network 100 according to various embodiments of the present disclosure. The embodiment of the wireless network 100 shown in FIG. 1 is for illustration only. Other embodiments of the wireless network 100 may be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on the type of the network, other well-known terms such as "base station" or "access point" may be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" may be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 may communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes may be made to the wireless network of FIG. 1. The wireless network 100 may include any number of gNBs and any number of UEs in any suitable arrangement, for example. Furthermore, gNB 101 may directly communicate with any number of UEs and provide wireless broadband access to the network 130 for those UEs. Similarly, each gNB 102-103 may directly communicate with the network 130 and provide direct wireless broadband access to the network 130 for the UEs. In addition, gNB 101, 102 and/or 103 may provide access to other or additional external networks, such as external telephone networks or other types of data networks.

Figure 2A:
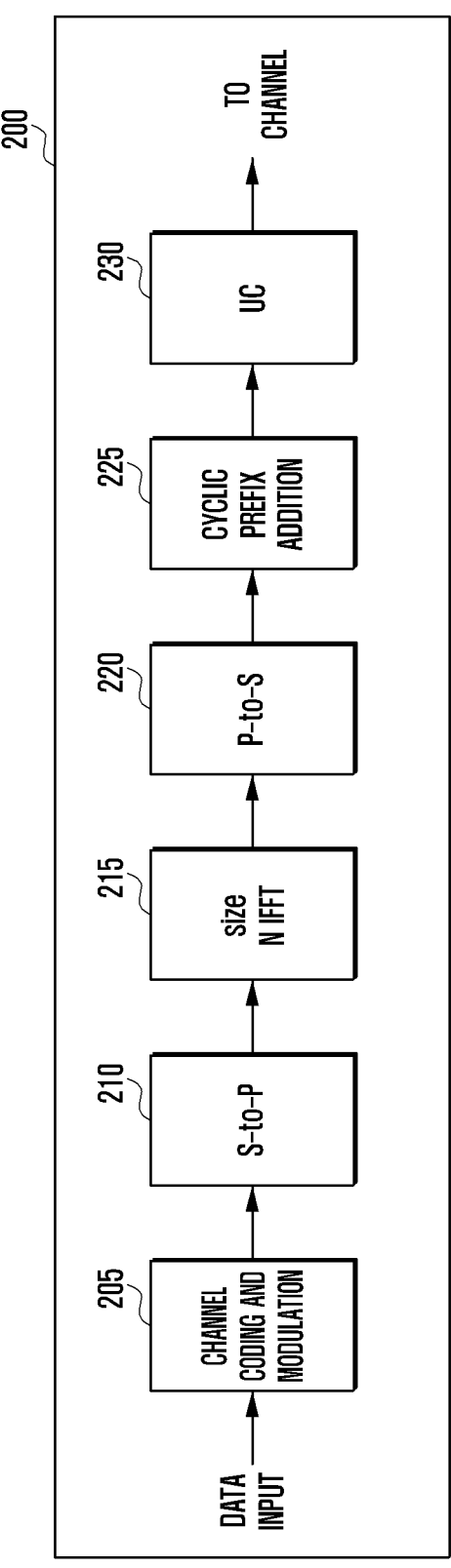
FIG. 2a illustrates a schematic diagram of a transmission path.
Figure 2B:
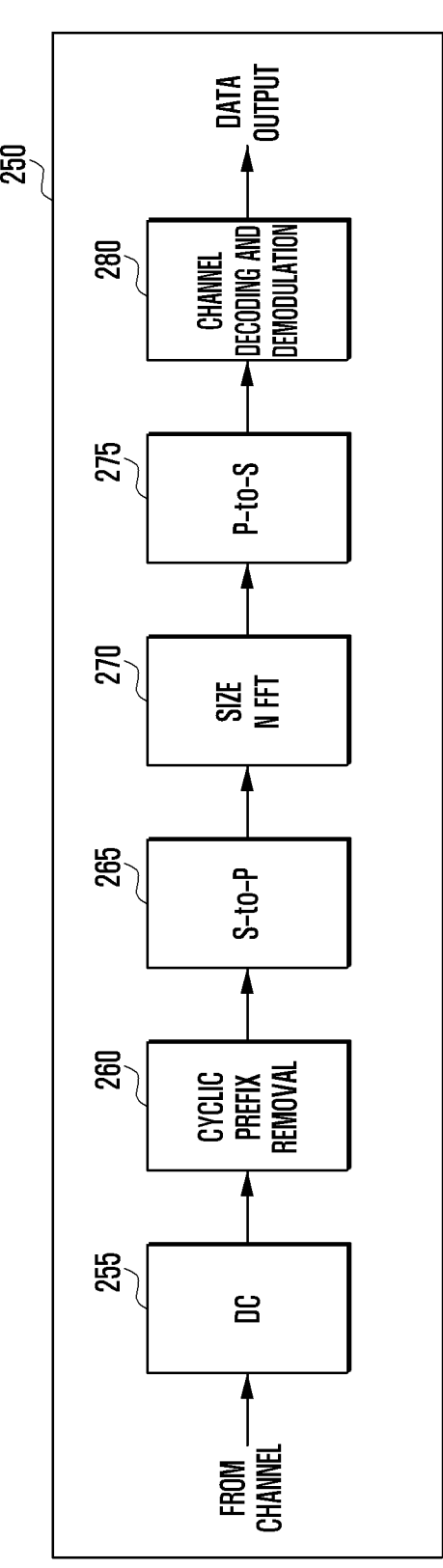
FIG. 2b illustrates a schematic diagram of a reception path.

FIGS. 2a and 2b illustrate example wireless transmission and reception paths according to the present disclosure. In the following description, the transmission path 200 may be described as being implemented in a gNB, such as gNB 102, and the reception path 250 may be described as being implemented in a UE, such as UE 116. However, it should be understood that the reception path 250 may be implemented in a gNB and the transmission path 200 may be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal may also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2a and 2b can be implemented using only hardware, or using a combination of hardware and software/firmware. As a specific example, at least some of the components in FIGS. 2a and 2b may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms may be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2a and 2b illustrate examples of wireless transmission and reception paths, various changes may be made to FIGS. 2a and 2b. For example, various components in FIGS. 2a and 2b may be combined, further subdivided or omitted, and additional components may be added according to specific requirements. Furthermore, FIGS. 2a and 2b are intended to illustrate examples of types of transmission and reception paths that may be used in a wireless network. Any other suitable architecture may be used to support wireless communication in a wireless network.

Figure 3A:
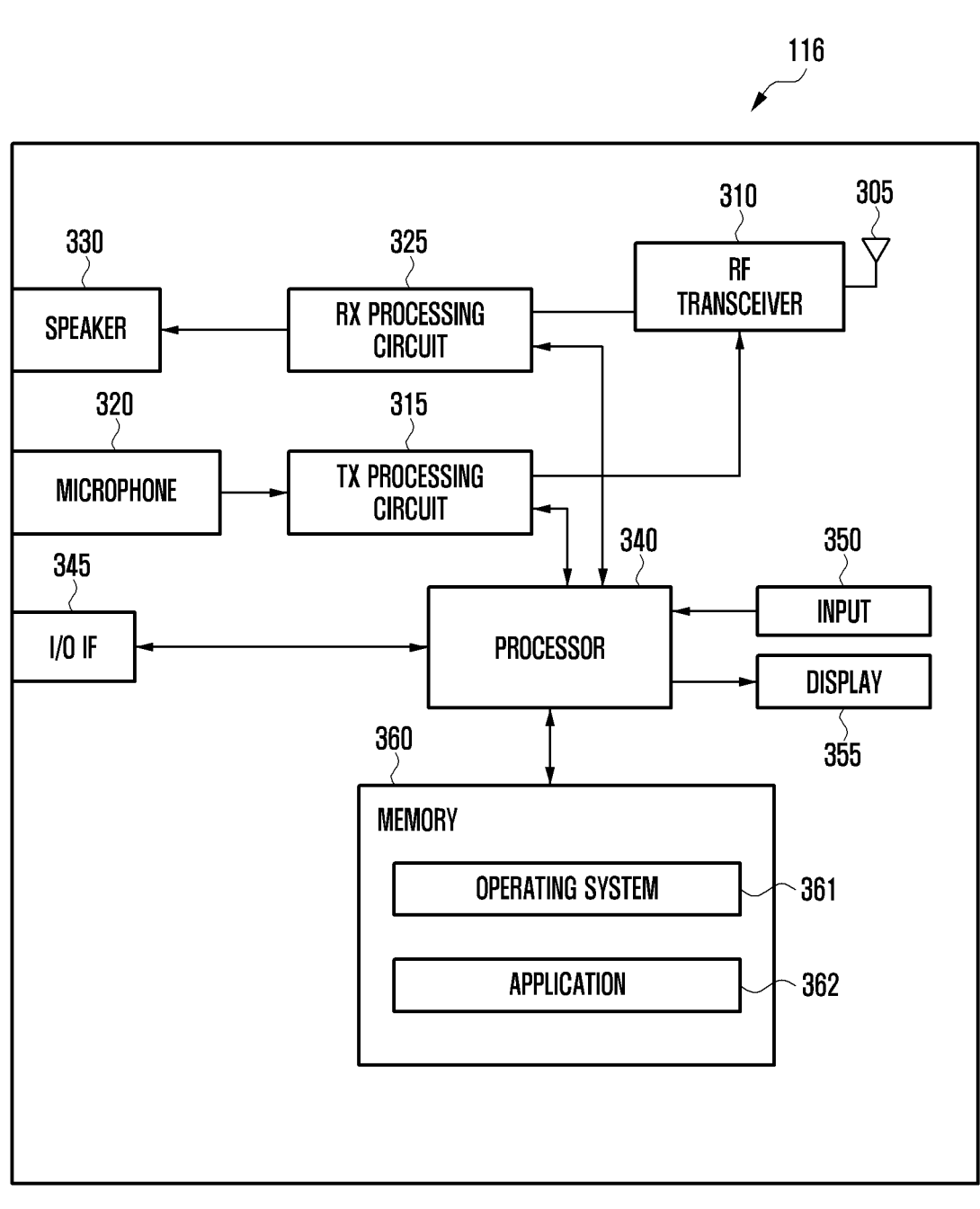
FIG. 3a illustrates a schematic diagram of a structure of a UE.

FIG. 3a illustrates an example UE 116 according to the present disclosure. The embodiment of UE 116 shown in FIG. 3a is for illustration only, and UEs 111-115 of FIG. 1 may have the same or similar configuration. However, a UE has various configurations, and FIG. 3a does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 may include one or more processors or other processing devices and execute an OS 361 stored in the memory 360 in order to control the overall operation of UE 116. For example, the processor/controller 340 may control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 may move data into or out of the memory 360 as instructed by an execution process. In some embodiments, the processor/controller 340 is configured to execute the application 362 based on the OS 361 or in response to signals received from the gNB or the operator. The processor/controller 340 is also coupled to an I/O interface 345, where the 110 interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 may input data into UE 116 using the input device(s) 350. The display 355 may be a liquid crystal display or other display capable of presenting text and/or at least limited graphics (such as from a website). The memory 360 is coupled to the processor/controller 340. A part of the memory 360 may include a random access memory (RAM), while another part of the memory 360 may include a flash memory or other read-only memory (ROM).

Although FIG. 3a illustrates an example of UE 116, various changes may be made to the UE of FIG. 3a. For example, various components in FIG. 3a may be combined, further subdivided or omitted, and additional components may be added according to specific requirements. As a specific example, the processor/controller 340 may be divided into a plurality of processors, such as one or more central processing units (CPUs) and one or more graphics processing units (GPUs). Furthermore, although FIG. 3a illustrates that the UE 116 is configured as a mobile phone or a smart phone, UEs may be configured to operate as other types of mobile or fixed devices.

Figure 3B:
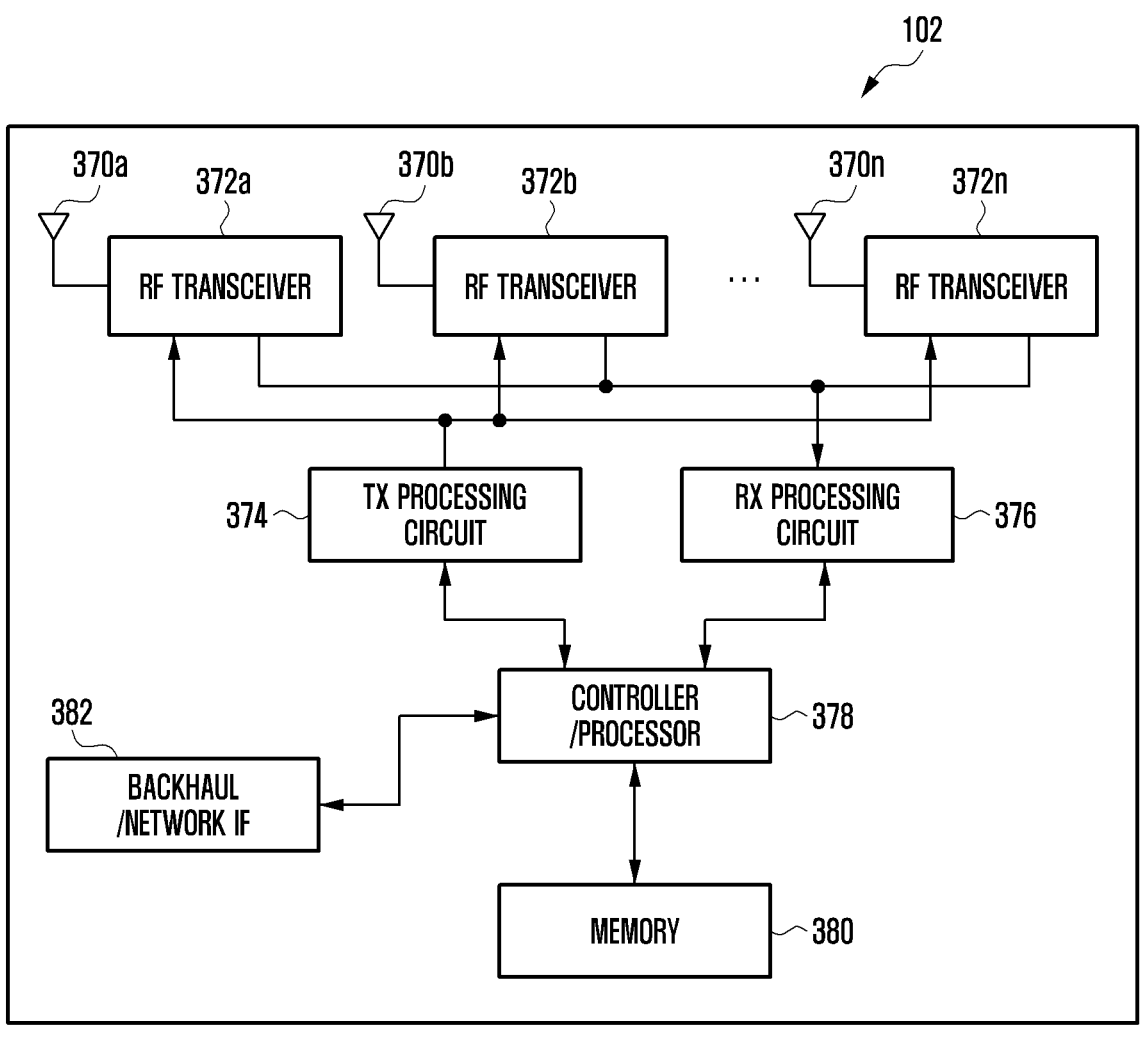
FIG. 3b illustrates a schematic diagram of a structure of a base station.

FIG. 3b illustrates an example gNB 102 according to the present disclosure. The embodiment of gNB 102 shown in FIG. 3b is for illustration only, and other gNBs of FIG. 1 may have the same or similar configuration. However, a gNB has various configurations, and FIG. 3b does not limit the scope of the present disclosure to any specific implementation of a gNB. It should be noted that gNB 101 and gNB 103 may include the same or similar structures as gNB 102.

As shown in FIG. 3b, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 may include one or more processors or other processing devices that control the overall operation of gNB 102. For example, the controller/processor 378 may control the reception of forward channel signals and the transmission of backward channel signals through the RF transceivers 372a-372n, the RX processing circuit 376 and the TX processing circuit 374 according to well-known principles. The controller/processor 378 may also support additional functions, such as higher-level wireless communication functions. For example, the controller/processor 378 may perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 may also support channel quality measurement and reporting for systems with 2D antenna arrays as described in embodiments of the present disclosure. In some embodiments, the controller/processor 378 supports communication between entities such as web RTCs. The controller/processor 378 may move data into or out of the memory 380 as instructed by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 may support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 may allow gNB 102 to communicate with other gNBs through wired or wireless backhaul connections. When gNB 102 is implemented as an access point, the backhaul or network interface 382 may allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 may include an RAM, while another part of the memory 380 may include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3b illustrates an example of gNB 102, various changes may be made to FIG. 3b. For example, gNB 102 may include any number of each component shown in FIG. 3a. As a specific example, the access point may include many backhaul or network interfaces 382, and the controller/processor 378 may support routing functions to route data between different network addresses. As another specific example, although shown as including a single instance of the TX processing circuit 374 and a single instance of the RX processing circuit 376, gNB 102 may include multiple instances of each (such as one for each RF transceiver).

Figure 4:
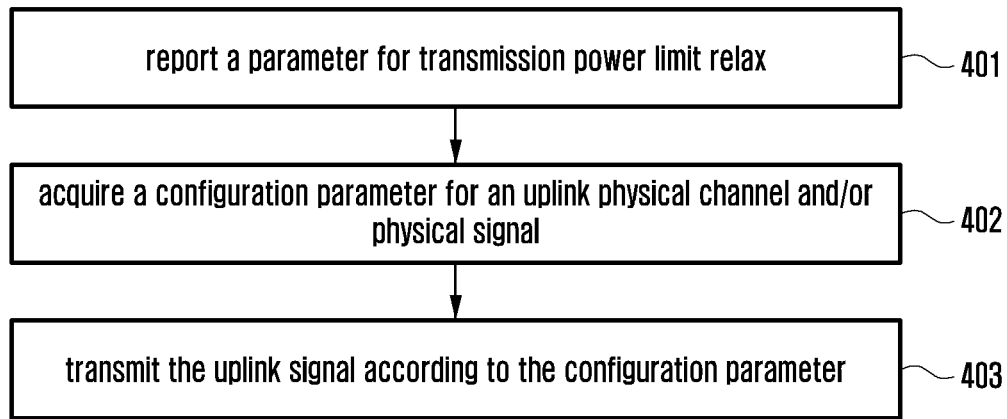
FIG. 4 illustrates a schematic diagram of a method according to an embodiment of the present disclosure.

FIG. 4 is a schematic diagram of a method according to an embodiment of the present disclosure. As shown in FIG. 4, the method includes the following steps:

Step 401: a user equipment may report a parameter for transmission power limit relax;

Step 402: the user equipment may acquire a configuration parameter for an uplink channel and/or physical signal, and Step 403: the user equipment may transmit the uplink signal according to the configuration parameter.

It may be understood that the above steps 401 and 402 may be optional steps. In an implementation, the configuration parameter in step 403 may be preset or received from a base station.

According to an embodiment of the disclosure, a method for calculating a transmission signal power and/or power headroom report value by a user equipment in a wireless communication system is proposed. The method for calculating the transmission signal power and/or power headroom report value by the user equipment includes at least one of the following operations: the user equipment determines a configured maximum output power (for example, including an uplink maximum output power), the user equipment determines a transmission power of an uplink channel (for example, but not limited to an uplink shared channel), and the user equipment determines a power headroom report. The user equipment participates in power calculation by reporting different parameters and/or acquiring corresponding indications from a base station, to support a higher user equipment transmission power and increase a transmission distance of a transmitted signal, so that the coverage radius may be expanded. It may be understood that the uplink shared channel may also be replaced by other types of uplink channels without affecting the application of the principles of the present disclosure. All similar modifications and replacements are included within the scope of the present disclosure.

In an implementation, the configured maximum output power and/or transmission power and/or power headroom report (PHR) is determined according to a power relax parameter. The configured maximum output power and/or transmission power and/or PHR may be calculated by using a relaxed power adjustment value or power adjustment offset corresponding to the power relax parameter.

In an implementation, before the user equipment uses the relaxed power adjustment value or power adjustment offset corresponding to the power relax parameter to calculate the configured maximum output power and/or transmission power and/or PHR, the user equipment may report the power relax parameter. The power relax parameter indicates a degree to which a power may be relaxed when calculating the configured maximum output power and/or transmission power and/or PHR.

The power relax parameter may be used to indicate whether the user equipment supports the calculation of the configured maximum output power and/or transmission power and/or PHR by using the relaxed power adjustment value or power adjustment offset corresponding to the power relax parameter, and/or indicate a power relax parameter that may be supported by the user equipment. The specific content reported by the user equipment may be whether the user equipment has a capability to support the calculation of the configured maximum output power and/or transmission power and/or PHR by using the relaxed power adjustment value or power adjustment offset corresponding to one or more power relax parameters, and/or indexes of one or more power relax parameters supported by the user equipment. After acquiring the power relax parameters supported by the user equipment, the base station may schedule according to the power relax parameters to support the user equipment to transmit signals with higher power.

A specific implementation of a definition of the power relax parameter may be expressed with Table 1.

value of the user equipment is a default value. The power relax parameter reported by the user equipment may not be distinguished between FDD and TDD, that is, the user equipment reports a set of power relax parameter values, which may be shared in FDD and TDD modes. The user equipment reports different power relax parameter values in an FR1 band and an FR2 band. For example, when the user equipment supports the FR1 band but does not support the FR2 band, the user equipment reports the power relax parameter values in the FR1 band.

In an implementation, the power relax parameter may be one or more power relax parameters. When the power relax parameter is a specific power relax parameter value, it means that the user equipment does not support participating in the calculation of the configured maximum output power and/or transmission power and/or power headroom report (PHR) by using the relaxed power adjustment value or power adjustment offset corresponding to the power relax parameter, that is, the user equipment does not consider the relax of power when calculating the configured maximum output power and/or transmission power and/or power headroom report (PHR); when the power relax parameter is not the specific power relax parameter value, it means that the user equipment supports participating in the calculation of the configured maximum output power and/or transmission power

TABLE 1

| | | | different in | |
| | | mandatory | FDD-TDD | deferent in |
| parameter definition | per | parameter | mode | FR1-FR2 |
| --- | --- | --- | --- | --- |
| the power relax parameter indicates whether the user equipment supports participating in the calculation of the configured maximum output power and/or transmission power and/or power headroom report (PHR) by using the relaxed power adjustment value or power adjustment offset corresponding to the power relax parameter, and/or indicates power relax parameter values that may be supported by the user equipment | user equipment/band/ band combination/ bandwidth part | NO | NO | YES |

As shown in Table 1, the power relax parameter may indicate whether the user equipment supports participating in the calculation of the configured maximum output power and/or transmission power and/or power headroom report (PHR) by using the relaxed power adjustment value or power adjustment offset corresponding to the power relax parameter, and/or indicate power relax parameter values that may be supported by the user equipment. Specifically, the power relax parameter values reported by the user equipment may be reported per user equipment, that is, a set of power relax parameter values reported by the user equipment may be shared in all bands. In addition, the power relax parameter values reported by the user equipment may also be reported per band and/or band combination and/or bandwidth part, that is, the user equipment reports different power relax parameter values on different bands and/or band combinations and/or bandwidth parts, respectively. The user equipment may choose to report or not to report the power relax parameter, that is, the parameter is not a mandatory reporting parameter. When the user equipment does not report the power relax parameter, the power relax parameter and/or power headroom report (PHR) by using the relaxed power adjustment value or power adjustment offset corresponding to the power relax parameter.

Optionally, when the power relax parameter is not the specific power relax parameter value, the user equipment may report one or more power relax parameters. When a user equipment reports one power relax parameter, the parameter may indicate the highest or lowest class of power relax parameter that may be supported. In this situation, the user equipment may support all other power relax parameters not exceeding the class or the user equipment may support all other power relax parameters not lower than the class.

It should be understood that, throughout the specification of the application, the described "class" is only an example of an information representation, and it is not intended to limit the representation of corresponding information to "class". For example, the following described "transmission power calculation offset class", "expected received power offset class", "transmit power control (TPC) command class", "power headroom offset class", "error vector magnitude (EVM) capability class and other similar expressions are only exemplary implementations of information for indicating transmission power calculation offset, information for indicating expected received power offset, information for indicating TPC command mapping power value offset, and information for indicating power headroom offset, etc.

Optionally, when the power relax parameter is not the specific power relax parameter value, one or more power relax parameters reported by the user equipment are certain classes of power relax parameters that may be supported. The higher the class of the power relax parameter reported by the user equipment, the higher the relax degree of the power limit that may be supported by the user equipment, and further, the user equipment may use higher power for signal transmission, and vice versa. The different classes represented by the power relax parameters may be denoted by numerical values, for example, integers such as 0, 1, 2, etc., and may also be denoted in other ways that may distinguish different classes. The higher the numerical value representing the class of the power relax parameter, the stronger the class of the capability to relax the power limit that may be supported by the user equipment in this situation. Optionally, the specific power relax parameter value may be, for example, 0. Alternatively, the different classes represented by the power relax parameters may be denoted by letters, for example, letters such as A, B, C, etc. In this situation, the specific power relax parameter value may be, for example, A. Alternatively, the power relax parameters may also be denoted in other suitable ways that may distinguish different classes, as long as classes 1, 2 and the like may be distinguished. By using this reporting method by the user equipment, the base station is enabled to issue indications according to its own capabilities to control the transmission power of the user equipment, and at the same time, the signaling overhead may be reduced.

In an implementation, the user equipment may acquire a power relax parameter indication from the base station to participate in the calculation of the configured maximum output power and/or transmission power and/or power headroom report (PHR). The method for acquiring the power relax parameter indication by the user equipment includes at least one of: acquiring the configuration parameter by parsing a downlink control channel, acquiring the configuration parameter by parsing high layer signaling, and acquiring the configuration parameter by parsing media access control (MAC) information of a downlink shared channel. Optionally, the configuration parameter may be dynamically set through DCI or semi-statically set through RRC signaling. When the user equipment is not configured with a power relax parameter and the user equipment does not receive the power relax parameter indication from the base station, the user equipment may use a preset value of the power relax parameter. In an implementation, the power relax parameter indication may be denoted by an integer, such as 0, 1, 2, etc., and may also be denoted in other ways, such as A, B, C, etc., which may distinguish class 0, class 1, class 2, etc. After acquiring the power relax parameter indication, the user equipment may know the power relax parameter indicated by the base station to it, so that the corresponding power relax parameter may be used to acquire the relaxed power adjustment value or power adjustment offset supporting higher power transmission to calculate the configured maximum output power and/or transmission power and/or power headroom report (PHR).

Figure 7:
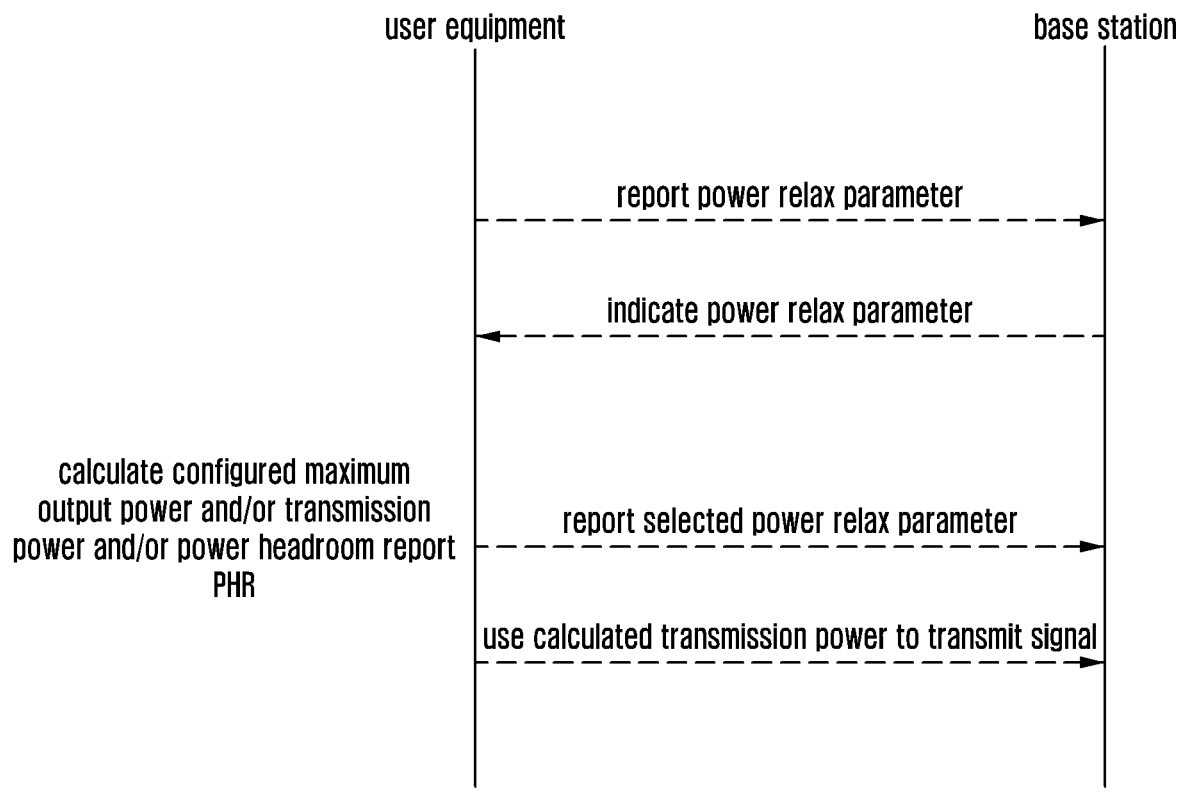
FIG. 7 illustrates a schematic flowchart of an embodiment of signal interaction between a user equipment and a base station according to the present disclosure.

In an implementation, signaling interaction between a user equipment and a base station includes at least one of:

reporting, by the user equipment, a power relax parameter to the base station; acquiring, by the user equipment, a power relax parameter indication from the base station; calculating, by the user equipment, a configured maximum output power and/or transmission power and/or power headroom report (PHR) according to the acquired power relax parameter, wherein the acquired power relax parameter may be a preset value or a power relax parameter indication from the base station; reporting, by the user equipment, the power relax parameter selected for the calculation to the base station; using, by the user equipment, the calculated transmission power to transmit a signal. Different combinations of signaling interaction steps are suitable for different application scenarios, in which the user equipment reports the power relax parameter selected for the calculation to the base station in order for the base station to select a matched detection algorithm according to the received power relax parameter. In an example, a specific implementation of signal interaction between a user equipment and a base station is shown in FIG. 7. Wherein, step 1 (optional): the user equipment reports a power relax parameter to the base station;

step 2 (optional): the user equipment acquires a power relax parameter indication from the base station;

step 3: the user equipment calculates a configured maximum output power and/or transmission power and/or power headroom report (PHR) according to the acquired power relax parameter, wherein the acquired power relax parameter may be a preset value or a power relax parameter indication from the base station;

step 4 (optional): the user equipment reports the power relax parameter selected for the calculation to the base station;

step 5: the user equipment uses the calculated transmission power to transmit a signal.

Figure 8:
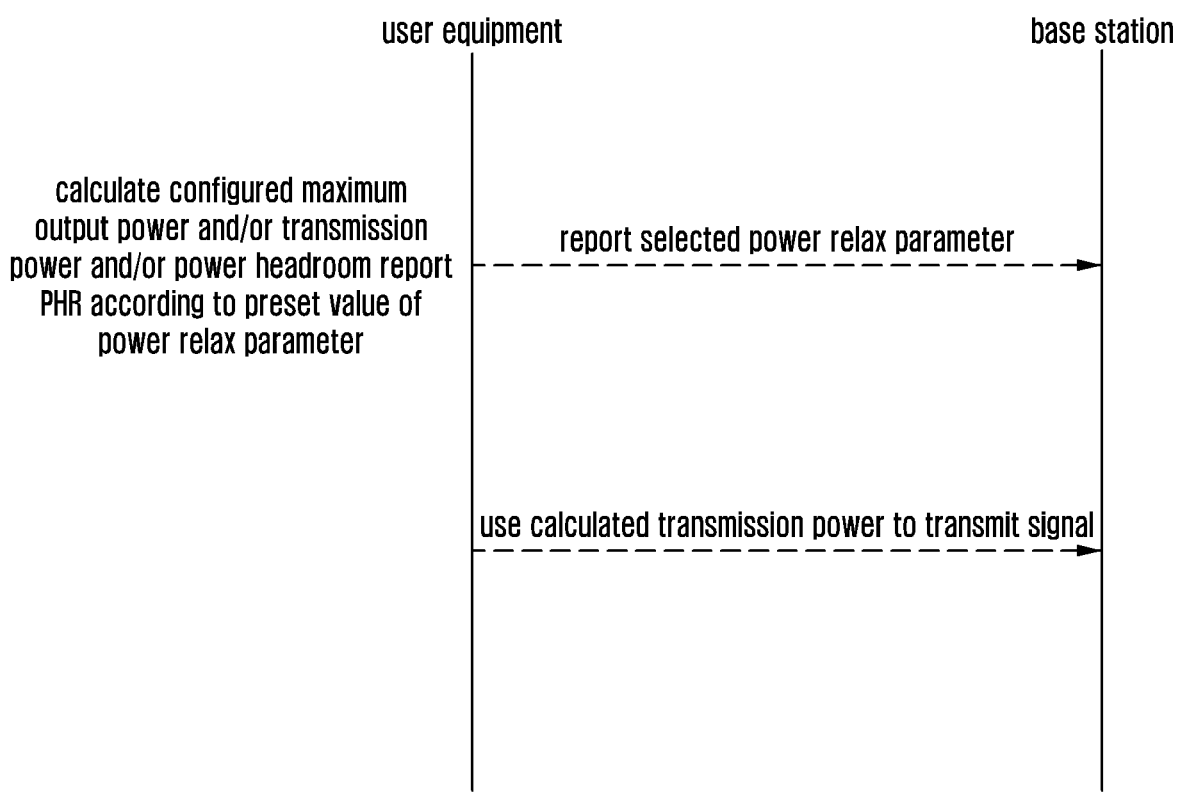
FIG. 8 illustrates a schematic flowchart of another embodiment of signal interaction between a user equipment and a base station according to the present disclosure.

In an implementation, when the user equipment does not acquire the power relax parameter indication from the base station, the user equipment calculates the configured maximum output power and/or transmission power and/or power headroom report (PHR) according to the preset value of the power relax parameter, so as to be suitable for the scenario where the user equipment and the base station have a default processing method with regard to the power relax parameter. In an example, a specific implementation of signal interaction between a user equipment and a base station is shown in FIG. 8. Wherein, step 1: the user equipment calculates a configured maximum output power and/or transmission power and/or power headroom report (PHR) according to a preset value of a power relax parameter;

step 2 (optional): the user equipment reports the power relax parameter selected for the calculation to the base station;

step 3: the user equipment uses the calculated transmission power to transmit a signal.

In an implementation, when the user equipment reports the power relax parameter to the base station and acquires the power relax parameter indication from the base station, the user equipment calculates the configured maximum output power and/or transmission power and/or power headroom report (PHR) according to the acquired power relax parameter indication, so as to be suitable for the scenario where the user equipment lets the base station know the support capability of the user equipment for power relax parameters, thereby acquiring the power relax parameter indication given to the user equipment by the base station. In a case where a set of power relax parameters are acquired

19

Figure 9:
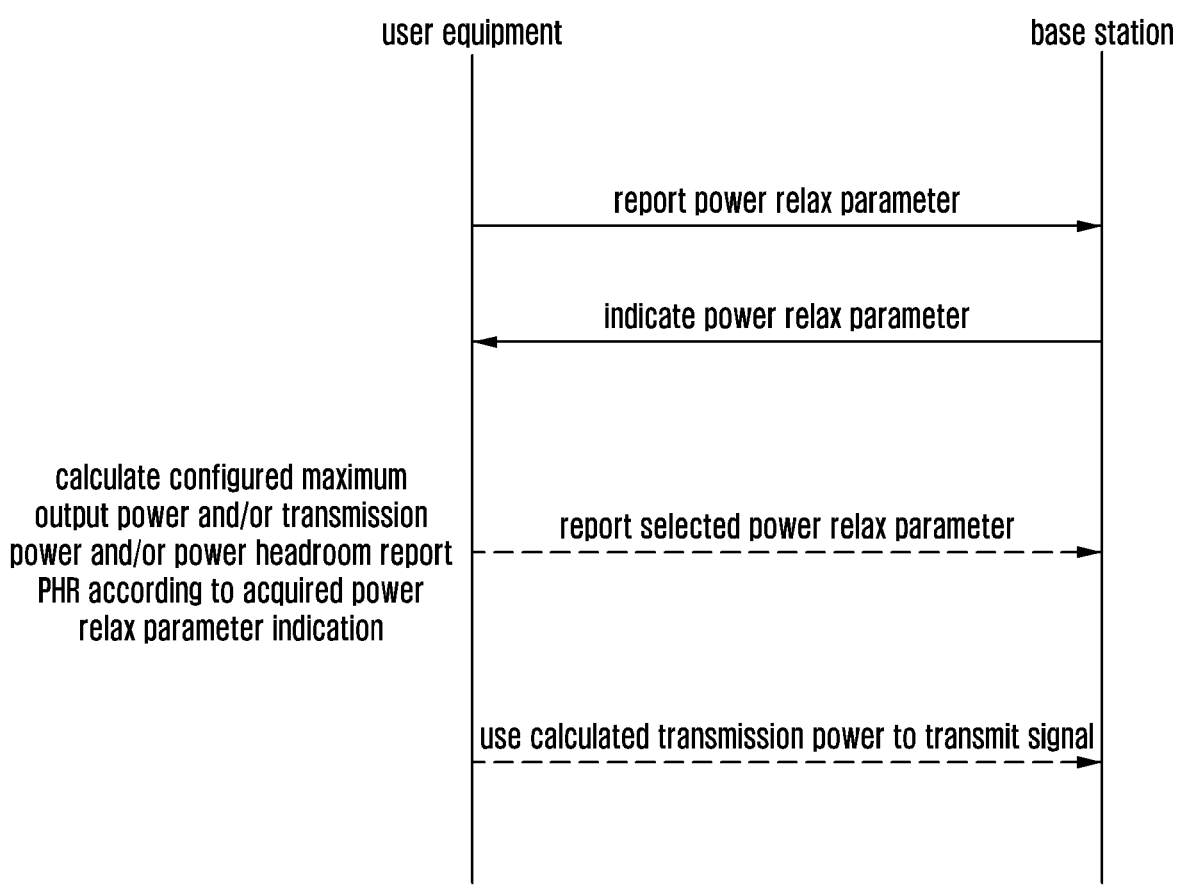
FIG. 9 illustrates a schematic flowchart of yet another embodiment of signal interaction between a user equipment and a base station according to the present disclosure.

20 from the base station, the user equipment may use the highest class supported by the user equipment in the set of power relax parameters to calculate the configured maximum output power and/or transmission power and/or power headroom report (PHR), thereby calculating the transmission power. In an example, a specific implementation of signal interaction between a user equipment and a base station is shown in FIG. 9. Wherein, step 1: the user equipment reports a power relax parameter to the base station;

step 2: the user equipment acquires a power relax parameter indication from the base station;

step 3: the user equipment calculates a configured maximum output power and/or transmission power and/or power headroom report (PHR) according to the power relax parameter indication acquired from the base station. Optionally, if indication of a set of power relax parameters is acquired from the base station, the user equipment may use the highest class supported by the user equipment among the set of power relax parameters;

step 4 (optional): the user equipment reports the power relax parameter selected for the calculation to the base station;

step 5: the user equipment uses the calculated transmission power to transmit a signal.

Figure 10:
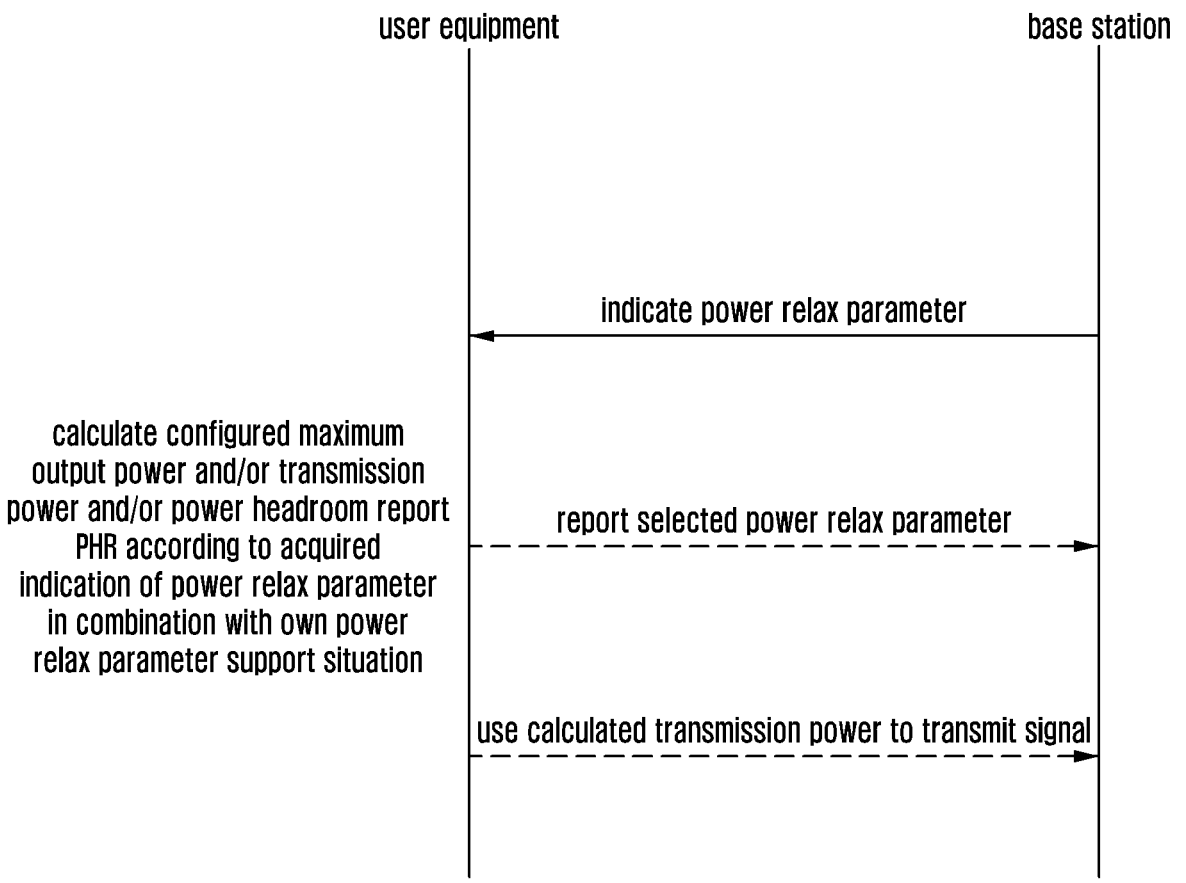
FIG. 10 illustrates a schematic flowchart of yet another embodiment of signal interaction between a user equipment and a base station according to the present disclosure.

In an implementation, when the user equipment does not report the power relax parameter to the base station, but acquires a set of power relax parameter indications from the base station, the user equipment selects a power relax parameter according to its own power relax parameter support situation to calculate the configured maximum output power and/or transmission power and/or power headroom report (PHR). The specific selection method is that when the user equipment does not support the power relax parameter indicated by the base station, the user equipment uses a default power relax parameter; when the user equipment supports the power relax parameter indicated by the base station, the user equipment uses the power relax parameter acquired from the base station. The user equipment reports the selected power relax parameter by itself to the base station while the configured maximum output power and/or transmission power and/or power headroom report (PHR) is calculated. The method is suitable for the scenario where the base station gives indications without knowing the support capability of the user equipment for power relax parameters, and the user equipment selects the appropriate power relax parameter according to its own capability. In an example, a specific implementation of signal interaction between a user equipment and a base station is shown in FIG. 10. Wherein, step 1: the user equipment acquires indication of a power relax parameter from the base station;

step 2: the user equipment calculates a configured maximum output power and/or transmission power and/or power headroom report (PHR) according to the acquired indication of a power relax parameter in combination with its own power relax parameter support situation;

step 3 (optional): the user equipment reports the power relax parameter selected for the calculation to the base station;

step 4: the user equipment uses the calculated transmission power to transmit a signal.

In an implementation, for a certain class of power relax parameters, the user equipment may determine the relaxed power adjustment value or a power adjustment offset. When the user equipment determines the relaxed power adjustment value or power adjustment offset, some specific conditions represented by other parameters may also be considered, which involve at least one of the following parameters: modulation mode, transmission bandwidth setting, carrier waveform, power class and resource block (RB) allocation mode. The relaxed power adjustment value or power adjustment offset may be jointly determined by the power relax parameters and the above specific conditions, so as to be suitable for different working scenarios of the user equipment.

In an example, when the power relax parameter is X, a specific implementation of the relaxed power adjustment value or power adjustment offset is shown in Table 2 or Table 3. In addition to the specific power relax parameter value, for a certain power relax parameter value, the user equipment determines the relaxed power adjustment value or power adjustment offset according to a combination of carrier waveform, modulation mode, RB allocation mode and power class. For example, when the power relax parameter is class X, if the corresponding power class is Y, the carrier waveform is DFT-s-OFDM, the modulation mode is Pi/2 BPSK, and the RB allocation mode is the edge RB allocation, the relaxed power adjustment value is $\leq x_1$ dB, or the relaxed power adjustment value is $x_1$ dB, or the power adjustment offset is $\Delta x_1$ dB. A value of power class Y may be, for example, 1, 1.5, 2, 3, etc., and the carrier waveform may be DFT-s-OFDM and CP-OFDM; the modulation mode may be Pi/2 BPSK, QPSK, 16 QAM, 64 QAM, 256 QAM, 1024QAM and other modulation modes; the RB allocation mode may be edge RB allocation, outer RB allocation and inner RB allocation. The reporting class X of the power relax parameter may be class 0, class 1, class 2, etc. The definitions of edge RB, outer RB and inner RB refer to the standard 3GPP TS38.101.

TABLE 2

| Relaxed power adjustment value corresponding to power class Y when power relax arameter is X | | | |
|---|---|---|---|
| | | relaxed power adjustment value (dB) | | |
| modulation mode | | edge RB allocation | outer RB allocation | inner RB allocation |
| DFT-s-OFDM | Pi/2 BPSK | $\leq x_1$ or $x_1$ | $\leq x_2$ or $x_2$ | $\leq x_3$ or $x_3$ |
| | QPSK | $\leq x_4$ or $x_4$ | $\leq x_5$ or $x_5$ | $\leq x_6$ or $x_6$ |
| | 16 QAM | $\leq x_7$ or $x_7$ | $\leq x_8$ or $x_8$ | $\leq x_9$ or $x_9$ |
| | 64 QAM | $\leq x_{10}$ or $x_{10}$ | $\leq x_{11}$ or $x_{11}$ | $\leq x_{12}$ or $x_{12}$ |
| | 256 QAM | $\leq x_{13}$ or $x_{13}$ | $\leq x_{14}$ or $x_{14}$ | $\leq x_{15}$ or $x_{15}$ |
| | 1024QAM | $\leq x_{16}$ or $x_{16}$ | $\leq x_{17}$ or $x_{17}$ | $\leq x_{18}$ or $x_{18}$ |
| CP-OFDM | QPSK | $\leq x_{19}$ or $x_{19}$ | $\leq x_{20}$ or $x_{20}$ | $\leq x_{21}$ or $x_{21}$ |
| | 16 QAM | $\leq x_{22}$ or $x_{22}$ | $\leq x_{23}$ or $x_{23}$ | $\leq x_{24}$ or $x_{24}$ |
| | 64 QAM | $\leq x_{25}$ or $x_{25}$ | $\leq x_{26}$ or $x_{26}$ | $\leq x_{27}$ or $x_{27}$ |
| | 256 QAM | $\leq x_{28}$ or $x_{28}$ | $\leq x_{29}$ or $x_{29}$ | $\leq x_{30}$ or $x_{30}$ |
| | 1024QAM | $\leq x_{31}$ or $x_{31}$ | $\leq x_{32}$ or $x_{32}$ | $\leq x_{33}$ or $x_{33}$ |

TABLE 3

| Power adjustment offset corresponding to power class Y when power relax parameter is X | | | |
|---|---|---|---|
| | | power adjustment offset (dB) | | |
| modulation mode | | edge RB allocation | outer RB allocation | inner RB allocation |
| DFT-s-OFDM | Pi/2 BPSK | $\Delta x_1$ | $\Delta x_2$ | $\Delta x_3$ |
| | QPSK | $\Delta x_4$ | $\Delta x_5$ | $\Delta x_6$ |
| | 16 QAM | $\Delta x_7$ | $\Delta x_8$ | $\Delta x_9$ |

TABLE 3-continued

| Power adjustment offset corresponding to power class Y when power relax parameter is X | | | |
|---|---|---|---|
| | power adjustment offset (dB) | | |
| modulation mode | edge RB allocation | outer RB allocation | inner RB allocation |
| 64 QAM | $\Delta x_{10}$ | $\Delta x_{11}$ | $\Delta x_{12}$ |
| 256 QAM | $\Delta x_{13}$ | $\Delta x_{14}$ | $\Delta x_{15}$ |
| 1024QAM | $\Delta x_{16}$ | $\Delta x_{17}$ | $\Delta x_{18}$ |
| CP- QPSK | $\Delta x_{19}$ | $\Delta x_{20}$ | $\Delta x_{21}$ |
| OFDM 16 QAM | $\Delta x_{22}$ | $\Delta x_{23}$ | $\Delta x_{24}$ |
| 64 QAM | $\Delta x_{25}$ | $\Delta x_{26}$ | $\Delta x_{27}$ |
| 256 QAM | $\Delta x_{28}$ | $\Delta x_{29}$ | $\Delta x_{30}$ |
| 1024QAM | $\Delta x_{31}$ | $\Delta x_{32}$ | $\Delta x_{33}$ |

In an implementation, a relationship between the power relax parameter and the relaxed power adjustment value or power adjustment offset may be shown in Table 4, for example. Classes 0-3 in Table 4 may be, for example, denoted as values 0, 1, 2, 3, and $a_0$-$a_3$, etc. may be 0 dB, 0.5 dB, 1 dB, 1.5 dB, etc. For example, when the power relax parameter is class 0, the relaxed power adjustment value or power adjustment offset is 0 dB, that is, the user equipment does not perform power relax; when the power relax parameter is class 1, the relaxed power adjustment value or power adjustment offset is 0.5 dB, which corresponds to the relaxed power adjustment value or power adjustment offset used by the user equipment in the aforementioned power-related calculation being 0.5 dB, and so on. When one power relax parameter value is reported, for example, when the class of the power relax parameter reported by the user equipment is 3, it may mean that the relaxed power adjustment value or power adjustment offset used by the user equipment in power-related calculation in this situation is a relaxed power adjustment value or power adjustment offset corresponding to all other classes that is not higher than the relaxed power adjustment value or power adjustment offset when the class of the power relax parameter is 3, that is, the relaxed power adjustment value or power adjustment offset may be not only 1.5 dB, but also 0 dB, 0.5 dB and 1 dB. Alternatively, when one power relax parameter value is reported, for example, when the class of the power relax parameter reported by the user equipment is 3, it may mean that the power relax parameter used by the user equipment in the aforementioned power-related calculation in this situation may satisfy class 3, that is, the relaxed power adjustment value or power adjustment offset is 1.5 dB. In addition, when the user equipment reports multiple power relax parameter values, such as 0, 1 and 3, the power relax parameter used by the user equipment in power-related calculation may satisfy classes 0, 1 and 3, that is, the relaxed power adjustment value or power adjustment offset may be 0 dB, 0.5 dB and 1.5 dB. The reporting class of the power relax parameter may be integers such as 0, 1 and 2. Alternatively, the reporting class of the power relax parameter may also be A, B, C and other letters.

TABLE 4

| Power relax parameter and relaxed power adjustment value or power adjustment offset | |
|---|---|
| power relax parameter | power adjustment value or power adjustment offset |
| class 0 | $a_0$ |
| class 1 | $a_1$ |

TABLE 4-continued

| Power relax parameter and relaxed power adjustment value or power adjustment offset | |
|---|---|
| power relax parameter | power adjustment value or power adjustment offset |
| class 2 | $a_2$ |
| class 3 | $a_3$ |
| . . . | . . . |

In an implementation, when the power relax parameter reported by the user equipment is X, it may mean that all power relax parameters with a class not greater than X are supported, or it may mean that all power relax parameters with a class not less than X are supported; when the power relax parameter reported by the user equipment is X, it may mean that the user equipment may support the power relax parameter with class X and the relaxed power adjustment value or power adjustment offset corresponding to class X in this situation; when the power relax parameters reported by the user equipment are $X_1$, $X_2$ and $X_3$, it may mean that the user equipment may support $X_1$, $X_2$ and $X_3$, and the relaxed power adjustment value or power adjustment offset corresponding to $X_1$, $X_2$ and $X_3$. This reporting method of the user equipment may enable the base station to use appropriate capability class indication for transmission, and may save signal overhead.

In an implementation, the power relax parameter includes or indicates at least one of the following, or indicates that a capability class related to at least one of the following is supported: power relax class (e.g., maximum output power reduction (MPR) capability class), received configured maximum transmission power offset class, corrected value class of maximum power offset corresponding to a power class, maximum output power limit offset class, maximum output power offset class, transmission power calculation offset class, expected received power offset class, capability class related to TPC command, power headroom offset class, and EVM capability class. By participating in the calculation of the configured maximum output power and/or transmission power and/or power headroom report (PHR) with different power relax parameters, the user equipment may acquire the transmission power of a signal and/or power headroom report value by using applicable methods.

In an implementation, the relaxed power adjustment value includes at least one of: relaxed MPR value, $\Delta P_{PowerClass}$, TPC command mapping power value, and EVM requirement.

In an implementation, the power adjustment offset includes at least one of: MPR relax value or offset value, $P_{EMAX}$ offset, $\Delta P_{PowerClass}$ corrected value, maximum output power high limit offset, maximum output power low limit offset, maximum output power limit offset, maximum output power offset, transmission power calculation offset, expected received power offset, TPC command mapping power value offset, power headroom offset, and EVM requirement offset.

It should be understood that the symbols such as parameter values $x_1$-$x_{38}$, $a_1$-$a_3$, $z_1$-$z_{38}$, etc. may be described in all tables related to different embodiments only for the purpose of brevity of description. It may be understood that the same symbols of such type do not mean the same values in different embodiments, but may represent different values or the same values.

It will be described in detail below. First, an embodiment in which the power relax parameter is a power relax class will be described.

It should be understood that although in the following description, the MPR capability class is taken as an example of the power relax class and an MPR capability class indication is taken as an example of the power relax indication for description, the following descriptions related to the MPR capability class may be suitable for other examples of the power relax class, and the following description related to the MPR capability class indication may be suitable for other examples of the power relax indication. That is, the user equipment may report other types of power relax classes to the base station, and/or the user equipment may receive other types of power relax indications from the base station, and calculate the power and/or power headroom report (PHR) value by using the methods described below in connection with the MPR capability class and/or the MPR capability class indication. It should be understood that this exemplary description is only for the purpose of brevity and avoiding redundancy, and is not intended to limit the embodiments to the following detailed description.

In an implementation, the configured maximum output power is determined according to at least one of the following power parameters: power relax class (e.g., maximum output power reduction (MPR) capability class), received configured maximum transmission power offset class, corrected value class of maximum power offset corresponding to power class, maximum output power limit offset class, and maximum output power offset class. By participating in the calculation of the configured maximum output power with different power parameters, the user equipment may acquire the configured maximum output power value by using applicable methods. It should be understood that although in the following description, the MPR capability class is taken as an example of the power relax class and the MPR capability class indication is taken as an example of the power relax indication for description, the following description related to the MPR capability class may be suitable for other examples of the power relax class, and the following descriptions related to the MPR capability class indication may be suitable for other examples of the power relax indication. That is, the user equipment may report other types of power relax classes to the base station, and/or the user equipment may receive other types of power relax indications from the base station, and calculate the power and/or power headroom report (PHR) value by using the methods described below in connection with the MPR capability class and/or the MPR capability class indication. It should be understood that this exemplary description is only for the purpose of brevity and avoiding redundancy, and is not intended to limit the embodiments to the following described ways.

A specific implementation of a determination method for the configured maximum output power is that a relaxed MPR value and/or MPR relax value or offset value corresponding to the MPR capability class is used to calculate, wherein the MPR relax value indicates an amount by which an MPR value may be relaxed. By relaxing the MPR, the user equipment may use lager transmission power to transmit uplink signals than the case without relaxing the MPR.

In an implementation, before the user equipment uses the relaxed MPR value and/or MPR relax value or offset value corresponding to the MPR capability class to calculate the configured maximum output power, the user equipment may report the MPR capability class of the user equipment, which is denoted as MPR-class. According to the foregoing description, it may be understood that the user equipment may also report other example parameters representing the power relax class. The MPR capability class indicates a degree to which the MPR value may be relaxed when the user equipment calculates the configured maximum output power. Specifically, the user equipment may calculate the configured maximum output power according to the relaxed MPR value and/or MPR relax value or offset value corresponding to the MPR capability class.

Refer to Table 1-Table 4 for the examples of the definitions and related values of the MPR capability class MPR-class, and the relationship between MPR-class and the relaxed MPR value or the MPR relax value or offset value, which are not repeated here.

In an implementation, for a certain MPR-class value, when the modulation mode, RB allocation mode and power class are the same: an MPR value corresponding to a carrier waveform of DFT-s-OFDM is smaller than that corresponding to a carrier waveform of CP-OFDM, so as to be suitable for higher PAPR characteristics of a signal when the carrier waveform is CP-OFDM; or the MPR relax value corresponding to the carrier waveform of DFT-s-OFDM is smaller than that corresponding to the carrier waveform of CP-OFDM, so as to be suitable for a case that the signal receiving quality may be better improved after the user equipment uses the CP-OFDM carrier waveform with a higher PAPR compared with the DFT-s-OFDM carrier waveform with a lower PAPR after using a better receiver algorithm, so that the MPR relax value may be larger when calculating the signal transmission power.

In an implementation, for a certain MPR-class value, when the carrier waveform, RB allocation mode and power class are the same, the larger an order of the modulation mode, the larger the MPR value, so that the nonlinear distortion caused by a high PAPR of the signal under high-order modulation is reduced.

In an implementation, for a certain MPR-class value, when the carrier waveform, modulation order and power class are the same, an MPR value for the outer RB allocation is larger than that for an RB allocation mode of inner RB allocation, and an MPR value for the edge RB allocation is the largest, so as to solve the problem that the closer to the edge, the greater the impact of out-of-band leakage.

In an implementation, when the carrier waveform, modulation mode, RB allocation mode and power class are the same, for different MPR-class values, the higher the MPR-class class, the smaller the corresponding MPR value. The higher the MPR-class class, the greater a degree to which the user equipment may relax the MPR value and the higher the transmission power.

In an implementation, a specific implementation in which the user equipment uses the MPR capability class to calculate the configured maximum output power is as follows:

The user equipment is allowed to set its configured maximum output power on a carrier f of a serving cell c in each slot. The configured maximum output power is denoted by $P_{CMAX,f,c}$, which is limited by two bounds: $P_{CMAX\_L,f,c} \leq P_{CMAX,f,c} \leq P_{CMAX\_H,f,c}$, and calculation formulas of a lower bound $P_{CMAX\_L,f,c}$ and an upper bound $P_{CMAX\_H,f,c}$ are respectively:

$$P_{CMAX\_L,f,c} = \text{MIN}\{P_{EMAX,c} - \Delta T_{C,c}, (P_{PowerClass} - \Delta P_{PowerClass}) - \text{MAX}(\text{MAX}(MPR_c + \Delta MPR_c, A\text{-}MPR_c) + \Delta T_{IB,c} + \Delta T_{C,c} + \Delta T_{RxSRS}, P\text{-}MPR)\}$$

$$P_{CMAX\_H,f,c} = \text{MIN}\{P_{EMAX,c}, P_{PowerClass} - \Delta P_{PowerClass}\}$$

where:

$P_{EMAX,c}$ is determined by high layer signaling "p-Max" or "NR-NS-PmaxList" in the serving cell c, where "p-Max" is used to limit uplink transmission power of the user equipment on a certain carrier frequency, referring to 3GPP TS38.331.

$P_{PowerClass}$ is maximum user equipment power corresponding to the power class regardless of tolerance;

$\Delta P_{PowerClass}$ is a maximum power offset corresponding to user equipment power class;

$\Delta T_{IB,c}$ is an extra tolerance related to carrier aggregation or band merging in the serving cell c;

$\Delta T_{C,c}$ is a tolerance related to transmission frequency band and transmission bandwidth in the serving cell c;

$MPR_c$ is a maximum output power reduction value related to parameters such as high-order modulation mode and transmission bandwidth configuration in the serving cell c, and is determined by the user equipment according to the MPR capability class, the MPR capability class may be determined according to the MPR capability class indication received from the base station, or preset. In addition, the user equipment may also report the MPR capability class, so that the base station transmits the MPR capability class indication;

$A\text{-}MPR_c$ is an extra maximum output power reduction value related to extra transmission demand in the serving cell c;

$\Delta MPR_c$ is an offset of a maximum output power reduction value related to relative channel bandwidth in the serving cell c;

$\Delta T_{RxSRS}$ is a power offset associated with SRS transmission;

P-MPR, is a maximum power reduction value for power management related to electromagnetic energy absorption of the serving cell c.

In an implementation, the method for acquiring the MPR value (e.g., MPR, in the above formula) by the user equipment may be that the user equipment directly acquires the MPR value according to the MPR capability class. Specifically, after determining the MPR capability class, the user equipment then determines the MPR value according to the carrier waveform, modulation mode, transmission bandwidth setting, power class and RB allocation mode. Referring to Table 2, when the MPR capability class is X, if the corresponding power class is Y, the carrier waveform is DFT-s-OFDM, the modulation mode is Pi/2 BPSK, and the RB allocation mode is the edge RB allocation, then the MPR value is $\leq x_1$ dB or is $x_1$ dB. When the MPR capability class is a specific MPR capability class, a default value is acquired for the MPR value without considering MPR relax.

In an implementation, the method for acquiring the MPR value by the user equipment may also be that the user equipment finds a corresponding MPR relax value according to the MPR capability class to determine the MPR value. The specific calculation method of acquiring the MPR value by the user equipment is a difference between a default MPR value and the MPR relax value, where the default MPR value is an MPR value acquired by the user equipment without considering MPR relax. After determining the MPR capability class, the user equipment then determines the MPR relax value according to the carrier waveform, modulation mode, transmission bandwidth setting, power class and RB allocation mode. As shown in Table 3, when the MPR capability class is class X, if a power class indication is Y, the carrier waveform is DFT-s-OFDM, the modulation mode is Pi/2 BPSK, and the RB allocation mode is the edge RB allocation, then the MPR relax value is $\Delta x_1$ dB, and the MPR value is $(X_1-\Delta x_1)$ dB, where $X_1$ is the default MPR value acquired by the user equipment without considering MPR relax when the power class indication is Y, the carrier waveform is DFT-s-OFDM, the modulation mode is Pi/2 BPSK, and the RB allocation mode is the edge RB allocation. When the MPR capability class is a specific MPR capability class, the MPR relax value is 0.

In an implementation, a specific implementation in which the user equipment uses the MPR capability class to calculate the configured maximum output power may also be:

$$P_{CMAX\_L,f,c}=\text{MIN}\{P_{EMAX,c}-\Delta T_{C,c},(P_{PowerClass}-\Delta P_{PowerClass})-\text{MAX}(\text{MAX}(MPR_c+\Delta MPR_c-MPR_{relax,c},A\text{-}MPR_c)+\Delta T_{IB,c}+\Delta T_{C,c}+\Delta T_{RxSRS},P\text{-}MPR_c)\}$$

$$P_{CMAX\_H,f,c}=\text{MIN}(P_{EMAX,c},P_{PowerClass}-\Delta P_{PowerClass})$$

where:

$P_{EMAX,c}$ is determined by high layer signaling "p-Max" or "NR-NS-PmaxList" in the serving cell c, where "p-Max" is used to limit uplink transmission power of the user equipment on a certain carrier frequency, referring to 3GPP TS38.331.

$P_{PowerClass}$ is maximum user equipment power corresponding to the power class regardless of tolerance;

$\Delta P_{PowerClass}$ is a maximum power offset corresponding to user equipment power class;

$\Delta T_{IB,c}$ is an extra tolerance related to carrier aggregation or band merging in the serving cell c;

$\Delta T_{C,c}$ is a tolerance related to transmission frequency band and transmission bandwidth in the serving cell c;

$MPR_c$ is a maximum output power reduction value related to high-order modulation mode and transmission bandwidth configuration in the serving cell c.

$A\text{-}MPR_c$ is an extra maximum output power reduction value related to extra transmission demand in the serving cell c;

$\Delta MPR_c$ is an offset of a maximum output power reduction value related to relative channel bandwidth in the serving cell c;

$\Delta T_{RxSRS}$ is a power offset associated with SRS transmission;

P-MPR$_c$ is a maximum power reduction value for power management related to electromagnetic energy absorption of the serving cell c.

$MPR_{relax,c}$ is an MPR relax value determined according to the MPR capability class in the serving cell c. In the following description, $MPR_{relax,c}$ is described as $MPR_{relax}$ for the sake of simplicity. The MPR capability class may be determined according to the MPR capability class indication received from the base station, or preset. In addition, the user equipment may also report the MPR capability class, so that the base station transmits the MPR capability class indication.

In an implementation, the method for acquiring the $MPR_{relax}$ by the user equipment may be that the user equipment directly acquires the MPR relax value according to the MPR capability class. Specifically, after determining the MPR capability class, the user equipment then determines the MPR relax value according to the carrier waveform, modulation mode, transmission bandwidth setting, power class and RB allocation mode. Referring to Table 2, when the MPR capability class is class X, if the corresponding power class is Y, the carrier waveform is DFT-s-OFDM, the modulation mode is Pi/2 BPSK, and the RB allocation mode is the edge RB allocation, then the MPR relax value is $\Delta x_1$ dB. Alternatively, referring to Table 4, when the MPR capability class is class 1, the MPR relax value is 0.5 dB.

When the MPR capability class is a specific MPR capability class, the MPR relax value is 0.

In an implementation, a specific implementation in which the user equipment uses the MPR capability class to calculate the configured maximum output power may also be:

$$P_{CMAX\_L,f,c} = \text{MIN}\{P_{EMAx,c} - \Delta T_{C,c}, (P_{PowerClass} - \Delta P_{PowerClass}) - \text{MAX}(\text{MAX}(MPR_c + \Delta MPR_c, A-MPR_c) - MPR_{offset,c} + \Delta T_{IB,c} + \Delta T_{C,c} + \Delta T_{RxSRS}, P-MPR_c)\}$$

$$P_{CMAX\_H,f,c} = \text{MIN}\{P_{EMAX,c}, P_{PowerClass} - \Delta P_{PowerClass}\}$$

where:

$P_{EMAX,c}$ is determined by high layer signaling "p-Max" or "NR-NS-PmaxList" in the serving cell c, where "p-Max" is used to limit uplink transmission power of the user equipment on a certain carrier frequency, referring to 3GPP TS38.331.

$P_{PowerClass}$ is maximum user equipment power corresponding to the power class regardless of tolerance;

$\Delta P_{PowerClass}$ is a maximum power offset corresponding to user equipment power class;

$\Delta T_{IB,c}$ is an extra tolerance related to carrier aggregation or band merging in the serving cell c;

$\Delta T_{C,c}$ is a tolerance related to transmission frequency band and transmission bandwidth in the serving cell c;

$MPR_c$ is a maximum output power reduction value related to high-order modulation mode and transmission bandwidth configuration in the serving cell c.

A-$MPR_c$ is an extra maximum output power reduction value related to extra transmission demand in the serving cell c;

$\Delta MPR_c$ is an offset of a maximum output power reduction value related to relative channel bandwidth in the serving cell c;

$\Delta T_{RxSRS}$ is a power offset associated with SRS transmission;

P-$MPR_c$ is a maximum power reduction value for power management related to electromagnetic energy absorption of the serving cell c.

$MPR_{offset,c}$ is an MPR offset value determined according to the MPR capability class in the serving cell c, and the MPR offset value may also be used to relax the MPR. Therefore, in the following description, $MPR_{offset,c}$ is described as an MPR relax value. In addition, in the following description, $MPR_{offset,c}$ is described as $MPR_{offset}$ for the sake of simplicity. The MPR capability class may be determined according to the MPR capability class indication received from the base station, or preset. In addition, the user equipment may also report the MPR capability class, so that the base station transmits the MPR capability class indication.

In an implementation, the method for acquiring the $MPR_{offset}$ by the user equipment may be that the user equipment directly acquires the MPR relax value according to the MPR capability class. Specifically, after determining the MPR capability class, the user equipment then determines the MPR relax value according to the carrier waveform, modulation mode, transmission bandwidth setting, power class and RB allocation mode. Referring to Table 3, when the MPR capability class is X, if the corresponding power class is Y, the carrier waveform is DFT-s-OFDM, the modulation mode is Pi/2 BPSK, and the RB allocation mode is the edge RB allocation, then the MPR relax value is $\Delta x_1$ dB. Alternatively, referring to Table 4, when the MPR capability class is class 1, the MPR relax value is 0.5 dB. When the MPR capability class is a specific MPR capability class, the MPR relax value is 0.

In an implementation, the user equipment may use the configured maximum transmission power offset corresponding to the configured maximum transmission power offset class (for example, it may be denoted by P-Max-offset) to calculate the configured maximum output power.

In an implementation, before the user equipment uses the configured maximum transmission power offset corresponding to the configured maximum transmission power offset class to calculate the configured maximum output power, the user equipment may report the configured maximum transmission power offset class, wherein the configured maximum transmission power may be denoted by $P_{EMAX}$. Therefore, in the following description, the configured maximum transmission power offset may also be expressed as $P_{EMAX}$ offset. The configured maximum transmission power offset class P-Max-offset refers to a degree to which the configured maximum transmission power may be relaxed when the user equipment calculates the configured maximum output power. Specifically, the user equipment may calculate the configured maximum output power according to the configured maximum transmission power offset corresponding to the configured maximum transmission power offset class.

Refer to Table 1-Table 4 for the examples of the definitions and related values of the configured maximum transmission power offset class P-Max-offset, and the relationship between P-Max-offset and the $P_{EMAX}$ offset, which are not repeated here.

In an implementation, a specific implementation in which the user equipment uses the $P_{EMAX}$ offset to calculate the configured maximum output power may be that a formula containing $\Delta P_{EMAX}$ is used to calculate the configured maximum output power, where a value of $\Delta P_{EMAX}$ is determined by a $P_{EMAX}$ offset class. In an implementation, $P_{EMAX}$ is valid when the user equipment reports a P-Max-offset capability and the user equipment is configured with a $P_{EMAX}$ offset indication, otherwise, the value is 0. When the user equipment determines the value of $\Delta P_{EMAX}$, the calculation method of the configured maximum output power is as follows:

The user equipment is allowed to set its configured maximum output power on a carrier f of a serving cell c in each slot. The configured maximum output power is denoted by $P_{CMAX,f,c}$, which is limited by two bounds: $P_{CMAX\_L,f,c} \leq P_{CMAX,f,c} \leq P_{CMAX\_H,f,c}$, and calculation formulas of a lower bound $P_{CMAX\_L,f,c}$ and an upper bound $P_{CMAX\_H,f,c}$ are respectively:

$$P_{CMAX\_L,f,c} = \text{MIN}\{P_{EMAX,c} + \Delta P_{EMAX,c} - \Delta T_{C,c}, (P_{PowerClass} - \Delta P_{PowerClass}) - \text{MAX}(\text{MAX}(MPR_c + \Delta MPR_c, A-MPR_c) + \Delta T_{IB,c} + \Delta T_{C,c} + \Delta_{RxSRS}, P-MPR_c)\}$$

$$P_{CMAX\_H,f,c} = \text{MIN}\{P_{EMAX,c} + \Delta P_{EMAX,c}, P_{PowerClass} - \Delta P_{PowerClass}\}$$

where:

$P_{EMAX,c}$ is determined by high layer signaling "p-Max" or "NR-NS-PmaxList" in the serving cell c, where "p-Max" is used to limit uplink transmission power of the user equipment on a certain carrier frequency, referring to 3GPP TS38.331.

$\Delta P_{EMAX,c}$ indicates a $P_{EMAX}$ offset, which may be determined by the configured maximum transmission power offset class in the serving cell c, where the configured maximum transmission power offset class may be determined according to a configured maximum transmission power offset class indication received from the base station, or preset. In addition, the user equipment may also report the configured maximum transmission power offset class, so that the base station transmits the configured maximum transmission power offset class indication. For the sake of simplicity, $\Delta P_{EMAX,c}$ is described as $\Delta P_{EMAX}$;

$P_{PoweClass}$ is maximum user equipment power corresponding to the power class regardless of tolerance;

$\Delta P_{PowerClass}$ is a maximum power offset corresponding to user equipment power class;

$\Delta T_{IB,c}$ is an extra tolerance related to carrier aggregation or band merging in the serving cell c;

$\Delta T_{C,c}$ is a tolerance related to transmission frequency band and transmission bandwidth in the serving cell c;

MPR is a maximum output power reduction value related to high-order modulation mode and transmission bandwidth configuration in the serving cell c.

A-MPR$_c$ is an extra maximum output power reduction value related to extra transmission demand in the serving cell c;

$\Delta MPR_c$ is an offset of a maximum output power reduction value related to relative channel bandwidth in the serving cell c;

$\Delta T_{RxSRS}$ is a power offset associated with SRS transmission;

P-MPR$_c$ is a maximum power reduction value for power management related to electromagnetic energy absorption of the serving cell c.

In an implementation, a specific implementation in which the user equipment uses the $P_{EMAX}$ offset to calculate the configured maximum output power may also be that $P_{EMAX}$ used when participating in the calculation of the configured maximum output power is acquired by using the $P_{EMAX}$ offset. The user equipment may determine the configured maximum transmission power offset, which is denoted by $\Delta P_{EMAX}$, according to the $P_{EMAX}$ offset class. The specific calculation method for acquiring the $P_{EMAX}$ by the user equipment is a sum of $\Delta P_{EMAX}$ and a configured maximum transmission power value ($P_{EMAX}$) acquired without considering power relax. The $P_{EMAX}$ offset class may be determined by the user equipment according to a $P_{EMAX}$ offset class indication received from the base station, or preset. In addition, the user equipment may also report the $P_{EMAX}$ offset class, so that the base station transmits the $P_{EMAX}$ offset class indication. In an implementation, $P_{EMAX}$ is valid when the user equipment reports the P-Max-offset capability and the user equipment is configured with the $P_{EMAX}$ offset indication, otherwise, the value is 0.

When the value of $P_{EMAX}$ is determined by the user equipment, the calculation method of the maximum output power is as follows:

The user equipment is allowed to set its configured maximum output power on a carrier f of a serving cell c in each slot. The configured maximum output power is denoted by $P_{CMAX\_L,f,c}$, which is limited by two bounds: $P_{CMAX\_L,f,c} \le P_{CMAXf,c} \le P_{CMAX\_H,f,c}$, and calculation formulas of a lower bound $P_{CMAX\_L,f,c}$ and an upper bound $P_{CMAX,f,c}$ are respectively:

$$P_{CMAX\_L,f,c} = MIN\{P_{EMAX,c} - \Delta T_{C,c}, (P_{PowerClass} - \Delta P_{PowerClass}) - MAX(MAX(MPR_c + \Delta MPR_c, A\text{-}MPR_c) + \Delta T_{IB,c} + \Delta T_{C,c} + \Delta_{RxSRS}, P\text{-}MPR_c)\}$$

$$P_{CMAX\_H,f,c} = MIN\{P_{EMAX,c}, P_{PowerClass} - \Delta P_{PowerClass}\}$$

where:

$P_{EMAX,c}$ is determined by high layer signaling "p-Max" or "NR-NS-PmaxList" in the serving cell c and by the $P_{EMAX}$ offset indication in the serving cell c, where "p-Max" is used to limit uplink transmission power of the user equipment on a certain carrier frequency, referring to 3GPP TS38.331, and $P_{EMAX,c}$ is described as $P_{EMAX}$ for the sake of simplicity.

$P_{PowerClass}$ is maximum user equipment power corresponding to the power class regardless of tolerance;

$\Delta P_{PowerClass}$ is a maximum power offset corresponding to user equipment power class;

$\Delta T_{IB,c}$ is an extra tolerance related to carrier aggregation or band merging in the serving cell c;

$A\tau_{C,c}$ is a tolerance related to transmission frequency band and transmission bandwidth in the serving cell c;

MPR is a maximum output power reduction value related to high-order modulation mode and transmission bandwidth configuration in the serving cell c.

A-MPR$_c$ is an extra maximum output power reduction value related to extra transmission demand in the serving cell c;

$\Delta MPR_c$ is an offset of a maximum output power reduction value related to relative channel bandwidth in the serving cell c;

$\Delta T_{RxSRS}$ is a power offset associated with SRS transmission;

P-MPR$_c$ is a maximum power reduction value for power management related to electromagnetic energy absorption of the serving cell c.

In an implementation, the user equipment may use a corrected value of the maximum power offset corresponding to the power class that corresponds to a corrected value class of the maximum power offset corresponding to the power class to calculate the configured maximum output power of the user equipment.

In an implementation, before the user equipment uses the corrected value of the maximum power offset corresponding to the power class that corresponds to the corrected value class of the maximum power offset corresponding to the power class to calculate the configured maximum output power, the user equipment may report a capability class related to the corrected value of the maximum power offset corresponding to the power class, which may be denoted, for example, by DeltaP-PowerClass-offset, and the maximum power offset corresponding to the power class may be denoted, for example, by $\Delta P_{PowerClass}$. In the following description, the capability class related to the corrected value of the maximum power offset corresponding to the power class is also exemplarily denoted as a $\Delta P_{PowerClass}$ corrected value class, and it should be understood that this is exemplary and is not intended to be limiting. The $\Delta P_{PowerClass}$ corrected value class refers to a degree to which the maximum power offset corresponding to the power class may be relaxed when the user equipment calculates the configured maximum output power.

Refer to Table 1-Table 4 for the examples of the definitions and related values of DeltaP-PowerClass-offset, and the relationship between DeltaP-PowerClass-offset and the $\Delta P_{PowerClass}$ corrected value, which are not repeated here.

In an implementation, a specific implementation in which the user equipment uses the $\Delta P_{PowerClass}$ corrected value to calculate the configured maximum output power may be that a formula containing the $\Delta P_{PowerClass}$ corrected value (for example, it may be denoted as $\Delta P_{PowerClassOffset}$) is used to calculate the configured maximum output power, where a value of $\Delta P_{PowerClassOffset}$ is obtained by an operation (for example, taking negation) of the $\Delta P_{PowerClass}$ corrected value corresponding to the $\Delta P_{PowerClass}$ corrected value class. In an implementation, it is valid when the user equipment reports a DeltaP-PowerClass-offset capability and the user equipment is configured with a $\Delta P_{PowerClass}$ corrected value indication, otherwise, the value is 0.

When the user equipment determines the value of $\Delta P_{PowerClassOffset}$, the calculation method of the maximum output power is as follows:

The user equipment is allowed to set its configured maximum output power on a carrier f of a serving cell c in each slot. The configured maximum output power is denoted by $P_{CMAX,f,c}$, which is limited by two bounds: $P_{CMAX\_L,f,c} \leq P_{CMAX,f,c} \leq P_{CMAX\_H,f,c}$, and calculation formulas of a lower bound $P_{CMAX\_L,f,c}$ and an upper bound $P_{CMAX\_H,f,c}$ are respectively:

$$P_{CMAX\_L,f,c} = \mathrm{MIN}\{P_{EMAX,c} - \Delta\Delta T_{C,c}, (P_{PowerClass} - \Delta P_{PowerClass} - \Delta P_{PowerClassOffset}) - \mathrm{MAX}(\mathrm{MAX}(MPR_c + \Delta MPR_c, A\text{-}MPR_c) + \Delta T_{IB,c} + \Delta T_{C,c} + \Delta T_{RxSRS}, P\text{-}MPR_c)\}$$

$$P_{CMAX\_H,f,c} = \mathrm{MIN}\{P_{EMAX,c}, P_{PowerClass} - \Delta P_{PowerClass} - \Delta P_{PowerClassOffset}\}$$

where:

$P_{EMAX,c}$ is determined by high layer signaling "p-Max" or "NR-NS-PmaxList" in the serving cell c, where "p-Max" is used to limit uplink transmission power of the user equipment on a certain carrier frequency, referring to 3GPP TS38.331.

$P_{PowerClass}$ is maximum user equipment power corresponding to the power class regardless of tolerance;

$\Delta P_{PowerClass}$ is a maximum power offset corresponding to user equipment power class;

$\Delta T_{IB,c}$ is an extra tolerance related to carrier aggregation or band merging in the serving cell c;

$\Delta_{C,c}$ is a tolerance related to transmission frequency band and transmission bandwidth in the serving cell c;

$MPR_c$ is a maximum output power reduction value related to high-order modulation mode and transmission bandwidth configuration in the serving cell c.

$A\text{-}MPR_c$ is an extra maximum output power reduction value related to extra transmission demand in the serving cell c;

$\Delta MPR_c$ is an offset of a maximum output power reduction value related to relative channel bandwidth in the serving cell c:

$\Delta T_{RxSRS}$ is a power offset associated with SRS transmission;

$P\text{-}MPR_c$ is a maximum power reduction value for power management related to electromagnetic energy absorption of the serving cell c.

$\Delta P_{PowerClassOffset}$ is the corrected value of the maximum power offset corresponding to the power class of the user equipment, which is obtained by taking negation of the $\Delta P_{PowerClass}$ corrected value corresponding to the $\Delta P_{PowerClass}$ corrected value class. The $\Delta P_{PowerClass}$ corrected value class may be determined by the user equipment according to a $\Delta P_{PowerClass}$ corrected value class indication received from the base station, or preset. In addition, the user equipment may also report the $\Delta P_{PowerClass}$ corrected value class, so that the base station transmits the $\Delta P_{PowerClass}$ corrected value class indication.

In an implementation, a specific implementation in which the user equipment uses the $\Delta P_{PowerClass}$ corrected value to calculate the configured maximum output power may also be that the user equipment uses the $\Delta P_{PowerClass}$ corrected value class to acquire $\Delta P_{PowerClass}$ used when participating in the calculation of the configured maximum transmission power. The user equipment determines the maximum power offset $\Delta P_{PowerClass}$ corresponding to the power class in the calculation formula of the configured maximum output power according to the $\Delta P_{PowerClass}$ corrected value class. The specific calculation method for acquiring the $\Delta P_{PowerClass}$ by the user equipment is a difference between $\Delta P_{PowerClass}$ acquired without considering power relax and the $\Delta P_{PowerClass}$ corrected value corresponding to the $\Delta P_{PowerClass}$ corrected value class. In an implementation, when the user equipment reports the DeltaP-PowerClass-offset capability and the user equipment is configured with the $\Delta P_{PowerClass}$ corrected value indication, the calculation method of the $\Delta P_{PowerClass}$ is valid, otherwise, the $\Delta P_{PowerClass}$ is acquired without considering power relax.

When the user equipment determines the value of $\Delta P_{PowerClass}$, the calculation method of the configured maximum output power is as follows:

The user equipment is allowed to set its configured maximum output power on a carrier f of a serving cell c in each slot. The configured maximum output power is denoted by $P_{CMAX,f,c}$, which is limited by two bounds: $P_{CMAX\_L,f,c} \leq P_{CMAX,f,c} \leq P_{CMAX\_H,f,c}$, and calculation formulas of a lower bound $P_{CMAX\_L,f,c}$ and an upper bound $P_{CMAX\_H,f,c}$ are respectively.

$$P_{CMAX\_L,f,c} = \mathrm{MIN}\{P_{EMAX,c} - \Delta T_{C,c}, (P_{PowerClass} - \Delta P_{PowerClass}) - \mathrm{MAX}(\mathrm{MAX}(MPR_c + \Delta MPR_c, A\text{-}MPR_c) + \Delta T_{IB,c} + \Delta T_{C,c} + \Delta_{RxSRS}, P\text{-}MPR_c)\}$$

$$P_{CMAX\_H,f,c} = \mathrm{MIN}\{P_{EMAX,c}, P_{PowerClass} - \Delta P_{PowerClass}\}$$

where:

$P_{EMAX,c}$ is determined by high layer signaling "p-Max" or "NR-NS-PmaxList" in the serving cell c, where "p-Max" is used to limit uplink transmission power of the user equipment on a certain carrier frequency, referring to 3GPP TS38.331.

$P_{PowerClass}$ is maximum user equipment power corresponding to the power class regardless of tolerance;

$\Delta P_{PowerClass}$ is a maximum power offset corresponding to the power class determined by the $\Delta P_{PowerClass}$ corrected value class, which may be determined by the user equipment according to the $\Delta P_{PowerClass}$ corrected value class indication received from the base station, or preset. In addition, the user equipment may also report the $\Delta P_{PowerClass}$ corrected value class, so that the base station transmits the $\Delta P_{PowerClass}$ corrected value class indication;

$\Delta T_{IB,c}$ is an extra tolerance related to carrier aggregation or band merging in the serving cell c;

$\Delta T_{C,c}$ is a tolerance related to transmission frequency band and transmission bandwidth in the serving cell c;

$MPR_c$ is a maximum output power reduction value related to high-order modulation mode and transmission bandwidth configuration in the serving cell c.

$A\text{-}MPR_c$ is an extra maximum output power reduction value related to extra transmission demand in the serving cell c;

$\Delta MPR_c$ is an offset of a maximum output power reduction value related to relative channel bandwidth in the serving cell c;

$\Delta T_{RxSRS}$ is a power offset associated with SRS transmission;

$P\text{-}MPR_c$ is a maximum power reduction value for power management related to electromagnetic energy absorption of the serving cell c.

In an implementation, there is an association between the configured maximum transmission power offset and the corrected value of the maximum power offset corresponding to the power class, which is: the $P_{EMAX}$ offset corresponding to the configured maximum transmission power offset class P-Max-offset of the user equipment corresponds to and/or is equal to the $\Delta P_{PowerClass}$ corrected value corresponding to the corrected value class of the maximum power offset corresponding to the power class deltaP-PowerClass-offset. When the user equipment reports any one of the P-Max-offset and/or DeltaP-PowerClass-offset capabilities, if there is any capability that is not reported, it may be considered that the capability that is not reported is the same as the reported capability. When the user equipment acquires any one of the $P_{EMAX}$ offset indication and/or the $\Delta P_{PowerClass}$ corrected value indication from the base station, if there is any indication that is not acquired, a value indicated by the indication that is not acquired in this situation corresponds to or is the same as that indicated by the acquired indication.

As shown in Table 20, when P-Max-offset reported by the user equipment is X, the corresponding deltaP-PowerClass-offset of the user equipment is also X. When the $P_{EMAX}$ offset indication acquired by the user equipment from the base station is X, the corresponding $\Delta P_{PowerClass}$ corrected value indication is also X. If the corresponding power class is Y, the carrier waveform is DFT-s-OFDM, the modulation mode is Pi/2 BPSK, and the RB allocation mode is the edge RB allocation, then the $P_{EMAX}$ offset is $\leq x_1$ or is $x_1$ dB, and the $\Delta P_{PowerClass}$ corrected value is also $\leq x_1$ or is $x_1$ dB.

TABLE 20

Relationship between $P_{EMAX}$ offset and $\Delta P_{PowerClass}$ Corrected value when P-Max-offset reported by user equipment is X (deltaP-PowerClass-offset is also X) when power class is Y

| | | $P_{EMAX}$ offset/$\Delta P_{PowerClass}$ corrected value (dB) | | |
|---|---|---|---|---|
| modulation mode | | edge RB allocation | outer RB allocation | inner RB allocation |
| DFT-S-OFDM | Pi/2 BPSK | $\leq x_1$ or $x_1$ | $\leq x_2$ or $x_2$ | $\leq x_3$ or $x_3$ |
| | QPSK | $\leq x_4$ or $x_4$ | $\leq x_5$ or $x_5$ | $\leq x_6$ or $x_6$ |
| | 16 QAM | $\leq x_7$ or $x_7$ | $\leq x_8$ or $x_8$ | $\leq x_9$ or $x_9$ |
| | 64 QAM | $\leq x_{10}$ or $x_{10}$ | $\leq x_{11}$ or $x_{11}$ | $\leq x_{12}$ or $x_{12}$ |
| | 256 QAM | $\leq x_{13}$ or $x_{13}$ | $\leq x_{14}$ or $x_{14}$ | $\leq x_{15}$ or $x_{15}$ |
| | 1024QAM | $\leq x_{16}$ or $x_{16}$ | $\leq x_{17}$ or $x_{17}$ | $\leq x_{18}$ or $x_{18}$ |
| CP-OFDM | QPSK | $\leq x_{19}$ or $x_{19}$ | $\leq x_{20}$ or $x_{20}$ | $\leq x_{21}$ or $x_{21}$ |
| | 16 QAM | $\leq x_{22}$ or $x_{22}$ | $\leq x_{23}$ or $x_{23}$ | $\leq x_{24}$ or $x_{24}$ |
| | 64 QAM | $\leq x_{25}$ or $x_{25}$ | $\leq x_{26}$ or $x_{26}$ | $\leq x_{27}$ or $x_{27}$ |
| | 256 QAM | $\leq x_{28}$ or $x_{28}$ | $\leq x_{29}$ or $x_{29}$ | $\leq x_{30}$ or $x_{30}$ |
| | 1024QAM | $\leq x_{31}$ or $x_{31}$ | $\leq x_{32}$ or $x_{32}$ | $\leq x_{33}$ or $x_{33}$ |

Specifically, when there are no specific requirements for the modulation mode, RB allocation mode, carrier waveform and power class, a specific implementation of the corresponding relationship between the $P_{EMAX}$ offset corresponding to the configured maximum transmission power offset class P-Max-offset received by the user equipment and the $\Delta P_{PowerClass}$ corrected value corresponding to the corrected value class of the maximum power offset corresponding to the power class deltaP-PowerClass-offset is shown in Table 21. When P-Max-offset reported by the user equipment is 3, the corresponding DeltaP-PowerClass-offset capability is also 3 in this situation, that is, the $P_{EMAX}$ offset is 1.5 dB and the $\Delta P_{PowerClass}$ corrected value is also 1.5 dB in this situation. When the $P_{EMAX}$ offset indication acquired by the user equipment from the base station is 2, the corresponding $\Delta P_{PowerClass}$ Corrected value indication is also 2.

TABLE 21

Relationship between $P_{EMAX}$ Offset and $\Delta P_{PowerClass}$ Corrected value

| P-Max-offset/ DeltaP-PowerClass-offset | $P_{EMAX}$ offset/ $\Delta P_{PowerClass}$ corrected value |
|---|---|
| 0 | 0 dB |
| 1 | 0.5 dB |
| 2 | 1 dB |
| 3 | 1.5 dB |
| . . . | . . . |

In an implementation, the user equipment may use a maximum output power limit offset corresponding to a maximum output power limit offset class to calculate the configured maximum output power.

In an implementation, before the user equipment uses the maximum output power limit offset corresponding to the maximum output power limit offset class to calculate the configured maximum output power, the user equipment may report the maximum output power limit offset class of the user equipment in advance. The maximum output power limit offset includes at least one of the following parameters: maximum output power high limit offset, maximum output power low limit offset, and maximum output power high and low limit offset. The maximum output power high limit offset, the maximum output power low limit offset, and the maximum output power high and low limit offset may be denoted by deltaPc-limit-H, deltaPc-limit-L and deltaPc-limit, respectively. The deltaPc-limit-H and/or deltaPc-limit-L and/or deltaPc-limit refers to a degree to which a maximum output power high limit, maximum output power low limit, and maximum output power high and low limit may be relaxed when the user equipment calculates the configured maximum output power.

Refer to Table 1-Table 4 for the examples of the definitions and related values of deltaPc-limit-H, deltaPc-limit-L or deltaPc-limit, as well as examples of deltaPc-limit-H and the maximum output power high limit offset, deltaPc-limit-L and the maximum output power low limit offset, and deltaPc-limit and the maximum output power high and low limit offset, which are not described here.

In an implementation, a specific implementation in which the user equipment uses the maximum output power high limit offset and/or the maximum output power low limit offset and/or the maximum output power high and low limit offset to calculate the configured maximum output power may be that a formula containing $\Delta T_{E.H}$ and/or $\Delta T_{E.L}$ and/or $\Delta T_E$ is used to calculate the configured maximum output power. A value of $\Delta T_{E.H}$ is determined by the maximum output power high limit offset corresponding to the maximum output power high limit offset class, a value of $\Delta T_{E.L}$ is determined by the maximum output power low limit offset corresponding to the maximum output power low limit offset class, and a value of $\Delta T_E$ is determined by the maximum output power high and low limit offset corresponding to the maximum output power high and low limit offset class. In an implementation, $\Delta T_{E.H}$ and/or $\Delta T_{E.L}$ and/or $\Delta T_E$ are valid when the user equipment reports a deltaPc-limit-H and/or deltaPc-limit-L and/or deltaPc-limit capability and the user equipment is configured with a maximum output power high limit offset indication and/or a maximum output power low limit offset indication and/or a maximum output power high and low limit offset indication, otherwise, the value is 0.

When the user equipment determines the value of $\Delta T_{E.\,H}$ and/or $\Delta T_{E.\,L}$ and/or $\Delta T_E$ (details of $\Delta T_{E.\,H}$ and/or $\Delta T_{E.\,L}$ and/or $\Delta T_E$ are given later) according to deltaPc-limit-H, deltaPc-limit-L or deltaPc-limit, the calculation method of the maximum output power is as follows:

The user equipment is allowed to set its configured maximum output power on a carrier f of a serving cell c in each slot. The configured maximum output power is denoted by $P_{CMAX,f,c}$, which is limited by two bounds: $P_{CMAX\_L,f,c} \leq P_{CMAX,f,c} \leq P_{CMAX\_H,f,c}$.

A specific embodiment of calculation formulas of a lower bound $P_{CMAX\_L,f,c}$ and an upper bound $P_{CMAX\_H,f,c}$ may be:

$$P_{CMAX\_L,f,c}=\mathrm{MIN}\{P_{EMAX,c}-\Delta T_{C,c}(P_{PowerClass}-\Delta P_{PowerClass})-\mathrm{MAX}(\mathrm{MAX}(MPR_c+\Delta MPR_c,A-MPR_c)+\Delta T_{IB,c}+\Delta T_{C,c}+\Delta_{RxSRS},P\text{-}MPR_c)\}+\Delta T_{E.\,H}$$

$$P_{CMAX\_H,f,c}=\mathrm{MIN}\{P_{EMAX,c},P_{PowerClass}-\Delta P_{PowerClass}\}$$

A specific embodiment of the calculation formulas of the lower bound $P_{CMAX\_L,f,c}$ and the upper bound $P_{CMAX\_H,f,c}$ may also be:

$$P_{CMAX\_L,f,c}=\mathrm{MIN}\{P_{EMAX,c}-\Delta T_{C,c}(P_{PowerClass}-\Delta P_{PowerClass})-\mathrm{MAX}(\mathrm{MAX}(MPR_c+\Delta MPR_c,A-MPR_c)+\Delta T_{IB,c}+\Delta T_{C,c}+\Delta_{RxSRS},P\text{-}MPR_c)\}$$

$$P_{CMAX\_H,f,c}=\mathrm{MIN}\{P_{EMAX,c},P_{PowerClass}-\Delta P_{PowerClass}\}+\Delta T_{E.\,L}$$

A specific embodiment of the calculation formulas of the lower bound $P_{CMAX\_L,f,c}$ and the upper bound $P_{CMAX\_H,f,c}$ may also be:

$$P_{CMAX\_L,f,c}=\mathrm{MIN}\{P_{EMAX,c}-\Delta T_{C,c}(P_{PowerClass}-\Delta P_{PowerClass})-\mathrm{MAX}(\mathrm{MAX}(MPR_c+\Delta MPR_c,A-MPR_c)+\Delta T_{IB,c}+\Delta T_{C,c}+\Delta_{RxSRS},P\text{-}MPR_c)\}+\Delta T_{E.\,H}$$

$$P_{CMAX\_H,f,c}=\mathrm{MIN}\{P_{EMAX,c},P_{PowerClass}-\Delta P_{PowerClass}\}+\Delta T_{E.\,L}$$

A specific embodiment of the calculation formulas of the lower bound $P_{CMAX\_L,f,c}$ and the upper bound $P_{CMAX\_H,f,c}$ may also be:

$$P_{CMAX\_L,f,c}=\mathrm{MIN}\{P_{EMAX,c}-\Delta T_{C,c}(P_{PowerClass}-\Delta P_{PowerClass})-\mathrm{MAX}(\mathrm{MAX}(MPR_c+\Delta MPR_c,A-MPR_c)+\Delta T_{IB,c}+\Delta T_{C,c}+\Delta_{RxSRS},P\text{-}MPR_c)\}+\Delta T_E$$

$$P_{CMAX\_H,f,c}=\mathrm{MIN}\{P_{EMAX,c},P_{PowerClass}-\Delta P_{PowerClass}\}+\Delta T_E$$

where:

$P_{EMAX,c}$ is determined by high layer signaling "p-Max" or "NR-NS-PmaxList" in the serving cell c, where "p-Max" is used to limit uplink transmission power of the user equipment on a certain carrier frequency, referring to 3GPP TS38.331.

$P_{PowerClass}$ is maximum user equipment power corresponding to the power class regardless of tolerance;

$\Delta P_{PowerClass}$ is a maximum power offset corresponding to user equipment power class;

$\Delta T_{IB,c}$ is an extra tolerance related to carrier aggregation or band merging in the serving cell c;

$\Delta T_{C,c}$ is a tolerance related to transmission frequency band and transmission bandwidth in the serving cell c;

$MPR_c$ is a maximum output power reduction value related to high-order modulation mode and transmission bandwidth configuration in the serving cell c.

$A\text{-}MPR_c$ is an extra maximum output power reduction value related to extra transmission demand in the serving cell c;

$\Delta MPR_c$ is an offset of a maximum output power reduction value related to relative channel bandwidth in the serving cell c, $\Delta T_{RxSRS}$ is a power offset associated with SRS transmission;

$P\text{-}MPR_c$ is a maximum power reduction value for power management related to electromagnetic energy absorption of the serving cell c.

$\Delta T_{E.\,H}$ indicates a maximum output power high limit offset, which is determined by the maximum output power high limit offset corresponding to the maximum output power high limit offset class; the maximum output power high limit offset class may be determined according to a maximum output power high limit offset class indication received from the base station, or preset. In addition, the user equipment may also report the maximum output power high limit offset class, so that the base station transmits the maximum output power high limit offset class indication;

$\Delta T_{E.\,L}$ indicates a maximum output power low limit offset, which is determined by the maximum output power low limit offset corresponding to the maximum output power low limit offset class; the maximum output power low limit offset class may be determined according to a maximum output power low limit offset class indication received from the base station, or preset. In addition, the user equipment may also report the maximum output power low limit offset class, so that the base station transmits the maximum output power low limit offset class indication;

$\Delta T_E$ indicates a maximum output power high and low limit offset, which is determined by the maximum output power high and low limit offset corresponding to the maximum output power high and low limit offset class; the maximum output power high and low limit offset class may be determined according to a maximum output power high and low limit offset class indication received from the base station, or preset. In addition, the user equipment may also report the maximum output power high and low limit offset class, so that the base station transmits the maximum output power high and low limit offset class indication.

In an implementation, $P_{CMAX}$ calculated by the user equipment needs to satisfy $P_{CMAX} \leq P_{EMAX}$, in order to satisfy that the maximum output power calculated by the user equipment is not higher than maximum transmission power configured to the user equipment by the base station.

In an implementation, the user equipment may use the maximum output power offset corresponding to the maximum output power offset class to calculate the configured maximum output power.

In an implementation, before the user equipment uses the maximum output power offset corresponding to the maximum output power offset class to calculate the configured maximum output power, the user equipment may report the maximum output power offset class of the user equipment, which is denoted by Pcmax-offset. The Pcmax-offset refers to a degree to which the maximum output power may be relaxed when the user equipment calculates the configured maximum output power. In an implementation, a specific implementation in which the user equipment uses the maximum output power offset to calculate the configured maximum output power may be that a formula containing $\Delta P_{CMAX}$ is used to calculate the configured maximum output power, where a value of $\Delta P_{CMAX}$ is determined by the maximum output power offset corresponding to the maximum output power offset class. In an implementation, $\Delta P_{CMAX}$ is valid when the user equipment reports a Pcmax-offset capability and the user equipment is configured with a maximum output power offset class indication, otherwise, the value is 0. The calculation method of the configured maximum output power with $\Delta P_{CMAX}$ is as follows:

The user equipment is allowed to set its configured maximum output power on a carrier f of a serving cell c in each slot. The configured maximum output power is denoted by $P_{CMAX,f,c} + \Delta P_{CMAX,f,c}$, wherein $P_{CMAX,f,c}$ is limited by two bounds: $P_{CMAX\_L,f,c} \leq P_{CMAX,f,c} \leq P_{CMAX\_H,f,c}$, and calculation formulas of a lower bound $P_{CMAX\_L,f,c}$ and an upper bound $P_{CMAX\_H,f,c}$ are respectively:

$$P_{CMAX\_L,f,c} = \text{MIN}\{P_{EMAX,c} - \Delta T_{C,c}, (P_{PowerClass} - \Delta P_{PowerClass}) - \text{MAX}(\text{MAX}(MPR_c + \Delta MPR_c, A\text{-}MPR_c) + \Delta T_{IB,c} + \Delta T_{C,c} + \Delta_{RxSRS}, P\text{-}MPR_c)\}$$

$$P_{CMAX\_H,f,c} = \text{MIN}\{P_{EMAX,c}, P_{PowerClass} - \Delta P_{PowerClass}\}$$

The configured maximum output power $P_{CMAX,f,c}$ satisfies $$P_{CMAX,f,c} + \Delta P_{CMAX,f,c} \leq P_{EMAX,c}$$

where:

$P_{EMAX,c}$ is determined by high layer signaling "p-Max" or "NR-NS-PmaxList" in the serving cell c, where "p-Max" is used to limit uplink transmission power of the user equipment on a certain carrier frequency, referring to 3GPP TS38.331.

$P_{PowerClass}$ is maximum user equipment power corresponding to the power class regardless of tolerance;

$\Delta P_{PowerClass}$ is a maximum power offset corresponding to user equipment power class;

$\Delta T_{IB,c}$ is an extra tolerance related to carrier aggregation or band merging in the serving cell c;

$\Delta T_{C,c}$ is a tolerance related to transmission frequency band and transmission bandwidth in the serving cell c;

$MPR_c$ is a maximum output power reduction value related to high-order modulation mode and transmission bandwidth configuration in the serving cell c.

$A\text{-}MPR_c$ is an extra maximum output power reduction value related to extra transmission demand in the serving cell c;

$\Delta MPR_c$ is an offset of a maximum output power reduction value related to relative channel bandwidth in the serving cell c;

$\Delta T_{RxSRS}$ is a power offset associated with SRS transmission;

$P\text{-}MPR_c$ is a maximum power reduction value for power management related to electromagnetic energy absorption of the serving cell c.

$\Delta P_{CMAX,f,c}$ is a maximum output power offset on a carrier f of the serving cell c determined according to the maximum output power offset class, which may be determined by the user equipment according to the maximum output power offset class indication received from the base station, or preset. In addition, the user equipment may also report the maximum output power offset class, so that the base station transmits the maximum output power offset class indication. For the sake of simplicity, $\Delta P_{CMAX,f,c}$ is described as $\Delta P_{CMAX}$.

Based on the calculated configured maximum output power value, the user equipment may acquire the corresponding transmission power and/or power headroom report value, so that the base station may schedule to support the user equipment to transmit signals with higher power. In an implementation, the user equipment will also report whether the transmission power and/or power headroom report value calculated by the default power relax parameter or the transmission power and/or power headroom report value calculated according to the power relax parameter acquired from the base station is used in this situation. Specifically, the calculation and selection method of the transmission power and/or power headroom report value may be represented by two states, which correspond to a calculation method used for the transmission power in this situation, respectively. In particular, these two states may be represented by states 0 and 1 with 1-bit data, respectively. For example, one of states 0 and 1 indicates that the user equipment uses the transmission power and/or power headroom report value calculated according to the default power relax parameter in this situation, and the other of states 0 and 1 indicates that the user equipment uses the transmission power and/or power headroom report value calculated according to the power relax parameter acquired from the base station in this situation.

In an implementation, the transmission power of a uplink shared channel may be determined by the user equipment according to at least one of the following parameters: transmission power calculation offset class, expected received power offset class, and capability class related to TPC command.

In an implementation, the user equipment may use the transmission power calculation offset corresponding to the transmission power calculation offset class to calculate the transmission power of a uplink shared channel.

In an implementation, before the user equipment uses the transmission power calculation offset corresponding to the transmission power calculation offset class to calculate the transmission power of the uplink shared channel, the user equipment may report a capability class related to the transmission power calculation offset of the user equipment, which may be denoted, for example, by P-cal-offset. The P-cal-offset indicates a degree to which the transmission power may be relaxed when the user equipment calculates the transmission power. Refer to Table 1-Table 4 for the examples of the definitions and related values of P-cal-offset, and the relationship between P-cal-offset and the related values of the transmission power calculation offset, which are not repeated here.

In an implementation, a specific implementation in which the user equipment uses the transmission power calculation offset to calculate the transmission power of the uplink shared channel may be that a formula containing S is used to calculate the transmission power of the uplink shared channel, where a value of δ is determined through the transmission power calculation offset corresponding to the transmission power calculation offset class. In an implementation, δ is valid when the user equipment reports a P-cal-offset capability and the user equipment is configured with a transmission power calculation offset indication, otherwise, the value is 0.

When the user equipment determines the transmission power calculation offset, the calculation method of the transmission power of the uplink shared channel is as follows:

When the user equipment performs PUSCH transmission on an active bandwidth part (BWP) b of a carrier f of the serving cell c, and numerology configuration index is j and a PUSCH power control adjustment state index is l, in an implementation, a specific implementation of a calculation formula of PUSCH transmission power $P_{PUSCH,b,f,c}(i,j,q_d,l)$ of the user equipment at a PUSCH transmission occasion i may be:

$$P_{PUSCH,b,f,c}(i, j, q_d, l) =$$

$$\min\left\{\begin{array}{l} P_{CMAX,f,c}(i), \\ P_{O\_PUSCH,b,f,c}(j) + 10\log_{10}\left(2^\mu \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l) + \delta \end{array}\right\} \text{[dBm (decibel relative to one milliwatt)]}$$

where, $P_{CMAX,f,c}(i)$ is configured maximum output power of the user equipment at the PUSCH transmission occasion i on the carrier f of the serving cell c.

$P_{O\_PUSCH,b,f,c}(j)$ is an open-loop power parameter. For example, it may be determined using the method specified in 3GPP TS38.213.

$$M_{RB,b,f,c}^{PUSCH}(i)$$

is a transmission bandwidth of the PUSCH for the PUSCH transmission occasion i on the bandwidth part b of the carrier f of the serving cell c, in units of RB. It should be noted that a subcarrier spacing is μ.

$\alpha_{b,f,c}(j)$ is an adjustment value related to a pathloss for the PUSCH transmission occasion i and the numerology configuration index j, on the bandwidth part b of the carrier f of the serving cell c.

$PL_{b,f,c}(q_d)$ is a parameter related to the pathloss. For example, it may be determined using the method specified in 3GPP TS38.213.

$\Delta_{TF,b,f,c}(i)$ is a PUSCH transmission power adjustment parameter related to a modulation and coding strategy for the PUSCH transmission occasion i, on the bandwidth part b of the carrier f of the serving cell c. For example, it may be determined using the method specified in 3GPP TS38.213.

$f_{b,f,c}(i,l)$ is a closed-loop power parameter. For example, it may be determined using the method specified in 3GPP TS38.213.

δ indicates a transmission power calculation offset, which may be determined by the transmission power calculation offset class. The transmission power calculation offset class may be determined according to a transmission power calculation offset class indication received from the base station, or preset. In addition, the user equipment may also report the transmission power calculation offset class, so that the base station transmits the transmission power calculation offset class indication.

In an implementation, based on the transmission power calculation offset, the calculation method in which the user equipment may determine the corresponding power headroom report value is as follows:

When the user equipment performs PUSCH transmission on an active bandwidth part (BWP) b of a carrier f of the serving cell c, and a numerology configuration index is j and a PUSCH power control adjustment state index is l, a calculation formula of a first type of the power headroom report value of the user equipment at a PUSCH transmission occasion i is:

$$PH_{type1,b,f,c}(i, j, q_d, l) =$$

$$P_{CMAX,f,c}(i) - \left\{P_{O\_PUSCH,f,b,c}(j) + 10\log_{10}\left(2^\mu \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l) + \delta\right\}\text{[dB (decibel)]}$$

where, $P_{CMAX,f,c}(i)$ is configured maximum output power of the user equipment at the PUSCH transmission occasion i on the carrier f of the serving cell c.

$P_{O\_PUSCH,b,f}(j)$ is an open-loop power parameter. For example, it may be determined using the method specified in 3GPP TS38.213.

$$M_{RB,b,f,c}^{PUSCH}(i)$$

is a transmission bandwidth of the PUSCH for the PUSCH transmission occasion i on the bandwidth part b of the carrier f of the serving cell c, in units of RB. It should be noted that a subcarrier spacing is μ.

$\alpha_{b,f,c}(j)$ is an adjustment value related to a pathloss for the PUSCH transmission occasion i and the numerology configuration index j, on the bandwidth part b of the carrier f of the serving cell c.

$PL_{b,f,c}(q_d)$ is a parameter related to the pathloss. For example, it may be determined using the method specified in 3GPP TS38.213.

$\Delta_{TF,b,f,c}(i)$ is a PUSCH transmission power adjustment parameter related to a modulation and coding strategy for the PUSCH transmission occasion i, on the bandwidth part b of the carrier f of the serving cell c. For example, it may be determined using the method specified in 3GPP TS38.213.

$f_{b,f,c}(i,l)$ is a closed-loop power parameter. For example, it may be determined using the method specified in 3GPP TS38.213.

δ indicates a transmission power calculation offset, which may be determined through the transmission power calculation offset class. The transmission power calculation offset class may be determined according to a transmission power calculation offset class indication received from the base station, or preset. In addition, the user equipment may also report the transmission power calculation offset class, so that the base station transmits the transmission power calculation offset class indication.

In an implementation, a specific implementation of the calculation formula of the PUSCH transmission power $P_{PUSCH,b,f,c}(i,j,q_d,l)$ of the user equipment at the PUSCH transmission occasion i may also be:

$$P_{PUSCH,b,f,c}(i, j, q_d, l) =$$

$$\min\left\{\begin{array}{l} P_{CMAX,f,c}(i) + \delta, \\ P_{O\_PUSCH,b,f,c}(j) + 10\log_{10}\left(2^{\mu} \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l) \end{array}\right\} \text{[dBm (decibel relative to one milliwatt)]}$$

and $$P_{PUSCH,b,f,c}(i,j,q_d,l) \le P_{EMAX,c}$$

where, $P_{CMAX,f,c}(i)$ is configured maximum output power of the user equipment at the PUSCH transmission occasion i on the carrier f of the serving cell c.

$P_{O\_PUSCH,b,f,c}(j)$ is an open-loop power parameter. For example, it may be determined using the method specified in 3GPP TS38.213.

$$M_{RB,b,f,c}^{PUSCH}(i)$$

is a transmission bandwidth of the PUSCH for the PUSCH transmission occasion i on the bandwidth part b of the carrier f of the serving cell c, in units of RB. It should be noted that a subcarrier spacing is $\mu$.

$\alpha_{b,f,c}(j)$ is an adjustment value related to a pathloss for the PUSCH transmission occasion i and the numerology configuration index j, on the bandwidth part b of the carrier f of the serving cell c.

$PL_{b,f,c}(q_d)$ is a parameter related to the pathloss. For example, it may be determined using the method specified in 3GPP TS38.213.

$\Delta_{TF,b,f,c}(i)$ is a PUSCH transmission power adjustment parameter related to a modulation and coding strategy for the PUSCH transmission occasion i, on the bandwidth part b of the carrier f of the serving cell c. For example, it may be determined using the method specified in 3GPP TS38.213.

$f_{b,f,c}(i,l)$ is a closed-loop power parameter. For example, it may be determined using the method specified in 3GPP TS38.213.

$\delta$ indicates a transmission power calculation offset, which may be determined by the transmission power calculation offset class. The transmission power calculation offset class may be determined according to a transmission power calculation offset class indication received from the base station, or preset. In addition, the user equipment may also report the transmission power calculation offset class, so that the base station transmits the transmission power calculation offset class indication.

$P_{EMAX,c}$ is determined by high layer signaling "p-Max" or "NR-NS-PmaxList" in the serving cell c, where "p-Max" is used to limit uplink transmission power of the user equipment on a certain carrier frequency, referring to 3GPP TS38.331.

In an implementation, based on the transmission power calculation offset, the calculation method in which the user equipment may determine the corresponding power headroom report value is as follows:

When the user equipment performs PUSCH transmission on an active bandwidth part (BWP) b of a carrier f of the serving cell c, and a numerology configuration index is j and a PUSCH power control adjustment state index is 1, a calculation formula of a first type of the power headroom report value of the user equipment at a PUSCH transmission occasion i is:

$$PH_{type1,b,f,c}(i, j, q_d, l) = \qquad (i)$$

$$P_{CMAX,f,c}(i) + \delta - \left\{P_{O\_PUSCH,f,b,c}(j) + 10\log_{10}\left(2^{\mu} \cdot M_{RB,b,f,c}^{PUSCH}(i)\right) + \right.$$

$$\left. \alpha_{b,f,c}(j) \cdot PL_{b,f,c}(q_d) + \Delta_{TF,b,f,c}(i) + f_{b,f,c}(i, l)\right\} \text{[dB (decibel)]}$$

and $$PH_{type1,b,f,c}(i,j,q_d,l) \le P_{EMAX,c}$$

where, $P_{CMAX,f,c}(i)$ is configured maximum output power of the user equipment at the PUSCH transmission occasion i on the carrier f of the serving cell c.

$P_{O\_PUSCH,b,f,c}(j)$ is an open-loop power parameter. For example, it may be determined using the method specified in 3GPP TS38.213.

$$M_{RB,b,f,c}^{PUSCH}(i)$$

is a transmission bandwidth of the PUSCH for the PUSCH transmission occasion i on the bandwidth part b of the carrier f of the serving cell c, in units of RB. It should be noted that a subcarrier spacing is $\mu$.

$\alpha_{b,f,c}(j)$ is an adjustment value related to a pathloss for the PUSCH transmission occasion i and the numerology configuration index j, on the bandwidth part b of the carrier f of the serving cell c.

$PL_{b,f,c}(q_d)$ is a parameter related to the pathloss. For example, it may be determined using the method specified in 3GPP TS38.213.

$\Delta_{TF,b,f,c}(i)$ is a PUSCH transmission power adjustment parameter related to a modulation and coding strategy for the PUSCH transmission occasion i, on the bandwidth part b of the carrier f of the serving cell c. For example, it may be determined using the method specified in 3GPP TS38.213.

$f_{b,f,c}(i,l)$ is a closed-loop power parameter. For example, it may be determined using the method specified in 3GPP TS38.213.

$\delta$ indicates a transmission power calculation offset, which may be determined through the transmission power calculation offset class. The transmission power calculation offset class may be determined according to a transmission power calculation offset class indication received from the base station, or preset. In addition, the user equipment may also report the transmission power calculation offset class, so that the base station transmits the transmission power calculation offset class indication.

$P_{EMAX,c}$ is determined by high layer signaling "p-Max" or "NR-NS-PmaxList" in the serving cell c, where "p-Max" is used to limit uplink transmission power of the user equipment on a certain carrier frequency, referring to 3GPP TS38.331.

In an implementation, a specific implementation of the calculation formula of the PUSCH transmission power $P_{PUSCH,b,f,c}(i,j,q_d,l)$ of the user equipment at the PUSCH transmission occasion i may also be:

$$P_{PUSCH,b,f,c}(i, j, q_d, l) =$$

$$\min\left\{\begin{array}{l} P_{CMAX,f,c}(i) + \delta, \\ P_{O\_PUSCH,b,f,c}(j) + 10\log_{10}\left(2^\mu \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l) + \delta \end{array}\right\} \text{[dBm (decibel relative to one milliwatt)]}$$

and $$P_{PUSCH,b,f,c}(i,j,q_d,l) \le P_{EMAX,c}$$

where, $P_{CMAX,f,c}(i)$ is configured maximum output power of the user equipment at the PUSCH transmission occasion i on the carrier f of the serving cell c.

$P_{O\_PUSCH,b,f,c}(j)$ is an open-loop power parameter. For example, it may be determined using the method specified in 3GPP TS38.213.

$$M_{RB,b,f,c}^{PUSCH}(i)$$

is a transmission bandwidth of the PUSCH for the PUSCH transmission occasion i on the bandwidth part b of the carrier f of the serving cell c, in units of RB. It should be noted that a subcarrier spacing is μ.

$\alpha_{b,f,c}(j)$ is an adjustment value related to a pathloss for the PUSCH transmission occasion i and the numerology configuration index j, on the bandwidth part b of the carrier f of the serving cell c.

$PL_{b,f,c}(q_d)$ is a parameter related to the pathloss. For example, it may be determined using the method specified in 3GPP TS38.213.

$\Delta_{TF,b,f,c}(i)$ is a PUSCH transmission power adjustment parameter related to a modulation and coding strategy for the PUSCH transmission occasion i, on the bandwidth part b of the carrier f of the serving cell c. For example, it may be determined using the method specified in 3GPP TS38.213.

$f_{b,f,c}(i,l)$ is a closed-loop power parameter. For example, it may be determined using the method specified in 3GPP TS38.213.

δ indicates a transmission power calculation offset, which may be determined through the transmission power calculation offset class. The transmission power calculation offset class may be determined according to a transmission power calculation offset class indication received from the base station, or preset. In addition, the user equipment may also report the transmission power calculation offset class, so that the base station transmits the transmission power calculation offset class indication.

$P_{EMAX,c}$ is determined through high layer signaling "p-Max" or "NR-NS-PmaxList" in the serving cell c, where "p-Max" is used to limit uplink transmission power of the user equipment on a certain carrier frequency, referring to 3GPP TS38.331.

In an implementation, the calculation method for determining the corresponding power headroom report value by the user equipment is as follows:

When the user equipment performs PUSCH transmission on an active bandwidth part (BWP) b of a carrier f of the serving cell c, and a numerology configuration index is j and a PUSCH power control adjustment state index is 1, a calculation formula of a first type of the power headroom report value of the user equipment at a PUSCH transmission occasion i is:

$$PH_{type1,b,f,c}(i, j, q_d, l) =$$

$$P_{CMAX,f,c}(i) - \{P_{O\_PUSCH,f,b,c}(j) + 10\log_{10}\left(2^\mu \cdot M_{RB,b,f,c}^{PUSCH}(i)\right) +$$

$$\alpha_{b,f,c}(j) \cdot PL_{b,f,c}(q_d) + \Delta_{TF,b,f,c}(i) + f_{b,f,c}(i, l)\}\text{[dB (decibel)]}$$

and $$PH_{type1,b,f,c}(i,j,q_d,l) \le P_{EMAX,c}$$

where, $P_{CMAX,f,c}(i)$ is configured maximum output power of the user equipment at the PUSCH transmission occasion i on the carrier f of the serving cell c.

$P_{O\_PUSCH,b,f,c}(j)$ is an open-loop power parameter. For example, it may be determined using the method specified in 3GPP TS38.213.

$$M_{RB,b,f,c}^{PUSCH}(i)$$

is a transmission bandwidth of the PUSCH for the PUSCH transmission occasion i on the bandwidth part b of the carrier f of the serving cell c, in units of RB. It should be noted that a subcarrier spacing is μ.

$\alpha_{b,f,c}(j)$ is an adjustment value related to a pathloss for the PUSCH transmission occasion i and the numerology configuration index j, on the bandwidth part b of the carrier f of the serving cell c.

$PL_{b,f,c}(q_d)$ is a parameter related to the pathloss. For example, it may be determined using the method specified in 3GPP TS38.213.

$\Delta_{TF,b,f,c}(i)$ is a PUSCH transmission power adjustment parameter related to a modulation and coding strategy for the PUSCH transmission occasion i, on the bandwidth part b of the carrier f of the serving cell c. For example, it may be determined using the method specified in 3GPP TS38.213.

$f_{b,f,c}(i,l)$ is a closed-loop power parameter. For example, it may be determined using the method specified in 3GPP TS38.213.

$P_{EMAX,c}$ is determined through high layer signaling "p-Max" or "NR-NS-PmaxList" in the serving cell c, where "p-Max" is used to limit uplink transmission power of the user equipment on a certain carrier frequency, referring to 3GPP TS38.331.

The calculation of the power headroom report value in this situation is unrelated to δ.

In an implementation, a specific implementation of the method for determining the transmission power of the uplink shared channel is that the user equipment uses the expected received power offset corresponding to the expected received power offset class for calculation.

In an implementation, before the user equipment uses the expected received power offset corresponding to the expected received power offset class to calculate the transmission power of the uplink shared channel, the user equipment may report a capability class related to the expected received power offset of the user equipment, which may be denoted, for example, by p0-offset. p0-offset refers to a degree to which the expected received power may be relaxed when the user equipment calculates the transmission power of the uplink shared channel. Refer to Table 1-Table 4 for the examples of the definitions and related values of p0-offset, and the relationship between p0-offset and the expected received power offset, which are not repeated here.

In an implementation, a specific implementation in which the user equipment uses the expected received power offset to calculate the transmission power of the uplink shared channel may be that the expected received power offset is used to acquire $P_{O\_PUSCH}$ used when participating in the calculation of the transmission power of the uplink shared channel. The expected received power offset, which is denoted by $\Delta_{P0}$, is determined according to the expected received power offset class. A formula containing $\Delta_{P0}$ for calculating the transmission power of the uplink shared channel using $P_{O\_PUSCH}$ is as follows. In an implementation, $\Delta_{P0}$ is valid when the user equipment reports a p0-offset capability and the user equipment is configured with an expected received power offset indication, otherwise, the value is 0.

When the user equipment performs PUSCH transmission on an active bandwidth part (BWP) h of a carrier f of the serving cell c, and a numerology configuration index is j and a PUSCH power control adjustment state index is l, in an implementation, a specific implementation of a calculation formula of PUSCH transmission power $P_{PUSCH,b,f,c}(i,j,q_d,l)$ of the user equipment at a PUSCH transmission occasion i may be:

$$P_{PUSCH,b,f,c}(i, j, q_d, l) =$$

$$\min\left\{ \begin{array}{l} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l) \end{array} \right\} \text{ [dBm (decibel relative to one milliwatt)]}$$

where, $P_{CMAX,f,c}(i)$ is configured maximum output power of the user equipment at the PUSCH transmission occasion i on the carrier f of the serving cell c. Alternatively, $P_{CMAX,f,c}(i)$ here may also be obtained according to other embodiments (e.g., the aforementioned embodiments) herein.

$P_{O\_PUSCH,b,f,c}(j)$ may be determined based on $\Delta_{P0}$, for example, $P_{O\_PUSCH,b,f,c}(j)$ is a parameter consisting of a sum of a component $P_{O\_NOMINAL\_PUSCH,f,c}(j)$ and a component $P_{O\_UE\_PUSCH,b,f,c}(j)$, where $j \in \{0, 1, \ldots, J-1\}$, and $P_{O\_UE\_PUSCH,b,f,c}(j) = P0\_b,f,c(j) + \Delta_{P0}$, where $P_{O\_NOMINAL\_PUSCH,f,c}(j)$ is a cell common power determined through signaling "ConfiguredGrantConfig", and $P_{0\_b,f,c}(j)$ is a UE specific power determined through p0 in signaling "P0-PUSCH-AlphaSet".

$\Delta_{P0}$ is an expected received power offset, which may be determined through the expected received power offset class. The expected received power offset class may be determined according to an expected received power offset class indication received from the base station, or preset. In addition, the user equipment may also report the expected received power offset class, so that the base station transmits the expected received power offset class indication.

$$M_{RB,b,f,c}^{PUSCH}(i)$$

is a transmission bandwidth of the PUSCH for the PUSCH transmission occasion i on the bandwidth part b of the carrier f of the serving cell c, in units of RB. It should be noted that a subcarrier spacing is μ.

$\alpha_{b,f,c}(j)$ is an adjustment value related to a pathloss for the PUSCH transmission occasion i and the numerology configuration index j, on the bandwidth part b of the carrier f of the serving cell c.

$PL_{b,f,c}(q_d)$ is a parameter related to the pathloss. For example, it may be determined using the method specified in 3GPP TS38.213.

$\Delta_{TF,b,f,c}(i)$ is a PUSCH transmission power adjustment parameter related to a modulation and coding strategy for the PUSCH transmission occasion i, on the bandwidth part b of the carrier f of the serving cell c. For example, it may be determined using the method specified in 3GPP TS38.213.

$f_{b,f,c}(i,l)$ is a closed-loop power parameter. For example, it may be determined using the method specified in 3GPP TS38.213.

In an implementation, based on the expected received power offset, the calculation method in which the corresponding power headroom report value may be determined is as follows:

When the user equipment performs PUSCH transmission on an active bandwidth part (BWP) b of a carrier f of the serving cell c, and a numerology configuration index is j and a PUSCH power control adjustment state index is 1, a calculation formula of a first type of the power headroom report value of the user equipment at a PUSCH transmission occasion i is:

$$PH_{type1,b,f,c}(i, j, q_d, l) =$$

$$P_{CMAX,f,c}(i) - \{P_{O\_PUSCH,f,b,c}(j) + 10\log_{10}\left(2^{\mu} \cdot M_{RB,b,f,c}^{PUSCH}(i)\right) +$$

$$\alpha_{b,f,c}(j) \cdot PL_{b,f,c}(q_d) + \Delta_{TF,b,f,c}(i) + f_{b,f,c}(i, l)\} \text{ [dB (decibel)]}$$

where, $P_{CMAX,f,c}(i)$ is configured maximum output power of the user equipment at the PUSCH transmission occasion i on the carrier f of the serving cell c.

$P_{O\_PUSCH,b,f,c}(j)$ is a parameter consisting of a sum of a component $P_{O\_NOMINAL\_PUSCH,f,c}(j)$ and a component $P_{O\_UE\_PUSCH,b,f,c}(j)$, where $j \in \{0, 1, \ldots, J-1\}$, and $P_{O\_UE\_PUSCH,b,f,c}(j) = P0\_b,f,c(j) + \Delta_{P0}$, where $P_{O\_NOMINAL\_PUSCH,f,c}(j)$ is a cell common power determined through signaling "ConfiguredGrantConfig", and $P_{0\_b,f,c}(j)$ is a UE specific power determined through p0 in signaling "P0-PUSCH-AlphaSet";

$\Delta_{P0}$ is an expected received power offset, which may be determined through the expected received power offset class. The expected received power offset class may be determined according to an expected received power offset class indication received from the base station, or preset. In addition, the user equipment may also report the expected received power offset class, so that the base station transmits the expected received power offset class indication.

$$M_{RB,b,f,c}^{PUSCH}(i)$$

is a transmission bandwidth of the PUSCH for the PUSCH transmission occasion i on the bandwidth part b of the carrier f of the serving cell c, in units of RB. It should be noted that a subcarrier spacing is $\rho$.

$\alpha_{b,f,c}(j)$ is an adjustment value related to a pathloss for the PUSCH transmission occasion i and the numerology configuration index j, on the bandwidth part b of the carrier f of the serving cell c.

$PL_{b,f,c}(q_d)$ is a parameter related to the pathloss. For example, it may be determined using the method specified in 3GPP TS38.213.

$\Delta_{TF,b,f,c}(i)$ is a PUSCH transmission power adjustment parameter related to a modulation and coding strategy for the PUSCH transmission occasion i, on the bandwidth part b of the carrier f of the serving cell c. For example, it may be determined using the method specified in 3GPP TS38.213.

$f_{b,f,c}(i,l)$ is a closed-loop power parameter. For example, it may be determined using the method specified in 3GPP TS38.213. In an implementation, the user equipment may use the TPC command mapping power value or TPC command mapping power value offset corresponding to the capability class related to the TPC command to calculate the transmission power of the uplink shared channel.

In an implementation, before the user equipment may use the TPC command mapping power value or TPC command mapping power value offset corresponding to the capability class related to the TPC command to calculate the transmission power of the uplink shared channel, the user equipment may report the capability class related to the TPC command of the user equipment, which may be denoted, for example, by TPCComand-class. The TPCCommand-class refers to a degree to which the TPC command mapping power value may be relaxed when the user equipment calculates the transmission power of the uplink shared channel.

Refer to Table 1 for the examples of the definitions and related values of TPCCommand-class, which are not repeated here.

In an implementation, in correspondence to a certain capability class related to the TPC command, the user equipment may determine the TPC command mapping power value or TPC command mapping power value offset. When the user equipment determines the TPC command mapping power value or TPC command mapping power value offset, some specific conditions represented by other parameters may also be considered, which involve at least one of the following parameters: modulation mode, transmission bandwidth setting, carrier waveform, power class, RB allocation mode, TPC command field, and calculation method of power control adjustment state. A relaxed TPC command mapping power value or TPC command mapping power value offset may be jointly determined through the capability class related to the TPC command and the above specific conditions, so as to be suitable for different working scenarios of the user equipment.

In an example, the capability class related to the TPC command is X, and a specific implementation of the relaxed TPC command mapping power value or TPC command mapping power value offset is shown in Table 2 or Table 3.

In an implementation, the relationship between the capability class related to a TPC command (for example, it is denoted as TPCCommand-class) and the relaxed TPC command mapping power value or TPC command mapping power value offset is described in Table 2 or Table 3, which is not repeated here. According to Table 2 or Table 3, for a certain capability class value related to a TPC command, the user equipment determines the relaxed TPC command mapping power value or TPC command mapping power value offset according to a combination of the carrier waveform, modulation mode, RB allocation mode, power class, TPC command field, and calculation method of power control adjustment state. For example, when TPCCommand-class is X, if the corresponding power class is Y, the TPC command field is A, the carrier waveform is DFT-s-OFDM, the modulation mode is Pi/2 BPSK, the RB allocation mode is the edge RB allocation, and the calculation method of power control adjustment state is cumulative calculation, then the relaxed TPC command mapping power value is $\leq x_1$ dB, or the relaxed TPC command mapping power value is $x_1$ dB, and the TPC command mapping power value offset is $\Delta x_1$ dB. A value of the TPC command field A may be 0, 1, 2, 3; the calculation method of power control adjustment state may be cumulative calculation or absolute calculation. For the rest, refer to the description in Table 2 and Table 3, which is not repeated here.

In an implementation, the relationship between the capability class related to the TPC command and the relaxed TPC command mapping power value or TPC command mapping power value offset related to a cumulative value and absolute calculation may also be shown in Table 5. The TPC command field and the calculation method of power control adjustment state jointly determine the relaxed TPC command mapping power value or TPC command mapping power value offset related to the cumulative value and absolute calculation. When TPCCommand-class is X, if the TPC command field is 0, then the relaxed TPC command mapping power value for the cumulative calculation is $x_{34}$ dB, while the relaxed TPC command mapping power value for the absolute calculation is $x_{38}$ dB, or the TPC command mapping power value offset for the cumulative calculation is $\Delta x_{34}$ dB, while the TPC command mapping power value offset for the absolute calculation is $\Delta x_{38}$ dB. Class X of TPCCommand-class may be integers such as 0, 1, 2, etc.

TABLE 5

| TPC command mapping power value/TPC command mapping power value offset when TPC command-class is X | | |
|---|---|---|
| TPC command field | TPC command mapping power value for cumulative calculation (dB) | TPC command mapping power value for absolute calculation (dB) |
| 0 | $x_{34}/\Delta x_{34}$ | $x_{38}/\Delta x_{38}$ |
| 1 | $x_{35}/\Delta x_{35}$ | $x_{39}/\Delta x_{39}$ |
| 2 | $x_{36}/\Delta x_{36}$ | $x_{40}/\Delta x_{40}$ |
| 3 | $x_{37}/\Delta x_{37}$ | $x_{41}/\Delta x_{41}$ |

In an implementation, after the user equipment acquires the capability class related to the TPC command, it may be used to participate in the calculation of the transmission power of the uplink shared channel to support the user equipment to transmit with higher power. Specifically, the user equipment may use the capability class related to the TPC command to acquire the TPC command mapping power value participating in the calculation of a PUSCH power control adjustment state, to calculate the transmission power of the uplink shared channel. In an implementation, the capability class related to the TPC command is valid when the user equipment reports a TPCCommand-class capability and the user equipment is configured with a capability class indication related to the TPC command, otherwise, the value is a default value, and a default value is acquired for the TPC command mapping power value according to a default mode in this situation. In an implementation, a specific implementation in which the user equipment uses the TPC command mapping power value corresponding to the capability class related to the TPC command to calculate the transmission power of the uplink shared channel may be as follows.

When the user equipment performs PUSCH transmission on an active bandwidth part (BWP) b of a carrier f of the serving cell c, and a numerology configuration index is j and a PUSCH power control adjustment state index is 1, in an implementation, a specific implementation of a calculation formula of PUSCH transmission power $P_{PUSCH,b,f,c}(i,j,q_d,l)$ of the user equipment at a PUSCH transmission occasion i may be:

$$P_{PUSCH,b,f,c}(i, j, q_d, l) =$$

$$\min\left\{ \begin{array}{l} P_{CMAX,f,c}(i), \\ P_{O\_PUSCH,b,f,c}(j) + 10\log_{10}\left(2^\mu \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l) \end{array} \right\} \text{[dBm (decibel relative to one milliwatt)]}$$

where, $P_{CMAX,f,c}(i)$ is configured maximum output power of the user equipment at the PUSCH transmission occasion i on the carrier f of the serving cell c.

$P_{O\_PUSCH,b,f,c}(j)$ is an open-loop power parameter. For example, it may be determined using the method specified in 3GPP TS38.213.

$$M_{RB,b,f,c}^{PUSCH}(i)$$

is a transmission bandwidth of the PUSCH for the PUSCH transmission occasion i on the bandwidth part b of the carrier f of the serving cell c, in units of RB. It should be noted that a subcarrier spacing is $\mu$.

$\alpha_{b,f,c}(j)$ is an adjustment value related to a pathloss for the PUSCH transmission occasion i and the numerology configuration index j, on the bandwidth part b of the carrier f of the serving cell c.

$PL_{b,f,c}(q_d)$ is a parameter related to the pathloss. For example, it may be determined using the method specified in 3GPP TS38.213.

$\Delta_{TF,b,f,c}(i)$ is a PUSCH transmission power adjustment parameter related to a modulation and coding strategy for the PUSCH transmission occasion i, on the bandwidth part b of the carrier f of the serving cell c. For example, it may be determined using the method specified in 3GPP TS38.213.

The PUSCH power control adjustment state at the PUSCH transmission occasion i on the active bandwidth part b of the carrier f of the serving cell c is denoted by $f_{b,f,c}(i,l)$.

$\delta_{PUSCH,b,f,c}(i,l)$ is a TPC command value in a DCI format, wherein the DCI format is used to schedule the carrier f of the serving cell c, the active uplink bandwidth b, the PUSCH transmission occasion i, or the TPC command value is jointly encoded with other TPC commands in DCI format 2_2, wherein CRC used in DCI format 2_2 is scrambled with a TPC-PUSCH-RNTI; a mapping relationship between the TPC command value and the TPC command mapping power value is determined through the capability class related to the TPC command.

If the user equipment is not configured with tpc-Accumulation, the PUSCH power control adjustment state with an index/on the active bandwidth part b of the carrier f of the serving cell c is $$f_{b,f,c}(i, l) = f_{b,f,c}(i - i_0, l) + \sum_{m=0}^{C(D_i)-1} \delta_{PUSCH,b,f,c}(m, l),$$

where

In an implementation, the TPC command mapping power value participating in the cumulative calculation corresponding to $\delta_{PUSCH,f,b,c}$ is determined through the capability class related to the TPC command. The capability class related to the TPC command may be determined according to the capability class indication related to the TPC command received from the base station, or preset. In addition, the user equipment may also report the capability class related to the TPC command, so that the base station transmits the capability class indication related to the TPC command.

If the user equipment is configured with tpc-Accumulation, the PUSCH power control adjustment state with the index 1 on the active bandwidth part b of the carrier f of the serving cell c is $f_{b,f,c}(l)=\delta_{PUSCH,b,f,c}(i,l)$, wherein, in an implementation, the TPC command mapping power value participating in the absolute calculation corresponding to $\delta_{PUSCH,b,f,c}$ is determined through the capability class related to the TPC command. The capability class related to the TPC command may be determined according to the capability class indication related to the TPC command received from the base station, or preset. In addition, the user equipment may also report the capability class related to the TPC command, so that the base station transmits the capability class indication related to the TPC command.

In an implementation, a specific implementation of the method for determining a value of $\delta_{PUSCH,b,f,c}$ by the user equipment according to the capability class related to the TPC command may be shown in Table 6. In Table 6, in correspondence to the capability class related to the TPC command being X, there is a mapping relationship between a TPC command field in a DCI format for scheduling PUSCH transmission or DCI format 2_2 of which CRC is scrambled with a TPC-PUSCH-RNTI, and absolute and cumulative $\delta_{PUSCH,b,f,c}$. For example, when the TPC command field is 0, a value of the corresponding TPC command mapping power value $\delta_{PUSCH,b,f,c}$ for the cumulative calculation is $x_{34}$ dB, and in this situation, the corresponding TPC command mapping power value $\delta_{PUSCH,b,f,c}$ for the absolute calculation is $x_{38}$ dB.

TABLE 6 mapping of TPC command field in DCI format for scheduling
PUSCH transmission or DCI format 2_2 of which CRC is scrambled
with TPC-PUSCH-RNTI to absolute and cumulative $\delta_{PUSCH,\,b,\,f,\,c}$
when capability class related to TPC command is X

| TPC command field | cumulative $\delta_{PUSCH,\,b,\,f,\,c}$ [dB] | absolute $\delta_{PUSCH,\,b,\,f,\,c}$ [dB] |
|---|---|---|
| 0 | $x_{34}$ | $x_{38}$ |
| 1 | $x_{35}$ | $x_{39}$ |
| 2 | $x_{36}$ | $x_{40}$ |
| 3 | $x_{37}$ | $x_{41}$ |

In an implementation, a specific implementation of the method for determining the value of $\delta_{PUSCH,b,f,c}$ by the user equipment using the capability class related to the TPC command may also be shown in Table 7. In Table 7, in correspondence to the capability class related to the TPC command being X, a TPC command field in a DCI format for scheduling PUSCH transmission or DCI format 2_2 of which CRC is scrambled with a TPC-PUSCH-RNTI has a mapping relationship with absolute and cumulative $\delta_{PUSCH,b,f,c}$. For example, when the TPC command field is 0, a value of the corresponding TPC command mapping power value $\delta_{PUSCH,b,f,c}$ for the cumulative calculation is $-1+\Delta x_{34}$ dB, and in this situation, the corresponding TPC command mapping power value $\delta_{PUSCH,b,f,c}$ for the absolute calculation is $-4+\Delta x_{38}$ dB.

TABLE 7 mapping of TPC command field in DCI format for scheduling
PUSCH transmission or DCI format 2_2 of which CRC is scrambled
with TPC-PUSCH-RNTI to absolute and cumulative $\delta_{PUSCH,\,b,\,f,\,c}$
when capability class related to TPC command is X

| TPC command field | cumulative $\delta_{PUSCH,\,b,\,f,\,c}$ [dB] | absolute $\delta_{PUSCH,\,b,\,f,\,c}$ [dB] |
|---|---|---|
| 0 | $-1 + \Delta x_{34}$ | $-4 + \Delta x_{38}$ |
| 1 | $\Delta x_{35}$ | $-1 + \Delta x_{39}$ |
| 2 | $1 + \Delta x_{36}$ | $1 + \Delta x_{40}$ |
| 3 | $3 + \Delta x_{37}$ | $4 + \Delta x_{41}$ |

In an implementation, based on the capability class related to the TPC command, the calculation method in which the user equipment may determine the corresponding power headroom report value is as follows:

When the user equipment performs PUSCH transmission on an active bandwidth part (BWP) b of a carrier f of the serving cell c, and a numerology configuration index is j and a PUSCH power control adjustment state is l, a calculation formula of a first type of the power headroom report value of the user equipment at a PUSCH transmission occasion i is:

$$PH_{type1,b,f,c}(i, j, q_d, l) =$$
$$P_{CMAX,f,c}(i) - \{P_{O\_PUSCH,f,b,c}(j) + 10\log_{10}(2^\mu \cdot M_{RB,b,f,c}^{PUSCH}(i)) +$$
$$\alpha_{b,f,c}(j) \cdot PL_{b,f,c}(q_d) + \Delta_{TF,b,f,c}(i) + f_{b,f,c}(i, l)\}[dB \text{ (decibel)}]$$

where, $P_{CMAX,f,c}(i)$ is configured maximum output power of the user equipment at the PUSCH transmission occasion i on the carrier f of the serving cell c.

$P_{O\_PUSCH,b,f,c}(j)$ is an open-loop power parameter. For example, it may be determined using the method specified in 3GPP TS38.213.

$$M_{RB,b,f,c}^{PUSCH}(i)$$

is a transmission bandwidth of the PUSCH for the PUSCH transmission occasion i on the bandwidth part b of the carrier f of the serving cell c, in units of RB. It should be noted that a subcarrier spacing is μ.

$\alpha_{b,f,c}(j)$ is an adjustment value related to a pathloss for the PUSCH transmission occasion i and the numerology configuration index j, on the bandwidth part b of the carrier f of the serving cell c.

$PL_{b,f,c}(q_d)$ is a parameter related to the pathloss. For example, it may be determined using the method specified in 3GPP TS38.213.

$\Delta_{TF,b,f,c}(i)$ is a PUSCH transmission power adjustment parameter related to a modulation and coding strategy for the PUSCH transmission occasion i, on the bandwidth part b of the carrier f of the serving cell c. For example, it may be determined using the method specified in 3GPP TS38.213.

The PUSCH power control adjustment state at the PUSCH transmission occasion i on the active bandwidth part b of the carrier f of the serving cell c is denoted by $f_{b,f,c}(i,l)$.

$\delta_{PUSCH,b,f,c}(i,l)$ is a TPC command value in a DCI format, wherein the DCI format is used to schedule the carrier f of the serving cell c, the active uplink bandwidth b, the PUSCH transmission occasion i, or the TPC command value is jointly encoded with other TPC commands in DCI format 2_2, wherein CRC used in DCI format 2_2 is scrambled with a TPC-PUSCH-RNTI; a mapping relationship between the TPC command value and the TPC command mapping power value is determined through the capability class related to the TPC command.

If the user equipment is not configured with tpc-Accumulation, the PUSCH power control adjustment state with an index l on the active bandwidth part b of the carrier f of the serving cell c is $$f_{b,f,c}(i, l) = f_{b,f,c}(i - i_0, l) + \sum_{m=0}^{C(D_i)-1} \delta_{PUSCH,b,f,c}(m, l),$$

where

The TPC command mapping power value participating in the cumulative calculation corresponding to $\delta_{PUSCH,b,f,c}$ is determined through the capability class related to the TPC command. The capability class related to the TPC command may be determined according to the capability class indication related to the TPC command received from the base station, or preset. In addition, the user equipment may also report the capability class related to the TPC command, so that the base station transmits the capability class indication related to the TPC command.

If the user equipment is configured with tpc-Accumulation, the PUSCH power control adjustment state with the index l on the active bandwidth part h of the carrier f of the serving cell c is $f_{b,f,c}(i,l)=\delta_{PUSCH,b,f,c}(i,l)$.

The TPC command mapping power value participating in the absolute calculation corresponding to $\delta_{PUSCH,b,f,c}$ is determined through the capability class related to the TPC command. The capability class related to the TPC command may be determined according to the capability class indication related to the TPC command received from the base station, or preset. In addition, the user equipment may also report the capability class related to the TPC command, so that the base station transmits the capability class indication related to the TPC command.

Refer to Table 6 or Table 7 for the specific implementation of the method for determining the value of $\delta_{PUSCH,b,f,c}$ through the capability class related to the TPC command, which is not repeated here.

In an implementation, the user equipment may use the power headroom offset corresponding to the power headroom offset class to calculate the power headroom report value.

In an implementation, before the user equipment uses the power headroom offset corresponding to the power headroom offset class to calculate the power headroom report value, the user equipment may report the power headroom offset class of the user equipment in advance, which is denoted by PHR-offset. The PHR-offset refers to a degree to which the power headroom may be relaxed when the user equipment calculates the power headroom report value. Refer to Table 1-Table 4 for the examples of the definitions and related values of PHR-offset, and the relationship between PHR-offset and the power headroom offset, which are not repeated here.

In an implementation, a specific implementation in which the power headroom offset is used to calculate the power headroom report value may be that the user equipment uses a formula containing $\delta_{PHR}$ to calculate the power headroom report value, where a value of $\delta_{PHR}$ is determined through the power headroom offset corresponding to the power headroom offset class. In an implementation, $\delta_{PHR}$ is valid when the user equipment reports a PHR-offset capability and the user equipment is configured with a power headroom offset indication, otherwise, the value is 0.

When the user equipment determines the power headroom offset, the calculation method of the power headroom report value is as follows:

When the user equipment performs PUSCH transmission on an active bandwidth part (BWP) b of a carrier f of the serving cell c, and a numerology configuration index is j and a PUSCH power control adjustment state index is 1, a calculation formula of a first type of the power headroom report value of the user equipment at a PUSCH transmission occasion i is:

$$PH_{type1,b,f,c}(i, j, q_d, l) =$$

$$P_{CMAX,f,c}(i) - \{P_{O\_PUSCH,f,b,c}(j) + 10\log_{10}(2^\mu \cdot M_{RB,b,f,c}^{PUSCH}(i)) +$$

$$\alpha_{b,f,c}(j) \cdot PL_{b,f,c}(q_d) + \Delta_{TF,b,f,c}(i) + f_{b,f,c}(i, l)\} + \delta_{PHR}[\text{dB (decibel)}]$$

and $$PH_{type1,b,f,c}(b,j,q_d,l) \leq P_{EMAX,c}$$

where, $P_{CMAX,f,c}(i)$ is configured maximum output power of the user equipment at the PUSCH transmission occasion i on the carrier f of the serving cell c.

$P_{O\_PUSCH,b,f,c}(f)$ is an open-loop power parameter. For example, it may be determined using the method specified in 3GPP TS38.213.

$$M_{RB,b,f,c}^{PUSCH}(i)$$

is a transmission bandwidth of the PUSCH for the PUSCH transmission occasion i on the bandwidth part b of the carrier f of the serving cell c, in units of RB. It should be noted that a subcarrier spacing is μ.

$\alpha_{b,f,c}(j)$ is an adjustment value related to a pathloss for the PUSCH transmission occasion i and the numerology configuration index j, on the bandwidth part b of the carrier f of the serving cell c.

$PL_{b,f,c}(q_d)$ is a parameter related to the pathloss. For example, it may be determined using the method specified in 3GPP TS38.213.

$\Delta_{TF,b,f,c}(i)$ is a PUSCH transmission power adjustment parameter related to a modulation and coding strategy for the PUSCH transmission occasion i, on the bandwidth part b of the carrier f of the serving cell c. For example, it may be determined using the method specified in 3GPP TS38.213.

$f_{b,f,c}(i,l)$ is a closed-loop power parameter. For example, it may be determined using the method specified in 3GPP TS38.213.

$\delta_{PHR}$ represents a power headroom offset, which may be determine through the power headroom offset class. The power headroom offset class may be determined according to a power headroom offset class indication received from the base station, or preset. In addition, the user equipment may also report the power headroom offset class, so that the base station transmits the power headroom offset class indication.

$P_{EMAX,c}$ is determined through high layer signaling "p-Max" or "NR-NS-PmaxList" in the serving cell c, where "p-Max" is used to limit uplink transmission power of the user equipment on a certain carrier frequency, referring to 3GPP TS38.331.

In an implementation, in a case where the transmission power is increased, a requirement of an error vector magnitude (EVM) of the user equipment will also change, and the user equipment may select a working interval of a power amplifier for signal power amplification according to the EVM requirement, to support the signal transmission with higher power. A specific implementation in which the user equipment determines the EVM requirement is that the user equipment uses the EVM requirement or EVM requirement offset corresponding to the EVM capability class for determination. The EVM capability class refers to a degree to which a limitation on the EVM requirement may be relaxed when the user equipment acquires the EVM requirement. The user equipment may determine a relaxed EVM requirement or EVM requirement offset according to the EVM capability class, and finally determine the configured maximum output power and/or transmission power and/or power headroom report (PHR) according to the relationship between the EVM capability class and/or the relaxed EVM requirement and/or EVM requirement offset and other power relax parameters and/or relaxed power adjustment values and/or power adjustment offsets.

In an implementation, when the user equipment uses the EVM capability class to acquire the corresponding relaxed EVM requirement or EVM requirement offset, the user equipment may report the EVM capability class of the user equipment, which is denoted by EVM-class. The EVM-class may be used to indicate whether the user equipment supports the relaxed EVM requirement or EVM requirement offset corresponding to the EVM capability class, and/or indicate an EVM capability class value that may be supported by the user equipment.

A specific implementation of a parameter definition of the EVM-class may be shown in Table 8.

TABLE 8

EVM-class parameter definition

| parameter definition | per | mandatory parameter | different in FDD-TDD mode | different in FR1-FR2 |
|---|---|---|---|---|
| EVM-class indicates whether the user equipment supports the relaxed EVM requirement of EVM requirement offset corresponding to the EVM capability class, and/or indicates an EVM capability class value that may be supported by the user equipment | user equipment/band/band combination/bandwidth part | NO | NO | YES |

For the description of the definition in Table 8, refer to the related description in Table 1, which is not repeated here.

In an implementation, in correspondence to a certain EVM capability class, the user equipment may determine the relaxed EVM requirement or EVM requirement offset. When the user equipment determines the relaxed EVM requirement or EVM requirement offset, some specific conditions represented by other parameters may also be considered, which involve at least one of the following parameters: modulation mode, transmission bandwidth setting, carrier waveform, power class and RB allocation mode. The relaxed EVM requirement or EVM requirement offset may be jointly determined through the EVM capability class and the above specific conditions, so as to be suitable for different working scenarios of the user equipment. Specifically, when the EVM capability class is a specific EVM capability class value, the user equipment does not support the relaxed EVM requirement.

In an example, when the EVM capability class is Z, a specific implementation of the relaxed EVM requirement or EVM requirement offset is shown in Table 9 or Table 10. In addition to the specific EVM capability class value, for a certain EVM capability class value, the user equipment may determine the relaxed EVM requirement or EVM requirement offset according to a combination of one or more of the carrier waveform, modulation mode, RB allocation mode and power class. For example, when the EVM capability class is Z, if the corresponding power class is Y, the carrier waveform is DFT-s-OFDM, the modulation mode is Pi/2 BPSK, and the RB allocation mode is the edge RB allocation, then an average EVM level requirement is $z_1$%, or the EVM requirement offset is $\Delta z_1$%. A value of the power class Y may be, for example, 1, 1.5, 2, 3, etc., and the carrier waveform may be DFT-s-OFDM or CP-OFDM; the modulation mode may be Pi/2 BPSK, QPSK, 16 QAM, 64 QAM, 256 QAM, 1024QAM or other modulation modes; the RB allocation mode may be edge RB allocation, outer RB allocation or inner RB allocation. The reported class X of the EVM capability class value may be class 0, class 1, class 2, etc. Refer to the standard 3GPP TS38.101 for the definitions of edge RB, outer RB and inner RB.

Other related descriptions with regard to Table 9 or Table 10 are similar to those with regard to Table 2 or Table 3, thus the related descriptions with regard to Table 2 or Table 3 may be referred to, which are not repeated here.

TABLE 9

EVM requirement corresponding to EVM capability class of user equipment being Z when power class is Y

| | | average EVM level (%) | | |
|---|---|---|---|---|
| modulation mode | | edge RB allocation | outer RB allocation | inner RB allocation |
| DFT-s-OFDM | Pi/2 BPSK | $z_1$ | $z_2$ | $z_3$ |
| | QPSK | $z_4$ | $z_5$ | $z_6$ |
| | 16 QAM | $z_7$ | $z_8$ | $z_9$ |
| | 64 QAM | $z_{10}$ | $z_{11}$ | $z_{12}$ |
| | 256 QAM | $z_{13}$ | $z_{14}$ | $z_{15}$ |
| | 1024QAM | $z_{16}$ | $z_{17}$ | $z18$ |
| CP-OFDM | QPSK | $z_{19}$ | $z_{20}$ | $z_{21}$ |
| | 16 QAM | $z_{22}$ | $z_{23}$ | $z_{24}$ |
| | 64 QAM | $z_{25}$ | $z_{26}$ | $z_{27}$ |
| | 256 QAM | $z_{28}$ | $z_{29}$ | $z_{30}$ |
| | 1024QAM | $z_{31}$ | $z_{32}$ | $z_{33}$ |

TABLE 10

EVM requirement offset corresponding to EVM capability class of user equipment being Z when power class is Y

| | | EVM requirement offset (%) | | |
|---|---|---|---|---|
| modulation mode | | edge RB allocation | outer RB allocation | inner RB allocation |
| DFT-S-OFDM | Pi/2 BPSK | $\Delta z_1$ | $\Delta z_2$ | $\Delta z_3$ |
| | QPSK | $\Delta z_4$ | $\Delta z_5$ | $\Delta z_6$ |
| | 16 QAM | $\Delta z_7$ | $\Delta z_8$ | $\Delta z_9$ |

TABLE 10-continued

| EVM requirement offset corresponding to EVM capability class of user equipment being Z when power class is Y | | | | |
|---|---|---|---|---|
| | | EVM requirement offset (%) | | |
| | modulation mode | edge RB allocation | outer RB allocation | inner RB allocation |
| CP-OFDM | 64 QAM | $\Delta z_{10}$ | $\Delta z_{11}$ | $\Delta z_{12}$ |
| | 256 QAM | $\Delta z_{13}$ | $\Delta z_{14}$ | $\Delta z_{15}$ |
| | 1024QAM | $\Delta z_{16}$ | $\Delta z_{17}$ | $\Delta z_{18}$ |
| | QPSK | $\Delta z_{19}$ | $\Delta z_{20}$ | $\Delta z_{21}$ |
| | 16 QAM | $\Delta z_{22}$ | $\Delta z_{23}$ | $\Delta z_{24}$ |
| | 64 QAM | $\Delta z_{25}$ | $\Delta z_{26}$ | $\Delta z_{27}$ |
| | 256 QAM | $\Delta z_{28}$ | $\Delta z_{29}$ | $\Delta z_{30}$ |
| | 1024QAM | $\Delta z_{31}$ | $\Delta z_{32}$ | $\Delta z_{33}$ |

Specifically, if in correspondence to a certain EVM capability class of the user equipment, the relationship between the EVM capability class and the EVM requirement or EVM requirement offset may be shown, for example, in Table 11 or Table 12, considering the relationship between the respective EVM requirement or EVM requirement offset and the modulation mode. When the EVM capability class of the user equipment is Z, corresponding to the modulation mode Pi/2-BPSK, the average EVM level requirement is $z_{34}$%, or the average EVM level offset is $\Delta z_{34}$%. The reporting class Z of EVM-class may be class 0, class 1, class 2, etc.

TABLE 11

| EVM requirement when EVM capability class is Z | | |
|---|---|---|
| parameter | unit | average EVM level |
| Pi/2-BPSK | % | $z_{34}$ |
| QPSK | % | $z_{35}$ |
| 16 QAM | % | $z_{36}$ |
| 64 QAM | % | $z_{37}$ |
| 256 QAM | % | $z_{38}$ |
| 1024 QAM | % | $z_{39}$ |

TABLE 12

| EVM requirement offset when EVM capability class is Z. | | |
|---|---|---|
| parameter | unit | average EVM level offset |
| Pi/2-BPSK | % | $\Delta z_{34}$ |
| QPSK | % | $\Delta z_{35}$ |
| 16 QAM | % | $\Delta z_{36}$ |
| 64 QAM | % | $\Delta z_{37}$ |
| 256 QAM | % | $\Delta z_{38}$ |
| 1024 QAM | % | $\Delta z_{39}$ |

In an implementation, a specific implementation in which the user equipment acquires the EVM requirement may be that the user equipment directly acquires the EVM requirement according to the EVM capability class. Specifically, after determining the EVM capability class, the user equipment then determines the EVM requirement further according to the carrier waveform, modulation mode, transmission bandwidth setting, power class and RB allocation mode, referring to Table 9 or Table 11. In Table 9, when the EVM capability class is Z, if the corresponding power class is Y, the carrier waveform is DFT-s-OFDM, the modulation mode is Pi/2 BPSK, and the RB allocation mode is the edge RB allocation, then the average EVM level requirement is $z_1$%. In Table 11, when the EVM capability class is Z and the modulation mode is Pi/2 BPSK, the average EVM level requirement is $z_{34}$%. When the EVM capability class is a specific EVM capability class, a default value is acquired for the EVM requirement without considering relax. The EVM capability class may be determined according to an EVM capability class indication received from the base station, or preset. In addition, the user equipment may also report the EVM capability class, so that the base station transmits the EVM capability class indication, and accordingly, the user equipment may also determine the corresponding EVM requirement based on the EVM capability class indication received from the base station.

In an implementation, a specific implementation in which the user equipment acquires the EVM requirement may also be that the user equipment finds the corresponding EVM requirement offset according to the EVM capability class to determine the corresponding EVM requirement. The specific calculation method for acquiring the EVM requirement by the user equipment is a sum of a default EVM requirement and the EVM requirement offset, wherein the default EVM requirement is an EVM requirement acquired by the user equipment without considering EVM relax. After determining the EVM capability class, the user equipment then determines the EVM requirement offset further according to the carrier waveform, modulation mode, transmission bandwidth setting, power class and RB allocation mode, referring to Table 10 or Table 12. As shown in Table 10, when the EVM capability class is Z, if the power class indication is Y, the carrier waveform is DFT-s-OFDM, the modulation mode is Pi/2 BPSK, and the RB allocation mode is the edge RB allocation, then the EVM requirement offset is $\Delta z_1$%, and a value of the EVM requirement is $(Z_1 + \Delta z_1)$% in this situation, wherein $Z_1$ is the default EVM requirement acquired by the user equipment without considering EVM relax when the power class indication is Y, the carrier waveform is DFT-s-OFDM, the modulation mode is Pi/2 BPSK, and the RB allocation mode is the edge RB allocation. In correspondence to a certain EVM capability class of the user equipment, in a case where the relationship between the respective EVM requirement and the modulation mode is considered, Table 12 may be referred to, when the EVM capability class is class Z, if the modulation mode is Pi/2 BPSK, the EVM requirement offset is $\Delta z_{34}$%, and the value of the EVM requirement is $(Z_{34} + \Delta z_{34})$% in this situation, wherein $Z_{34}$ is the default EVM requirement acquired by the user equipment without considering EVM relax when the modulation mode is Pi/2 BPSK. In an implementation, when the EVM capability class is a specific EVM capability class, the corresponding EVM offset is 0, and in this situation, the default value is acquired for the EVM requirement without considering relax. The EVM capability class may be determined according to the EVM capability class indication received from the base station, or preset. In addition, the user equipment may also report the EVM capability class, so that the base station transmits the EVM capability class indication.

In an implementation, the method in which the user equipment acquires the parameters related to power adjustment described in the above embodiments (hereinafter referred to as specific parameters for short) may be explicit or implicit. A specific implementation of explicitly acquiring the specific parameters may be that the user equipment directly acquires the specific parameters according to the corresponding specific parameter classes. A specific implementation of implicitly acquiring the specific parameters may be that the user equipment implicitly acquires the specific parameters through the relationship between the specific parameter and at least one other specific parameter after acquiring at least one other specific parameter. The user equipment implicitly acquires other specific parameters through the corresponding relationship among the specific parameters, which may save signaling overhead. The method for acquiring the specific parameter classes by the user equipment may be that they are determined according to specific parameter class indications received from the base station, or preset. In addition, the user equipment may also report the specific parameter classes, so that the base station transmits the specific parameter class indications. The definitions of and the mapping relationships between the specific parameters and the corresponding specific parameter classes are shown in Table 13. Specifically, the specific parameters are EVM requirement or EVM requirement offset, relaxed MPR value or MPR relax value or MPR offset value, $P_{EMAX}$ offset, $\Delta P_{PowerClass}$ corrected value, maximum output power high limit offset and/or maximum output power low limit offset and/or maximum output power high and low limit offset, maximum output power offset, transmission power calculation offset, expected received power offset, TPC command mapping power value or TPC command mapping power value offset, and power headroom offset. The corresponding specific parameter classes are: EVM capability class, power relax class (e.g., MPR capability class), received configured maximum transmission power offset class, corrected value class of maximum power offset corresponding to power class, maximum output power limit offset class, maximum output power offset class, transmission power calculation offset class, expected received power offset class, TPC command related capability class, and power headroom offset class. For example, for the specific parameter of EVM requirement or EVM requirement offset, its corresponding specific parameter class is the EVM capability class; in correspondence to the relaxed MPR value or MPR relax value or MPR offset value, its corresponding specific parameter class is the power relax class (e.g., MPR capability class), and so on.

specific parameters may be one-to-one or one-to-many. One-to-one correspondence refers to one EVM requirement or EVM requirement offset corresponding to one other specific parameter. The other specific parameters refer to: relaxed MPR value or MPR relax value or MPR offset value, $P_{EMAX}$ offset value, $\Delta P_{PowerClass}$ corrected value, maximum output power high limit offset and/or maximum output power low limit offset and/or maximum output power high and low limit offset, maximum output power offset, transmission power calculation offset, expected received power offset and power headroom offset. The user equipment may acquire other specific parameters from the EVM requirement or EVM requirement offset through the relationship between the EVM requirement or EVM requirement offset and other specific parameters to participate in the calculation of the configured maximum output power and/or transmission power and/or power headroom report (PHR), to support the user equipment to transmit signals with higher power.

In an implementation, when the user equipment satisfies that the EVM capability class value corresponding to the EVM requirement or EVM requirement offset corresponds to specific parameter class values corresponding to other specific parameters, and the carrier waveform, modulation mode, transmission bandwidth setting, power class and RB allocation mode are corresponding or equal, the EVM requirement or EVM requirement offset corresponds to other specific parameters one by one. Table 14 or Table 15 gives an example in which when the EVM capability class value of the user equipment corresponds to the other specific parameter class value, the EVM requirement or EVM requirement offset corresponds to other specific parameter one by one under the same carrier waveform, modulation mode, power class and RB allocation mode.

For example, in Table 14, when the EVM capability class of the user equipment is Z and the corresponding other specific parameter class is X, if the power class is Y, the carrier waveform is DFT-s-OFDM, the modulation mode is

TABLE 13

| mapping relationship between specific parameter and corresponding specific parameter class | |
|---|---|
| specific parameter | corresponding specific parameter class |
| EVM requirement or EVM requirement offset | EVM capability class |
| relaxed MPR value or MPR relax value or MPR offset value | power relax class (e.g., MPR capability class) |
| $P_{EMAX}$ offset | received configured maximum transmission power offset class |
| $\Delta P_{PowerClass}$ corrected value | corrected value class of maximum power offset corresponding to power class |
| maximum output power high limit offset and/or maximum output power low limit offset and/or maximum output power high and low limit offset | maximum output power limit offset class |
| maximum output power offset | maximum output power offset class |
| transmission power calculation offset | transmission power calculation offset class |
| expected received power offset | expected received power offset class |
| TPC command mapping power value or TPC command mapping power value offset | capability class related to TPC command |
| power headroom offset | power headroom offset class |

In an implementation, a specific implementation of the correspondence between the EVM requirement or EVM requirement offset and other specific parameters is as follows. When there is a correspondence between the EVM requirement or EVM requirement offset and at least one of other specific parameters, the correspondence between the EVM requirement or EVM requirement offset and the other Pi/2 BPSK, and the RB allocation mode is the edge RB allocation, then the average EVM level requirement is $z_1\%$, and the corresponding other specific parameter value is $\le x_1$ dB or $x_1$ dB in this situation.

Alternatively, in Table 15, when the EVM capability class of the user equipment is Z and the corresponding other specific parameter classes is X, if the power class is Y, the carrier waveform is DFT-s-OFDM, the modulation mode is Pi/2 BPSK, and the RB allocation mode is the edge RB allocation, then the average EVM level requirement offset is $\Delta z_1$%, and the corresponding other specific parameter value is $\leq x_1$ dB or $x_1$ dB in this situation.

The value of the power class Y may be, for example, 1, 1.5, 2, 3, etc., and the carrier waveform may be DFT-s-OFDM or CP-OFDM; the modulation mode may be Pi/2 BPSK, QPSK, 16 QAM, 64 QAM, 256 QAM, 1024QAM or other modulation modes; the RB allocation mode may be edge RB allocation, outer RB allocation or inner RB allocation. The EVM capability class X may be class 0, class 1, class 2, etc. Other specific parameter classes X may be class 0, class 1, class 2, etc. Refer to the standard 3GPP TS38.101 for the definitions of edge RB, outer RB and inner RB.

It should be noted that if the other specific parameter class is the capability class related to the TPC command, not only the carrier waveform, modulation mode, transmission bandwidth setting, power class and RB allocation mode, but also the calculation method of the TPC command field and the power control adjustment state should be considered, when determining the corresponding specific parameter TPC command mapping power value or TPC command mapping power value offset. In an implementation, if the EVM capability class value of the user equipment corresponds to the capability class value related to the TPC command, the EVM requirement or EVM requirement offset corresponds to the TPC command mapping power value or TPC command mapping power value offset one by one for a calculation method of a certain TPC command field and a certain power control adjustment state under the same carrier waveform, modulation mode, power class and RB allocation mode. The TPC command field may be taken as values of 0, 1, 2, 3; the calculation method of the power control adjustment state may be cumulative calculation or absolute calculation.

TABLE 14

Correspondence between EVM requirement and the other specific parameter when power class is Y and EVM capability class of user equipment is Z (other specific parameter class is X)

| modulation mode | | edge RB allocation | | outer RB allocation | | inner RB allocation | |
|---|---|---|---|---|---|---|---|
| | | average EVM level (%) | other specific parameter (dB) | average EVM level (%) | other specific parameter (dB) | average EVM level (%) | other specific parameter (dB) |
| DFT-s-OFDM | Pi/2 BPSK | $z_1$ | $\leq x_1$ or $x_1$ | $z_2$ | $\leq x_2$ or $x_2$ | $z_3$ | $\leq x_3$ or $x_3$ |
| | QPSK | $z_4$ | $\leq x_4$ or $x_4$ | $z_5$ | $\leq x_5$ or $x_5$ | $z_6$ | $\leq x_6$ or $x_6$ |
| | 16 QAM | $z_7$ | $\leq x_7$ or $x_7$ | $z_8$ | $\leq x_8$ or $x_8$ | $z_9$ | $\leq x_9$ or $x_9$ |
| | 64 QAM | $z_{10}$ | $\leq x_{10}$ or $x_{10}$ | $z_{11}$ | $\leq x_{11}$ or $x_{11}$ | $z_{12}$ | $\leq x_{12}$ or $x_{12}$ |
| | 256 QAM | $z_{13}$ | $\leq x_{13}$ or $x_{13}$ | $z_{14}$ | $\leq x_{14}$ or $x_{14}$ | $z_{15}$ | $\leq x_{15}$ or $x_{15}$ |
| | 1024QAM | $z_{16}$ | $\leq x_{16}$ or $x_{16}$ | $z_{17}$ | $\leq x_{17}$ or $x_{17}$ | $z_{18}$ | $\leq x_{18}$ or $x_{18}$ |
| CP-OFDM | QPSK | $z_{19}$ | $\leq x_{19}$ or $x_{19}$ | $z_{20}$ | $\leq x_{20}$ or $x_{20}$ | $z_{21}$ | $\leq x_{21}$ or $x_{21}$ |
| | 16 QAM | $z_{22}$ | $\leq x_{22}$ or $x_{22}$ | $z_{23}$ | $\leq x_{23}$ or $x_{23}$ | $z_{24}$ | $\leq x_{24}$ or $x_{24}$ |
| | 64 QAM | $z_{25}$ | $\leq x_{25}$ or $x_{25}$ | $z_{26}$ | $\leq x_{26}$ or $x_{26}$ | $z_{27}$ | $\leq x_{27}$ or $x_{27}$ |

TABLE 14-continued

Correspondence between EVM requirement and the other specific parameter when power class is Y and EVM capability class of user equipment is Z (other specific parameter class is X)

| modulation mode | | edge RB allocation | | outer RB allocation | | inner RB allocation | |
|---|---|---|---|---|---|---|---|
| | | average EVM level (%) | other specific parameter (dB) | average EVM level (%) | other specific parameter (dB) | average EVM level (%) | other specific parameter (dB) |
| | 256 QAM | $z_{28}$ | $\leq x_{28}$ or $x_{28}$ | $z_{29}$ | $\leq x_{29}$ or $x_{29}$ | $z_{30}$ | $\leq x_{30}$ or $x_{30}$ |
| | 1024QAM | $z_{31}$ | $\leq x_{31}$ or $x_{31}$ | $z_{32}$ | $\leq x_{32}$ or $x_{32}$ | $z_{33}$ | $\leq x_{33}$ or $x_{33}$ |

TABLE 15

Correspondence between EVM requirement offset and the other specific parameter when power class is Y and EVM capability class of user equipment is Z (the other specific parameter class is X)

| modulation mode | | edge RB allocation | | outer RB allocation | | inner RB allocation | |
|---|---|---|---|---|---|---|---|
| | | average EVM level (%) | other specific parameter (dB) | average EVM level (%) | other specific parameter (dB) | average EVM level (%) | other specific parameter (dB) |
| DFT-s-OFDM | Pi/2 BPSK | $\Delta z_1$ | $\leq x_1$ or $x_1$ | $\Delta z_2$ | $\leq x_2$ or $x_2$ | $\Delta z_3$ | $\leq x_3$ or $x_3$ |
| | QPSK | $\Delta z_4$ | $\leq x_4$ or $x_4$ | $\Delta z_5$ | $\leq x_5$ or $x_5$ | $\Delta z_6$ | $\leq x_6$ or $x_6$ |
| | 16 QAM | $\Delta z_7$ | $\leq x_7$ or $x_7$ | $\Delta z_8$ | $\leq x_8$ or $x_8$ | $\Delta z_9$ | $\leq x_9$ or $x_9$ |
| | 64 QAM | $\Delta z_{10}$ | $\leq x_{10}$ or $x_{10}$ | $\Delta z_1$ | $\leq x_{11}$ or $x_{11}$ | $\Delta z_{12}$ | $\leq x_{12}$ or $x_{12}$ |
| | 256 QAM | $\Delta z_{13}$ | $\leq x_{13}$ or $x_{13}$ | $\Delta z_{14}$ | $\leq x_{14}$ or $x_{14}$ | $\Delta z_{15}$ | $\leq x_{15}$ or $x_{15}$ |
| | 1024QAM | $\Delta z_{16}$ | $\leq x_{16}$ or $x_{16}$ | $\Delta z_{17}$ | $\leq x_{17}$ or $x_{17}$ | $\Delta z_{18}$ | $\leq x_{18}$ or $x_{18}$ |
| CP-OFDM | QPSK | $\Delta z_{19}$ | $\leq x_{19}$ or $x_{19}$ | $\Delta z_{20}$ | $\leq x_{20}$ or $x_{20}$ | $\Delta z_{21}$ | $\leq x_{21}$ or $x_{21}$ |
| | 16 QAM | $\Delta z_{22}$ | $\leq x_{22}$ or $x_{22}$ | $\Delta z_{23}$ | $\leq x_{23}$ or $x_{23}$ | $\Delta z_{24}$ | $\leq x_{24}$ or $x_{24}$ |
| | 64 QAM | $\Delta z_{25}$ | $\leq x_{25}$ or $x_{25}$ | $\Delta z_{26}$ | $\leq x_{26}$ or $x_{26}$ | $\Delta z_{27}$ | $\leq x_{27}$ or $x_{27}$ |
| | 256 QAM | $\Delta z_{28}$ | $\leq x_{28}$ or $x_{28}$ | $\Delta z_{29}$ | $\leq x_{29}$ or $x_{29}$ | $\Delta z_{30}$ | $\leq x_{30}$ or $x_{30}$ |
| | 1024QAM | $\Delta z_{31}$ | $\leq x_{31}$ or $x_{31}$ | $\Delta z_{32}$ | $\leq x_{32}$ or $x_{32}$ | $\Delta z_{33}$ | $\leq x_{33}$ or $x_{33}$ |

Specifically, if in correspondence to a certain EVM capability class of the user equipment, the corresponding EVM requirement or EVM requirement offset is related to the modulation mode, and the other specific parameter corresponding to the user equipment is related to the modulation mode under a certain parameter class, then when the user equipment satisfies that the EVM capability class value corresponds to the other specific parameter class value and the modulation mode is corresponding or equal, the EVM requirement or EVM requirement offset corresponds to the other specific parameter one by one. An example of the correspondence may be shown in Table 16 or Table 17. In Table 16, when the EVM capability class of the user equipment is Z and the corresponding the other specific parameter class is X, if the modulation mode is Pi/2-BPSK, the average EVM level requirement is $z_{34}$%, and the corresponding other specific parameter value is $\leq x_{34}$ dB or $x_{34}$ dB in this situation. In Table 17, when the EVM capability class of the user equipment is Z and the corresponding other specific parameter class is X, corresponding to the modulation mode of Pi/2-BPSK, and the average EVM level requirement offset of $\Delta z_{34}$%, the corresponding other specific parameter value is $\leq x_{34}$ dB or $x_{34}$ dB in this situation. The EVM capability class Z may be class 0, class 1, class 2, etc. The other specific parameter class X may be class 0, class 1, class 2, etc.

TABLE 16

Correspondence between EVM requirement and other specific
parameter when EVM capability class of user equipment
is Z (the other specific parameter class is X)

| parameter | unit | average EVM level | other specific parameter (dB) |
|---|---|---|---|
| Pi/2-BPSK | % | $z_{34}$ | $\leq x_{34}$ or $x_{34}$ |
| QPSK | % | $z_{35}$ | $\leq x_{35}$ or $x_{35}$ |
| 16 QAM | % | $z_{36}$ | $\leq x_{36}$ or $x_{36}$ |
| 64 QAM | % | $z_{37}$ | $\leq x_{37}$ or $x_{37}$ |
| 256 QAM | % | $z_{38}$ | $\leq x_{38}$ or $x_{38}$ |

TABLE 17

Correspondence between EVM requirement offset and the other
specific parameter when user equipment EVM capability
class is Z (the other specific parameter class is X)

| parameter | unit | average EVM level offset | other specific parameter (dB) |
|---|---|---|---|
| Pi/2-BPSK | % | $\Delta z_{34}$ | $\leq x_{34}$ or $x_{34}$ |
| QPSK | % | $\Delta z_{35}$ | $\leq x_{35}$ or $x_{35}$ |
| 16 QAM | % | $\Delta z_{36}$ | $\leq x_{36}$ or $x_{36}$ |
| 64 QAM | % | $\Delta z_{37}$ | $\leq x_{37}$ or $x_{37}$ |
| 256 QAM | % | $\Delta z_{38}$ | $\leq x_{38}$ or $x_{38}$ |

Optionally, the specific implementation of the relationship between the EVM requirement or EVM requirement offset and the other specific parameter may be one-to-many, that is, one EVM requirement or EVM requirement offset corresponds to multiple other specific parameters, or multiple EVM requirements or EVM requirement offsets corresponds to one other specific parameter. Specifically, one EVM capability class may correspond to multiple other specific parameter classes, or multiple EVM capability classes may correspond to one other specific parameter class. For example, when the EVM capability class is Z, the corresponding other specific parameter classes may be $X_1$, $X_2$, $X_3$. In this situation, the EVM requirement or EVM requirement offset corresponding to the EVM capability class Z corresponds to other specific parameters corresponding to other specific parameter classes $X_1$, $X_2$, $X_3$. In addition, when the other specific parameter class is X, the corresponding EVM capability classes may be $Z_1$, $Z_2$, $Z_3$. In this situation, the other specific parameter corresponding to other specific parameter class X corresponds to the EVM requirement offsets or EVM requirement offsets corresponding to the EVM capability classes $Z_1$, $Z_2$, $Z_3$.

Among the specific parameters described in Table 13, except the EVM requirement or EVM requirement offset, any two or more of other specific parameters may have corresponding relationships. Assume a specific parameter a and a specific parameter p are any two of other specific parameters except the EVM requirement or EVM requirement offset, and the correspondence between the specific parameter $\alpha$ and the specific parameter p may be one-to-one or one-to-many. One-to-one refers to a value of the specific parameter a corresponding to a value of the specific parameter $\beta$.

In an implementation, when the user equipment satisfies that a specific parameter a class value corresponding to the specific parameter $\alpha$ corresponds to a specific parameter p class value corresponding to the specific parameter $\beta$, and the carrier waveform, modulation mode, transmission bandwidth setting, power class and RB allocation mode are corresponding or equal, the specific parameter $\alpha$ corresponds to the specific parameter $\beta$ one by one.

Table 18 gives an example in which when the specific parameter $\alpha$ class value of the user equipment corresponds to the specific parameter $\beta$ class value, the specific parameter $\alpha$ corresponds to the specific parameter $\beta$ one by one under the same carrier waveform, modulation mode, power class and RB allocation mode.

For example, in Table 18, when the specific parameter $\alpha$ class of the user equipment is $X_\alpha$ and the corresponding specific parameter $\beta$ class is $X_\beta$, if the power class is Y, the carrier waveform is DFT-s-OFDM, the modulation mode is Pi/2 BPSK, and the RB allocation mode is the edge RB allocation, then the specific parameter $\alpha$ is $\leq x_{\alpha 1}$ or $x_{\alpha 1}$ dB, and the corresponding specific parameter $\beta$ is $\leq x_{\beta 1}$ or $x_{\beta 1}$ dB.

The value of the power class Y may be, for example, 1, 1.5, 2, 3, etc., and the carrier waveform may be DFT-s-OFDM or CP-OFDM; the modulation mode may be Pi/2 BPSK, QPSK, 16 QAM, 64 QAM, 256 QAM, 1024QAM or other modulation modes; the RB allocation mode may be edge RB allocation, outer RB allocation or inner RB allocation. The specific parameter $\alpha$ class $X_\alpha$ may be class 0, class 1, class 2, etc. The specific parameter $\beta$ class $X_\beta$ may be class 0, class 1, class 2, etc. Refer to the standard 3GPP TS38.101 for the definitions of edge RB, outer RB or inner RB.

It should be noted that if the specific parameter $\alpha$ class or the specific parameter $\beta$ class is the capability class related to the TPC command, not only the carrier waveform, modulation mode, transmission bandwidth setting, power class and RB allocation mode, but also the calculation method of the TPC command field and the power control adjustment state may be considered when determining the corresponding specific parameter TPC command mapping power value or TPC command mapping power value offset. In an implementation, if the specific parameter $\alpha$ class value or the specific parameter $\beta$ class value of the user equipment corresponds to the capability class value related to the TPC command, the specific parameter $\alpha$ or the specific parameter $\beta$ corresponds to the TPC command mapping power value or TPC command mapping power value offset for a calculation method of a certain TPC command field and a certain power control adjustment state under the same carrier waveform, modulation mode, power class and RB allocation mode. The TPC command field may take values of 0, 1, 2, 3; the calculation method of the power control adjustment state may be cumulative calculation or absolute calculation.

TABLE 18

Correspondence between specific parameter α and specific parameter β when power class is Y and specific parameter α class of user equipment is $X_\alpha$ (specific parameter β class is $X_\beta$)

| modulation mode | | edge RB allocation | | outer RB allocation | | inner RB allocation | |
|---|---|---|---|---|---|---|---|
| | | specific parameter α (dB) | specific parameter β (dB) | specific parameter α (dB) | specific parameter β (dB) | specific parameter α (dB) | specific parameter β (dB) |
| DFT-s-OFDM | Pi/2 BPSK | $\leq x_{\alpha1}$ or $x_{\alpha1}$ | $\leq x_{\beta1}$ or $x_{\beta1}$ | $\leq x_{\alpha2}$ or $x_{\alpha2}$ | $\leq x_{\beta2}$ or $x_{\beta2}$ | $\leq x_{\alpha3}$ or $x_{\alpha3}$ | $\leq x_{\beta3}$ or $x_{\beta3}$ |
| | QPSK | $\leq x_{\alpha4}$ or $x_{\alpha4}$ | $\leq x\beta$ or $x_{\beta4}$ | $\leq x_{\alpha5}$ or $x_{\alpha5}$ | $\leq x_{\beta5}$ or $x_{\beta5}$ | $\leq x_{\alpha6}$ or $x_{\alpha6}$ | $\leq x_{\beta6}$ or $x_{\beta6}$ |
| | 16 QAM | $\leq x_{\alpha7}$ or $x_{\alpha7}$ | $\leq x_{\beta7}$ or $x_{\beta7}$ | $\leq x_{\alpha8}$ or $x_{\alpha8}$ | $\leq x_{\beta8}$ or $x_{\beta8}$ | $\leq x_{\alpha9}$ or $x_{\alpha9}$ | $\leq x_{\beta9}$ or $x_{\beta9}$ |
| | 64 QAM | $\leq x_{\alpha10}$ or $x_{\alpha10}$ | $\leq x_{\beta10}$ or $x_{\beta10}$ | $\leq x_{\alpha11}$ or $x_{\alpha11}$ | $\leq x_{\beta11}$ or $x_{\beta11}$ | $\leq x_{\alpha12}$ or $x_{\alpha12}$ | $\leq x_{\beta12}$ or $x_{\beta12}$ |
| | 256 QAM | $\leq x_{\alpha13}$ or $x_{\alpha13}$ | $\leq x_{\beta13}$ or $x_{\beta13}$ | $\leq x_{\alpha14}$ or $x_{\alpha14}$ | $\leq x_{\beta14}$ or $x_{\beta14}$ | $\leq x_{\alpha15}$ or $x_{\alpha15}$ | $\leq x_{\beta15}$ or $x_{\beta15}$ |
| | 1024QAM | $\leq x_{\alpha16}$ or $x_{\alpha16}$ | $\leq x_{\beta16}$ or $x_{\beta16}$ | $\leq x_{\alpha17}$ or $x_{\alpha17}$ | $\leq x_{\beta17}$ or $x_{\beta17}$ | $\leq x_{\alpha18}$ or $x_{\alpha18}$ | $\leq x_{\beta18}$ or $x_{\beta18}$ |
| CP-OFDM | QPSK | $\leq x_{\alpha19}$ or $x_{\alpha19}$ | $\leq x_{\beta19}$ or $x_{\beta19}$ | $\leq x_{\alpha20}$ or $x_{\alpha20}$ | $\leq x_{\beta20}$ or $x_{\beta20}$ | $\leq x_{\alpha21}$ or $x_{\alpha21}$ | $\leq x_{\beta21}$ or $x_{\beta21}$ |
| | 16 QAM | $\leq x_{\alpha22}$ or $x_{\alpha22}$ | $\leq x_{\beta22}$ or $x_{\beta22}$ | $\leq x_{\alpha23}$ or $x_{\alpha23}$ | $\leq x_{\beta23}$ or $x_{\beta23}$ | $\leq x_{\alpha24}$ or $x_{\alpha24}$ | $\leq x_{\beta24}$ or $x_{\beta24}$ |
| | 64 QAM | $\leq x_{\alpha25}$ or $x_{\alpha25}$ | $\leq x_{\beta25}$ or $x_{\beta25}$ | $\leq x_{\alpha26}$ or $x_{\alpha26}$ | $\leq x_{\beta26}$ or $x_{\beta26}$ | $\leq x_{\alpha27}$ or $x_{\alpha27}$ | $\leq x_{\beta27}$ or $x_{\beta27}$ |
| | 256 QAM | $\leq x_{\alpha28}$ or $x_{\alpha28}$ | $\leq x_{\beta28}$ or $x_{\beta28}$ | $\leq x_{\alpha29}$ or $x_{\alpha29}$ | $\leq x_{\beta29}$ or $x_{\beta29}$ | $\leq x_{\alpha30}$ or $x_{\alpha30}$ | $\leq x_{\beta30}$ or $x_{\beta30}$ |
| | 1024QAM | $\leq x_{\alpha31}$ or $x_{\alpha31}$ | $\leq x_{\beta31}$ or $x_{\beta31}$ | $\leq x_{\alpha32}$ or $x_{\alpha32}$ | $\leq x_{\beta32}$ or $x_{\beta32}$ | $\leq x_{\alpha33}$ or $x_{\alpha33}$ | $\leq x_{\beta33}$ or $x_{\beta33}$ |

Specifically, if in correspondence to a certain specific parameter α class of the user equipment, the corresponding specific parameter α is related to the level of the class, and in correspondence to the specific parameter β of the user equipment, it is also related to the level of the class, then when the user equipment satisfies that the specific parameter α class value corresponds to the specific parameter β class value, the specific parameter α corresponds to the specific parameter β one by one. An example of the correspondence may be shown in Table 19. In Table 19, when the specific parameter α class value of the user equipment is $X_{\alpha1}$ and the corresponding specific parameter β class is $X_{\beta1}$, the specific parameter α value is $\leq x_{\alpha1}$ or $x_{\beta1}$ dB, and the corresponding specific parameter β value is $\leq x_{\beta1}$ or $x_{\beta1}$ dB. The specific parameter α class value $X_\alpha$ may be class 0, class 1, class 2, etc. The specific parameter β class $X_{\beta1}$ may be class 0, class 1, class 2, etc.

TABLE 19

Correspondence between specific parameter α and specific parameter β of user equipment

| specific parameter α class | specific parameter α (dB) | specific parameter β class | specific parameter β (dB) |
|---|---|---|---|
| $X_{\alpha1}$ | $\leq x_{\alpha1}$ or $x_{\alpha1}$ | $X_{\beta1}$ | $\leq x_{\beta1}$ or $x_{\beta1}$ |
| $X_{\alpha2}$ | $\leq x_{\alpha2}$ or $x_{\alpha2}$ | $X_{\beta1}$ | $\leq x_{\beta2}$ or $x_{\beta2}$ |
| $X_{\alpha3}$ | $\leq x_{\alpha3}$ or $x_{\alpha3}$ | $X_{\beta1}$ | $\leq x_{\beta3}$ or $x_{\beta3}$ |
| $X_{\alpha4}$ | $\leq x_{\alpha4}$ or $x_{\alpha4}$ | $X_{\beta1}$ | $\leq x_{\beta4}$ or $x_{\beta4}$ |

Optionally, the specific implementation of the relationship between the specific parameter α and the specific parameter β may be one-to-many, that is, one specific parameter α corresponds to multiple specific parameters β, or multiple specific parameters a correspond to one specific parameter β. Specifically, one specific parameter α class may correspond to multiple specific parameter β classes, or multiple specific parameter α classes may correspond to one specific parameter β class. For example, when the specific parameter α class is $X_\alpha$, the corresponding specific parameter β classes may be $X_{\beta1}$, $X_{\beta2}$, $X_{\beta3}$. In this situation, the specific parameter α corresponding to the specific parameter α class $X_\alpha$ corresponds to the specific parameters β corresponding to the specific parameter β classes $X_{\beta1}$, $X_{\beta2}$ and $X_{\beta3}$. In addition, when the specific parameter β class is $X_\beta$, the corresponding specific parameter α classes may be $X_{\alpha1}$, $X_{\alpha2}$, $X_{\alpha3}$. In this situation, the specific parameter β corresponding to the specific parameter β class $X_\beta$ corresponds to the specific parameters a corresponding to the specific parameter α classes $X_{\alpha1}$, $X_{\alpha2}$, $X_{\alpha3}$.

It should be understood that although the description is mainly made from the perspective of the user equipment in the foregoing description, the principle of the present disclosure also includes performing the corresponding operations by the base station, which may be obtained by those skilled in the art after reading the above contents, which are not repeated here.

Figure 5:
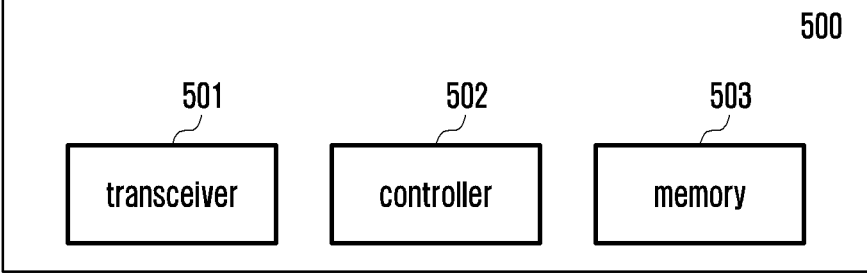
FIG. 5 illustrates a schematic diagram of a hardware structure of a user equipment (UE) according to an embodiment of the present disclosure.

FIG. 5 illustrates a block diagram of an example user equipment according to an embodiment of the disclosure.

Referring to FIG. 5, a user equipment 500 includes a transceiver 501, a controller 502 and a memory 503. Under the control of the controller 502, which may be implemented as one or more processors, the user equipment 500 may be configured to perform related operations performed by a user equipment in the methods described above. Although the transceiver 501, the controller 502 and the memory 503 are shown as separate entities, they may be implemented as a single entity, such as a single chip. The transceiver 501, the controller 502 and the memory 503 may be electrically connected or coupled to each other. The transceiver 501 may transmit and receive signals to and from other network entities, such as a node (which may be, for example, a base station, a relay node, etc.) and/or another user equipment. In some implementations, the transceiver 501 may be omitted. In this case, the controller 502 may be configured to execute instructions (including computer programs) stored in the memory 503 to control the overall operation of the user equipment 500, thereby implementing the operations in the flows of the above methods.

Figure 6:
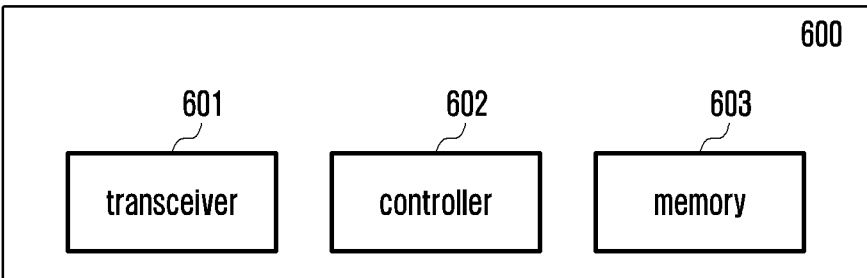
FIG. 6 illustrates a schematic diagram of a hardware structure of a base station according to an embodiment of the present disclosure.

FIG. 6 illustrates a block diagram of an example base station according to an embodiment of the disclosure.

Referring to FIG. 6, a base station 600 includes a transceiver 601, a controller 602 and a memory 603. Under the control of the controller 602, which may be implemented as one or more processors, the base station 600 may be configured to perform related operations performed by a base station in the methods described above. Although the transceiver 601, the controller 602 and the memory 603 are shown as separate entities, they may be implemented as a single entity, such as a single chip. The transceiver 601, the controller 602 and the memory 603 may be electrically connected or coupled to each other. The transceiver 601 may transmit and receive signals to and from other network entities, such as another node (which may be, for example, a base station, a relay node, etc.) and/or a user equipment. In some implementations, the transceiver 601 may be omitted. In this case, the controller 602 may be configured to execute instructions (including computer programs) stored in the memory 603 to control the overall operation of the base station 600, thereby implementing the operations in the flows of the above methods.

The text and drawings are provided as examples only to help readers understand the present disclosure. They are not intended and should not be construed to limit the scope of the present disclosure in any way. Although certain embodiments and examples have been provided, based on the disclosure herein, it is obvious to those skilled in the art that changes may be made to the illustrated embodiments and examples without departing from the scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:
transmitting, to a base station, capability information including information indicating whether the UE supports power relaxation;
receiving, from the base station, configuration information including information on power relaxation indication;
identifying at least one power relaxation parameters for an uplink transmission power based on the power relaxation indication; and
transmitting, to the base station, an uplink signal by using an uplink transmission power adjusted based on the at least one power relaxation parameters,
wherein the at least one power relaxation parameters include relaxed maximum output power reduction (MPR) value.

2. The method of claim 1, wherein the information indicating whether the UE supports the power relaxation is identified per at least one of: a frequency band, a frequency band combination, or a bandwidth part.

3. The method of claim 1, wherein information associated with the uplink signal is identified based on the power relaxation, and

wherein the information associated with the uplink signal includes at least one of: a modulation mode, a carrier waveform, a power class, a transmission bandwidth setting, a resource block (RB) allocation mode, a transmit power control (TPC) command field, or a calculation method of a power control adjustment state.

4. The method of claim 1, wherein the at least one power relaxation parameters further includes at least one of: an MPR value, a configured maximum transmission power offset, a corrected value of a maximum transmission power offset, a maximum output power limit offset, a maximum output power offset, a transmission power calculation offset; an expected received power offset; a transmit power control (TPC) command mapping power value offset; or a power headroom offset.

5. The method of claim 1, further comprising:
identifying an error vector magnitude (EVM) requirement associated with the power relaxation, and
wherein the at least one power relaxation parameters satisfies the EVM requirement.

6. The method of claim 5, wherein the capability information further includes information associated with the EVM requirement.

7. The method of claim 1, wherein the uplink signal is a physical uplink shared channel.

8. A user equipment (UE) in a communication system, the UE comprising:
a transceiver; and
a processor coupled with the transceiver and configured to:
transmit, to a base station, capability information including information indicating whether the UE supports power relaxation;
receive, from the base station, configuration information including information on power relaxation indication;
identify at least one power relaxation parameters for an uplink transmission power based on the power relaxation indication; and
transmit, to the base station, an uplink signal by using an uplink transmission power adjusted based on the at least one power relaxation parameters,
wherein the at least one power relaxation parameters include relaxed maximum output power reduction (MPR) value.

9. The UE of claim 8, wherein the information indicating whether the UE supports the power relaxation is identified per at least one of: a frequency band, a frequency band combination, or a bandwidth part.

10. The UE of claim 8, wherein information associated with the uplink signal is identified based on the power relaxation, and
wherein the information associated with the uplink signal includes at least one of: a modulation mode, a carrier waveform, a power class, a transmission bandwidth setting, a resource block (RB) allocation mode, a transmit power control (TPC) command field, or a calculation method of a power control adjustment state.

11. The UE of claim 8, wherein the at least one power relaxation parameters further includes at least one of: an MPR value, a configured maximum transmission power offset, a corrected value of a maximum transmission power offset, a maximum output power limit offset, a maximum output power offset, a transmission power calculation offset; an expected received power offset; a transmit power control (TPC) command mapping power value offset; or a power headroom offset.

12. The UE of claim 8, wherein the processor is further configured to:

identify an error vector magnitude (EVM) requirement associated with the power relaxation, and wherein the at least one power relaxation parameters satisfies the EVM requirement.

13. The UE of claim 12, wherein the capability information further includes information associated with the EVM requirement.

14. The UE of claim 8, wherein the uplink signal is a physical uplink shared channel.

15. A method performed by a base station in a communication system, the method comprising:

receiving, from a user equipment (UE), capability information including information indicating whether the UE supports power relaxation;

transmitting, to the UE, configuration information including information on power relaxation indication; and receiving, from the UE, an uplink signal by using an uplink transmission power adjusted based on at least one power relaxation parameters for an uplink transmission power, wherein the at least one power relaxation parameters is identified based on the power relaxation indication, and wherein the at least one power relaxation parameters include relaxed maximum output power reduction (MPR) value.

16. The method of claim 15, wherein the information indicating whether the UE supports the power relaxation is identified per at least one of: a frequency band, a frequency band combination, or a bandwidth part.

17. The method of claim 15, wherein the capability information further includes information associated with an error vector magnitude (EVM) requirement, wherein the at least one power relaxation parameters satisfies the EVM requirement, and wherein the EVM requirement is associated with the power relaxation.

18. A base station in a communication system, the base station comprising:

a transceiver; and a processor coupled with the transceiver and configured to:

receive, from a user equipment (UE), capability information including information indicating whether the UE supports power relaxation;

transmit, to the UE, configuration information including information on power relaxation indication; and receive, from the UE, an uplink signal using an uplink transmission power adjusted based on at least one power relaxation parameters for an uplink transmission power, wherein the at least one power relaxation parameters is identified based on the power relaxation indication, and wherein the at least one power relaxation parameters include relaxed maximum output power reduction (MPR) value.

19. The base station of claim 18, wherein the information indicating whether the UE supports the power relaxation is identified per at least one of: a frequency band, a frequency band combination, or a bandwidth part.

20. The base station of claim 18, wherein the capability information further includes information associated with an error vector magnitude (EVM) requirement, wherein the at least one power relaxation parameters satisfies the EVM requirement, and wherein the EVM requirement is associated with the power relaxation.

\* \* \* \* \*